US007249314B2

(12) United States Patent
Walker et al.

(10) Patent No.: US 7,249,314 B2
(45) Date of Patent: Jul. 24, 2007

(54) SIMULTANEOUS MULTI-USER DOCUMENT EDITING SYSTEM

(75) Inventors: Richard Walker, Toronto (CA); Christopher Sonnenberg, Toronto (CA)

(73) Assignee: Thoughtslinger Corporation, Toronto, Ontario (CA)

( * ) Notice: Subject to any disclaimer, the term of this patent is extended or adjusted under 35 U.S.C. 154(b) by 462 days.

(21) Appl. No.: 09/933,012

(22) Filed: Aug. 21, 2001

(65) Prior Publication Data
US 2002/0065848 A1    May 30, 2002

(51) Int. Cl.
*G06F 15/00* (2006.01)

(52) U.S. Cl. .................. 715/511; 715/513; 715/514; 715/515; 715/530

(58) Field of Classification Search ............... 715/511, 715/513, 514, 515, 530
See application file for complete search history.

(56) References Cited

U.S. PATENT DOCUMENTS

| | | | |
|---|---|---|---|
| 5,220,657 A | | 6/1993 | Bly et al. |
| 5,287,521 A | * | 2/1994 | Nitta et al. ................. 710/200 |
| 5,526,524 A | * | 6/1996 | Madduri ..................... 710/200 |
| 5,623,659 A | * | 4/1997 | Shi et al. ........................ 707/8 |
| 5,781,732 A | * | 7/1998 | Adams ........................ 709/205 |
| 5,966,512 A | | 10/1999 | Bates et al. |
| 6,049,334 A | * | 4/2000 | Bates et al. ................. 345/755 |
| 6,067,551 A | * | 5/2000 | Brown et al. ............... 707/203 |
| 6,088,702 A | * | 7/2000 | Plantz et al. ............ 707/103 R |
| 6,212,534 B1 | * | 4/2001 | Lo et al. ...................... 715/511 |
| 6,275,935 B1 | * | 8/2001 | Barlow et al. .............. 713/182 |
| 6,289,460 B1 | * | 9/2001 | Hajmiragha ................. 713/200 |
| 6,314,425 B1 | * | 11/2001 | Serbinis et al. ............... 707/10 |
| 6,446,093 B2 | * | 9/2002 | Tabuchi ....................... 707/205 |
| 6,529,905 B1 | * | 3/2003 | Bray et al. ...................... 707/8 |
| 6,681,371 B1 | * | 1/2004 | Devanbu .................... 715/515 |
| 6,757,871 B1 | * | 6/2004 | Sato et al. .................. 715/530 |

FOREIGN PATENT DOCUMENTS

WO    WO 99 33007    7/1999

OTHER PUBLICATIONS

International Search Report dated Jan. 17, 2003, PCT/CA01/01207, International filing date Aug. 21, 2001, Applicant: Thoughtslinger Corporation.
Wear, Almon Wesley Jr., Database Management for Distributed, Multimedia, Collaborative-Writing, Technical Report 94-18, Auburn University, Auburn, AL, 36849, Oct. 31, 1994, pp. 1-172.

\* cited by examiner

*Primary Examiner*—Heather R. Herndon
*Assistant Examiner*—Michael K. Botts
(74) *Attorney, Agent, or Firm*—Bereskin & Parr

(57) ABSTRACT

A system and methods for simultaneous editing of a document by two or more users are disclosed. The document is divided into a number of sections. Each section is stored in a separate data container, which is part of a document tree. A master copy of the document tree is accessible to a server which transmits all or part of the document tree to two or more clients, each of which is operated by a user. The clients can independently lock different sections, allowing the users to simultaneously edit different sections. When a user completes editing a section, the modified section is stored on the master server and broadcast to other users. The document tree is headed by an independently lockable and editable parent container which is used to store summary information and other information, such as default formatting and other document wide information.

32 Claims, 15 Drawing Sheets

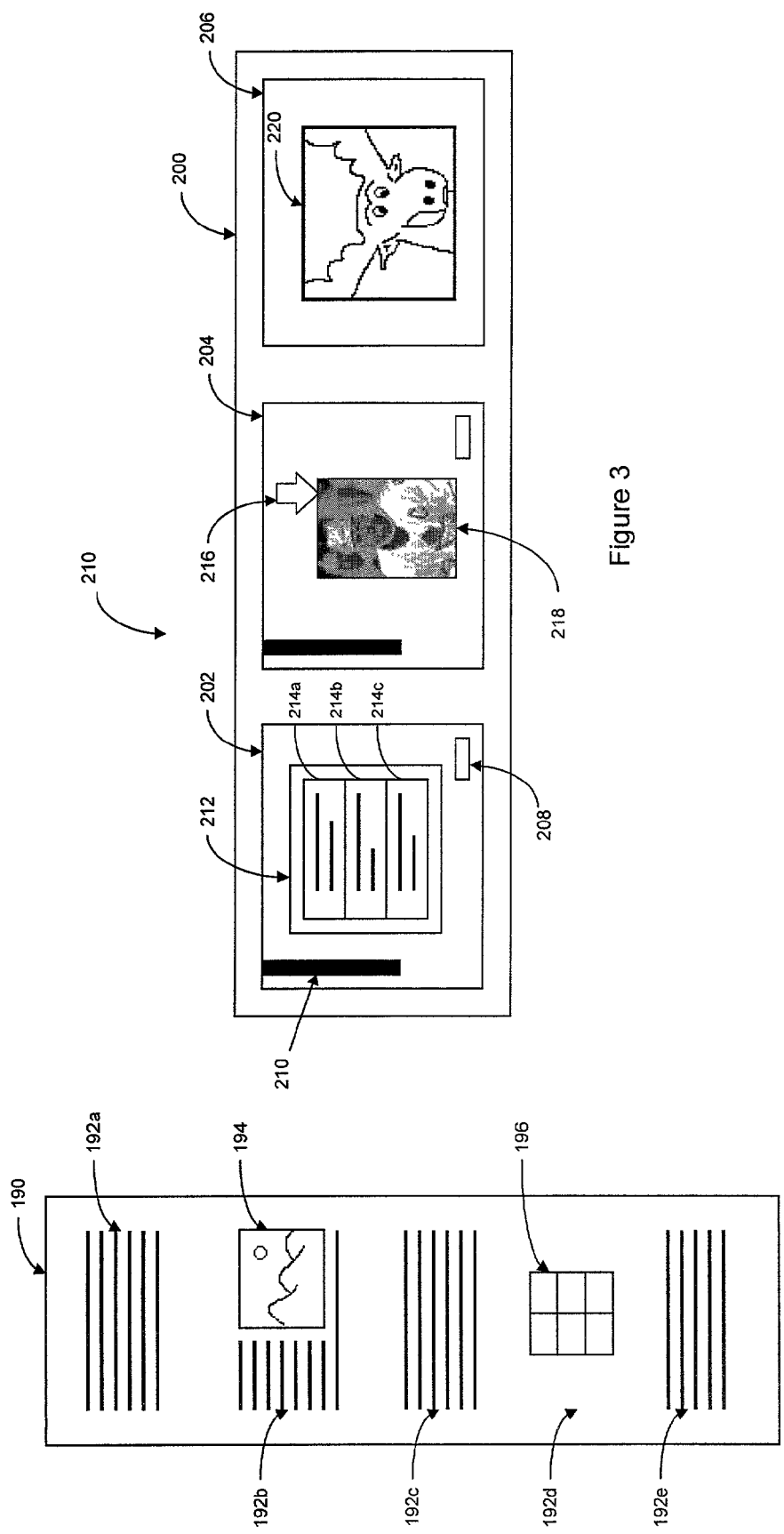

SIMULTANEOUS MULTI-USER DOCUMENT EDITING SYSTEM

FIELD OF THE INVENTION

This invention relates to a system and methods for storing and simultaneous multi-user editing of documents, including text documents, presentation documents, graphic image documents, audio/visual clips and other types of documents.

BACKGROUND OF THE INVENTION

People often work together in groups to achieve common goals. Members of a workgroup should have convenient access to all of the documents relating to a topic or project. In contemporary workplaces, shared documents are usually stored on a file server connected to a network and accessible through networked computers. However, this arrangement proves restrictive when team members are situated in widely disparate locations.

Most software applications are single-user systems. For example, with an image editing application such as Adobe Photoshop™, a user opens an image file and edits it. While one user works on an image file, other users may not simultaneously open and edit the same file. Similarly, most word processors are single-user systems. While one user has a file open and in use, other users may not simultaneously open and edit the file.

When workers collaborate on a project, situations may arise in which two or more workers attempt to simultaneously access a shared document. Most collaborative groupware or computing environments offer limited or no support for such activity.

A common approach to collaboration is to circulate documents, often as email attachments, among members of a team. In this arrangement, all team members agree to let one member ("ball carrier") have exclusive control of a document until he or she finishes editing it and emails it to another team member. There can be only one ball carrier at a time, and only the ball carrier may edit the document. If other workgroup members edit separate copies of the document while the ball carrier has control of it, the multiple versions of the document must later be merged and conflicting co-edited sections resolved.

Document type incompatibilities may arise when circulating a document in this manner. For example, a text document may become unreadable if different team members edit it using different word processors or even using different versions of the same word processor. Additionally, technical problems may arise with the transmission of email attachments. Some email servers arbitrarily restrict the size of attachments. Those that exceed a certain threshold size are not accepted. A large document, such as a large slide presentation document, may not be circulable to all workgroup members.

Some applications achieve limited collaboration. For example, Microsoft NetMeeting™ provides application sharing. During a NetMeeting session, a user may share an application running on his or her machine with others. The various session participants take turns controlling the application. While one participant has control of the application, the others can watch his or her activity, such as editing or scrolling through a document, on their screens. However, as with document circulation, only one user may edit a document at any given time.

Lotus Notes™, another widely used groupware system, uses a special database to store shared information. Replicas of the database are distributed to several network servers or client machines. A workgroup member with appropriate access privileges may make modifications to information stored in his or her local copy of a replicated database. All active replicas are periodically reconciled. However, if conflicts arise as replicas are compared and merged, Notes is limited in its ability to automatically resolve the conflicts.

Several online services provide subscribers with a "virtual hard drive" for their documents. Subscribers may upload shared documents through a Web-based interface to a remote storage server accessible by all workgroup members. Documents may later be downloaded to any computer with Web access. This arrangement is a modest improvement over circulating documents via email attachments. However, while one team member has a document signed out of the service, others may not work on it.

Thus, there is a need in the art for a system that facilitates simultaneous multi-user editing of shared documents. The system is preferably platform independent to allow users with different computing platform to utilize it.

SUMMARY OF THE INVENTION

The present invention provides a system and methods for simultaneous editing of a document by two or more distinct users. The system will typically include one or more workspace servers and a number of client computers. Users access the system by using client software (or "clients") which execute on the client computers.

The system includes a file system in which a number of workspaces are stored.

One or more documents are stored in each workspace. A master copy of each workspace is stored in the file system, which is accessible to the workspace servers. A user may login to the system and connect to a workspace using his client. Each client that is currently connected to a workspace also maintains a local copy of a part or all of the workspace in its client computer. Each workspace contains a container tree data structure and a membership list.

The container tree data structure has a root container at its head and includes a document sub-tree for each document in the workspace. Each document sub-tree has a parent container at its head and each parent container is a child container of the root container. The root container is used to store information about the entire workspace, including the name of the workspace, a description of the workspace, pointers to each parent container, etc. Similarly, each parent container is used to store information relating to its associated document, such as the title of the document.

Each document sub-tree includes one or more primary data containers, which are children of the parent container of the document sub-tree. The data of a document (i.e. the text of a text document) is divided into a number of sections, each of which is stored in one primary data container. Each container in the container tree may be independently locked by a user of the system.

While a user has a container locked, he or she may exclusively edit the section of data stored in the container. The user may also delete the data in the container, in which case the container may also be deleted. The user may also add additional sections to the document, in which case additional containers may be created. Initially, all such editing changes are stored in provisional copies of the affected containers locally on the client computer. When the user has completed editing a locked section of a document, the user posts all of the provisional locked and new containers to a workspace server.

A workspace server receives the locked and new containers, and incorporates them into the master copy of the container tree. In addition to modifying containers that he has locked, a user may attempt to modify unlocked containers using a Blind Post operation. The workspace server updates the blindly posted container, unless the blindly posted container is out-of-date or locked by another user.

While one user has a section of a document locked, another user may have other sections of the same document locked. Each of the users may simultaneously edit his or her respective locked sections of the document. In this way, multiple users may simultaneously lock and edit different sections of the same document. Locking, editing and posting operations are done by each user using document editors built into the client software. In addition, the document editors allow a user to simply view a document by downloading sections of it and displaying them on a screen connected to a client computer.

After updating the master copy of the container tree in response to a Post request, the workspace server broadcasts the updated containers to all other users (and possibly also to the user that originated the Post request) in an Update message. Each client modifies the user's local copy of the container tree, at least to the extent necessary to update any section of a document that is currently being displayed to a user. Update messages may be Chubby, in which case all information required to fully update a container is transmitted to a client, or they may be Skinny, in which case the client is only advised that a container has changed, but is not fully advised as to the change. The client may mark the container as invalid and subsequently obtain an up-to-date copy of it from the workspace server.

Similarly, Update messages may be broadcasted to advise clients when containers are locked and unlocked. A client may be configured to indicate whether a container is locked by using an indicator on the screen of the client computer.

The Update messages allow each user to see the changes being made to the workspace soon after they are posted to the workspace server.

The system may also include a master server which regulates the registration of users, allows users to log into the system and other tasks. Access to each workspace may be restricted to members of the workspace, each of whom must be or become a user of the system prior to connecting to the workspace. Typically, a workspace is used to aggregate related documents. For example, all documents in a workspace may relate to a specific project, company or patient. The membership in the workspace may be limited to people who have an interest in the documents. Alternatively, a workspace may be used to aggregate any group of documents, which may not have any relationship between them.

Members of a workspace may have different access privileges. For example, members with owner privileges may be allowed to perform any action in the workspace, including inviting new members to join the workspace. Members with worker privileges may be permitted only to edit documents stored within the workspace. Members with only viewer privileges may be permitted to view documents but may not be permitted to edit them.

The division of each document into sections affects the granularity with which different users may edit adjacent sections of a document. In one embodiment, text documents are broken into paragraph sections, although this is not necessary. In other embodiments, sentence or character sections may be used to provide finer granularity.

The documents stored in a workspace may be of many different types. Several container classes are defined to store documents of different types. In addition, a series of article classes are defined to store document sections of different data types. Each container contains an article. Actual section data is stored in the articles. The structural arrangement of the containers in the container tree corresponds to the structural arrangement of the sections in a document. The selection of the article within each container corresponds to the data type of the section stored in the article. For example, in one embodiment, data sections which have a natural "next" and "previous" relationship between them, such as paragraphs in a text document, are stored in a series of containers connected as a linked list. In the same embodiment, data sections within a document which do not have such a natural relationship are stored as independent children of a common parent container. For example, text and shape elements on a slide presentation are stored in separate containers which are not linked to one another.

Documents may have many different types of data within them. In one embodiment of the present invention, a primary data type is selected for each document and the primary container structure corresponds to the primary data type. Data of other types may be embedded in the document and are stored using a container structure that corresponds to the data type and structure of the embedded data. Similarly, the articles used to store the data sections of the embedded data will depend on the data type of those sections.

A particular embodiment of the present invention may be configured to support documents having various types of data. In one embodiment, documents of an unsupported data type may be stored within the container tree as generic documents. A parent container is created to store information about the generic document. The parent container has a single child container that includes a data buffer article. The generic document is stored within the data buffer article. A user may lock the child container and then download and edit the document using an editor not provided with the embodiment. The edited document may then be uploaded and stored within the data buffer and the lock may be released. This allows users to store and access generic documents as part of the embodiment.

In another embodiment, a generic document may be divided into separate parts, each of which may be stored in a separate child container of the parent article, and each of which may be independently locked for editing by different users.

Additional aspects of the present are described in the following description of several embodiments of it.

BRIEF DESCRIPTION OF THE DRAWINGS

A preferred embodiment of the present invention will now be described in detail with reference to the drawings, in which:

FIG. 2 illustrates a text document used to illustrate the structure and operation of the embodiment of FIG. 1;

FIG. 3 illustrates a presentation document used to illustrate the structure and operation of the embodiment of FIG. 1;

DETAILED DESCRIPTION OF EMBODIMENTS OF THE INVENTION

Figure 1:
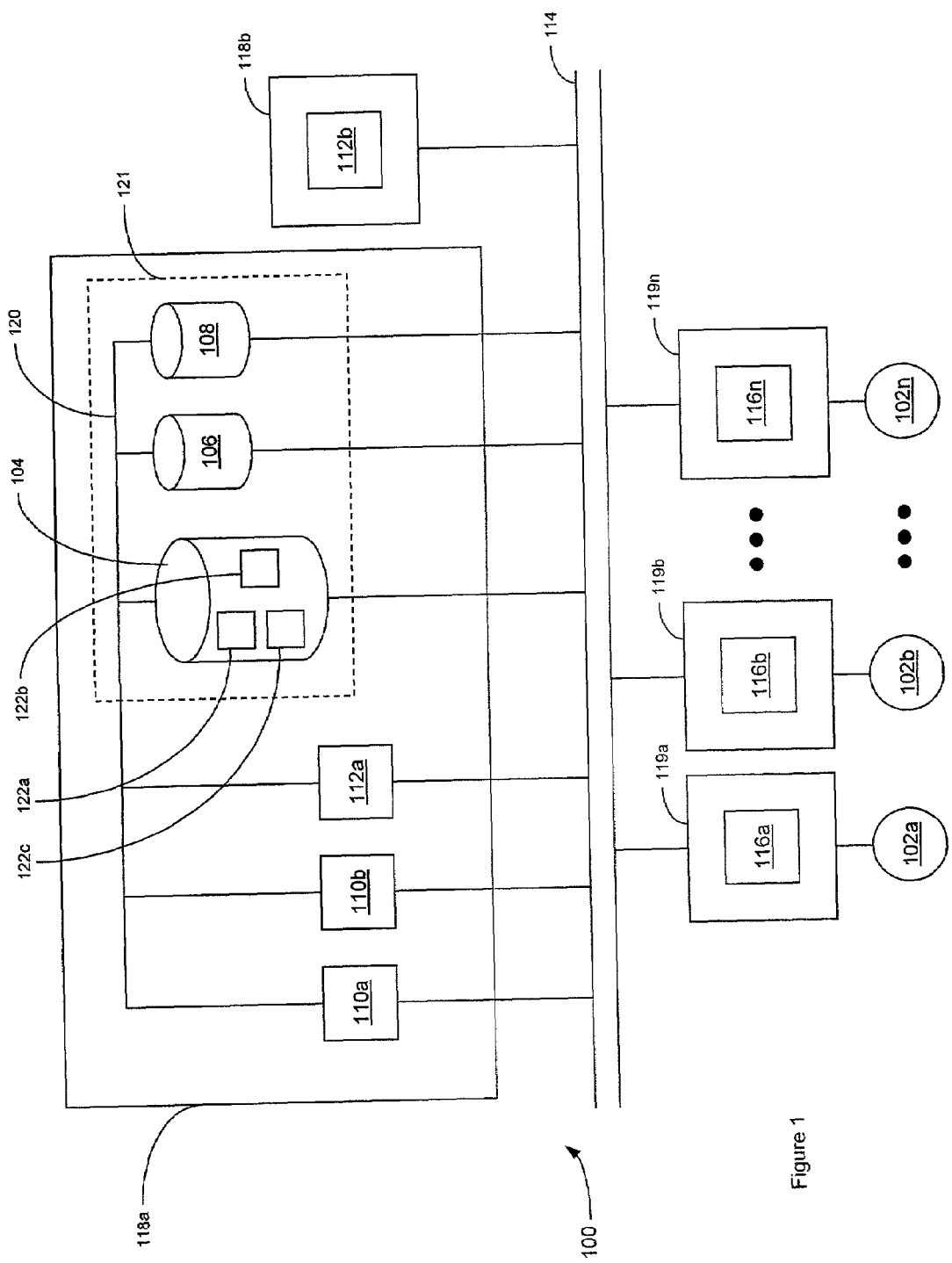
FIG. 1 is block diagram of an embodiment of a simultaneous multi-user document editing system according to the present invention.

Reference is first made to FIG. 1, which illustrates one exemplary embodiment of a collaborative document editing system 100 according to the present invention. System 100 includes a file system 104, a user database 106, a workspace database 108, one or more master servers 110a, 110b, ..., one or more workspace servers 112a, 112b, ..., a communication network 114 and one or more clients 116a, 116b, ....

Master servers 110 and workspace servers 112 are software processes (or tasks) that may operate on a single computer or may be distributed among various computers. For example, one master server 110a and one workspace server 112a may operate on a first server computer 118a, while another workspace server 112b operates on a second server computer 118b. Master servers 110 and workspace servers 112 are coupled to communication network 114. System 100 may include any number of master servers 110 and workspace servers 112. Each master server 110 and workspace server 112 will operate on a server computer 118. More than one master server 110 and workspace server 112 may operate on a particular server computer 118.

Clients 116 are computer processes that will typically operate on separate client computers 119, although one or more clients may operate on a single computer 119. Clients 116 may also operate on one or more server computers 118, although this is not illustrated in FIG. 1. Each client 116 is coupled to communication network 114, allowing the client 116 to communicate with any master server 110 and any workspace server 112.

File system 104 is used to store one or more workspaces 122a, 122b, ..., 122n. Each workspace 122 includes a data structure used to store one or more documents and a data structure used to store information about one or more members of the workspace. (In this description, the term "document" refers generally to any complete data object such as: a text document; an image; a stream of video or sound data; a movie incorporating both video and sound; a "white board" document incorporating various shapes and/or text; a presentation that may include a plurality of slides, each of which incorporates various shapes, backgrounds and text. Many other types of documents may be stored within a workspace.)

Workspace database 108 is used to store information about each workspace 122 stored in file system 104.

Master server 110a and workspace server 112a communicate with file system 104 and workspace database 108 using an internal communication link 120 within server computer 118a. File system 104 and workspace database 108 are also coupled to network 114 allowing master servers 110 and workspace servers 112 located on other server computers 118, such as workspace server 112b located on server computer 118b, to communicate with file system 104.

User database 106 is used to store information about users 102, who are typically people that use clients 116 to access data stored in workspaces 122. The structure of user database 106 is described further below.

File system 104, user database 106 and workspace server 108 may be stored on a data storage device 121, which may be a magnetic or optical data storage device or any other type of data storage device or system. In the present exemplary embodiment, this data storage device is located within server computer 118a. In another embodiment of a system according to the present invention, the data storage device may be located in any server computer and in fact file system 104 and user database 106 may be located in separated data storage devices on different server computers 118a. Server computers 118 other than the specific server computer 118 on which the data storage device is located may access it as an external device through network 114.

Several exemplary documents that will be used to explain the structure and operation of the present invention will now be described.

FIG. 2 illustrates an exemplary text document 190. Text document 190 has five paragraphs 192a, 192b, ..., 192e and includes an embedded image and an embedded table. Paragraphs 192a, 192c, and 192e contain only text. Paragraph 192b comprises text and an embedded graphic image 194. Paragraph 192d comprises no text and an embedded table 196. Graphic image 194 is a rectangular image with a size of 100×150 pixels. Table 196 has a 2×3 array of cells which contain text (including numerical text) and other data, including formulae used to calculate the value of cells based on the content of other cells.

FIG. 3 illustrates an exemplary presentation document 200. In this description, a presentation document refers to a collection of slides or screens which may be displayed sequentially or in any order. Some or all of the slides may share some common elements, such as a background image or shading and default shapes. Each slide will typically also have some unique content, such as text, images, video, sounds, etc. Presentation document 200 has three slides 202, 204 and 206. Slides 202 and 204 share two common components: a corporate logo 208 and vertical line 210. Slide 202 has some text 212, consisting of paragraphs 214a, 214b and 214c. Slide 204 has an arrow shape 216 and an audio/video clip 218. Slide 206 has a graphic image 220.

The present invention utilizes a concept of breaking down documents into smaller, independently editable sections. For example, a text document may be broken down into paragraphs. Similarly, an image document may be broken down into blocks of pixels, a table document may be broken down into cells, and a presentation document may be broken down into slides, which may be broken down further into constituent components such as text, image, video, sound, table, shape and other elements. Depending on the size or structure of a document, it may treated as having as single editable section. For example, a text document that includes a single paragraph may have only one editable section.

The method by which a particular document is broken down depends on the nature of the document and on the desired degree of "granularity", which regulates the fineness of independent multi-user editing. For example, a text document in the present embodiment is broken down into independently editable paragraph sections. If, in an alternative embodiment, increased granularity is desired, a text document could be broken down into independently editable sentence, word or even character sections. The use of smaller sections may decrease the efficiency of system 100, depending on the amount of data which must be communicated between a client 116 and a workspace server 112 to allow a user to view and edit each section (in methods 1000–1700, FIGS. 13 to 19). For example, depending on the selection of network 114, a larger or smaller packet of data may have to be communicated for each section. If the section size is selected to be very small (i.e. a character in a text document), then the network communication overhead may become a bottleneck, preventing efficient use of the system. In system 100, paragraph sized sections have been selected as an efficient compromise for a text document.

Each section of a document may be independently locked by a user 102. Different users may lock adjacent (or separated) sections, and independently edit them.

Figure 4:
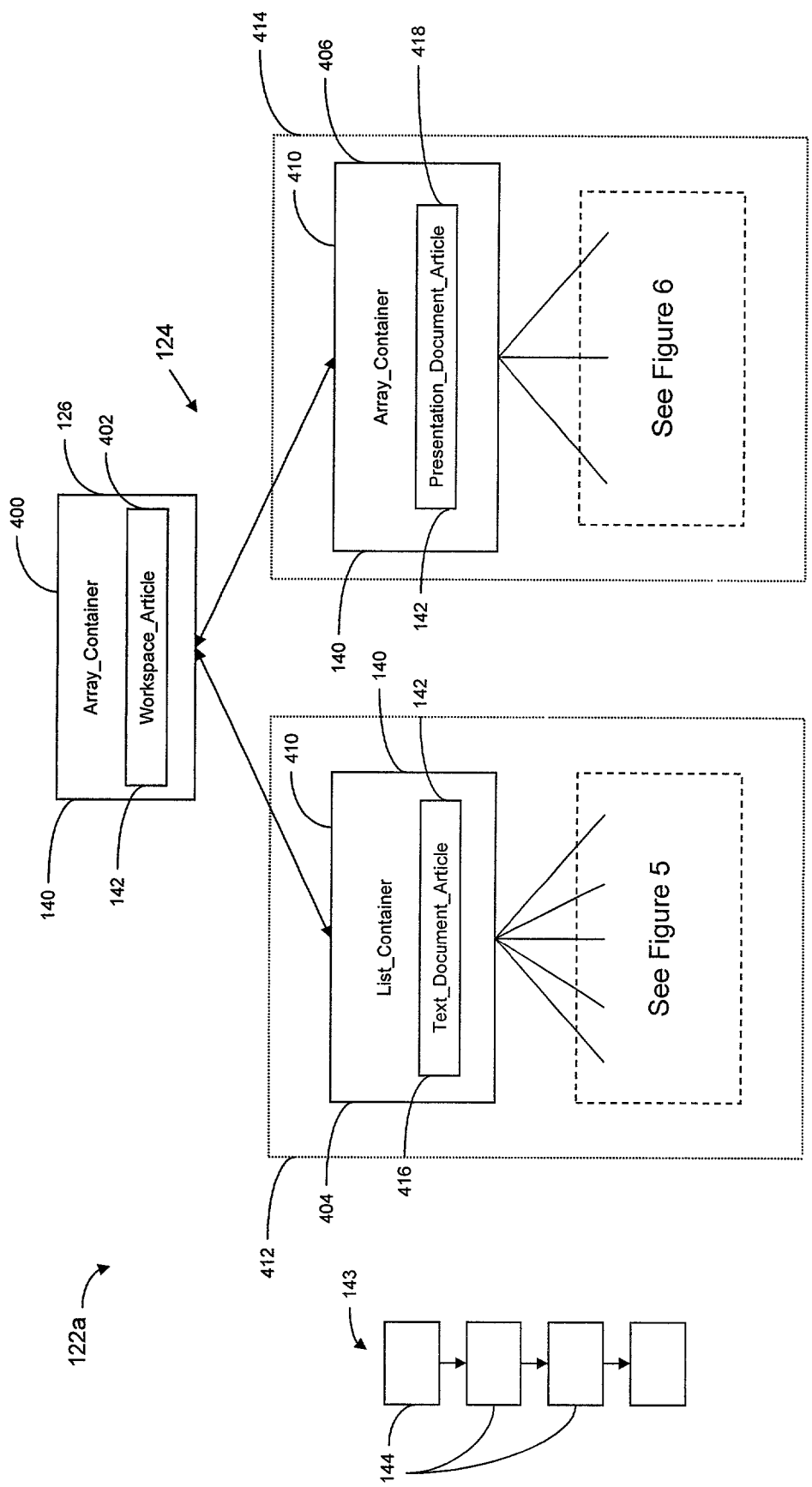
FIGS. 4, 5 and 6 illustrate a workspace of the embodiment of FIG. 1.
Figure 5:
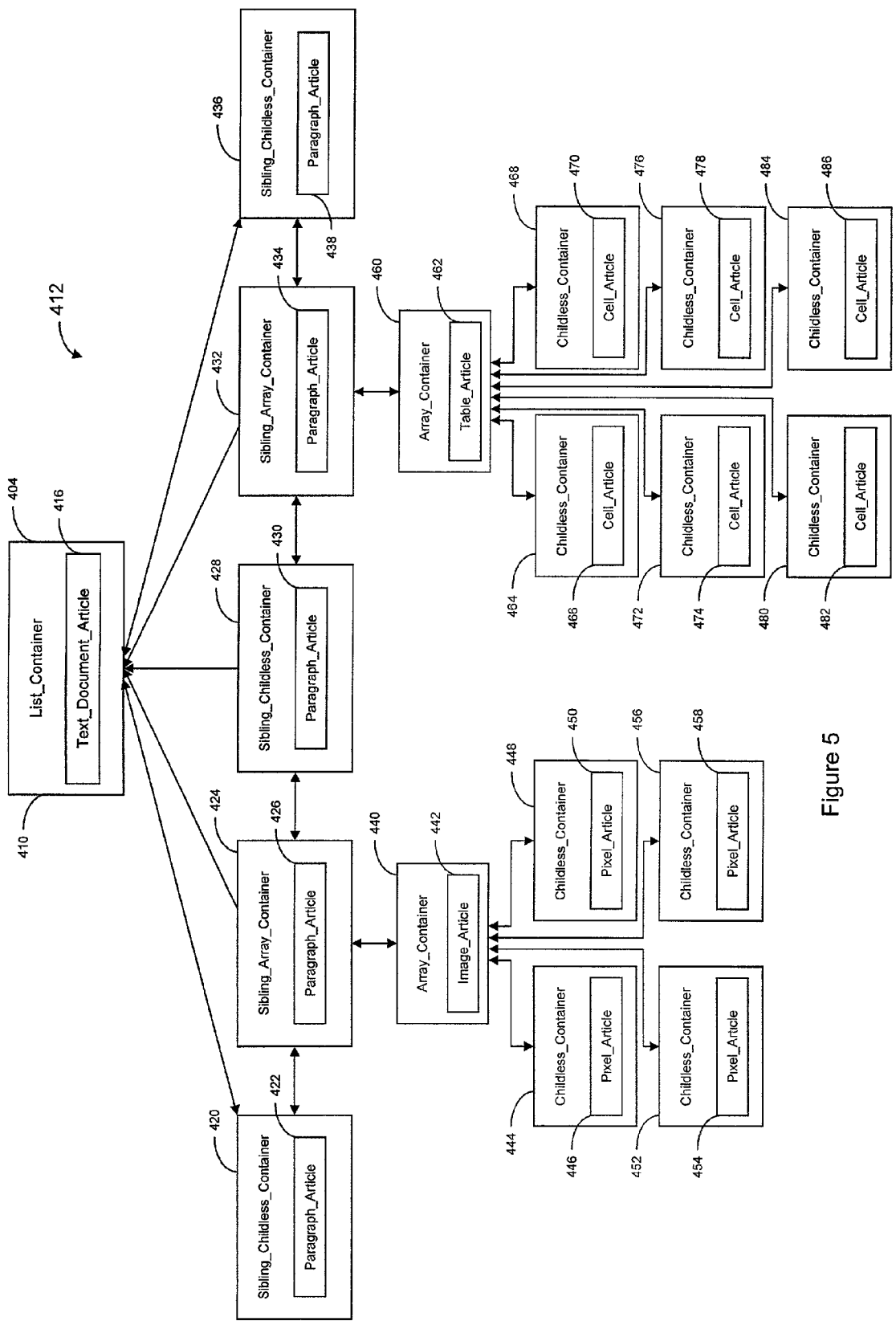
Figure 6:
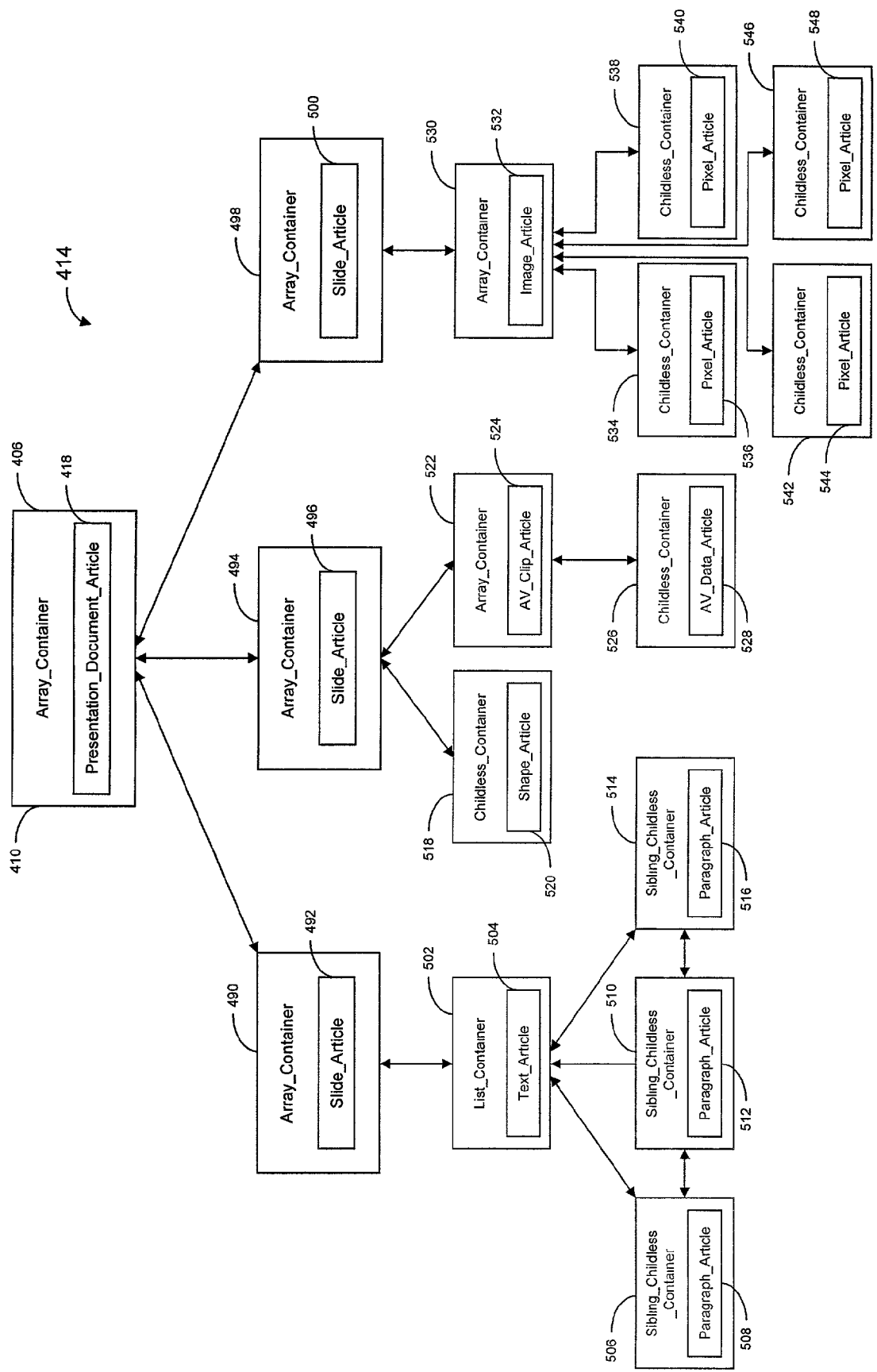

Reference is next made to FIGS. 4, 5 and 6, which illustrate a specific workspace 122a, which is exemplary of the structure of all workspaces 122 according to the present invention. Workspace 122a includes a container tree 124 and a member list 143.

Container tree 124 is a tree data structure with a root node 126 at its head. Each node in workspace 122a consists of a container 140, which is a data structure. Containers 140 at different nodes may have different structures, depending on the relationship between the container 140 and its parent, siblings, and children.

Each container 140 stores an article 142, which in turn stores independently editable data. Articles 142 stored in different containers 140 may also have different structures, depending on their specific contents. (In FIGS. 4, 5 and 6, many containers 140 and articles 142 are not identified with these reference numerals to avoid cluttering the Figures.)

The root node 126 of the container tree 124 comprises a root container 400 that stores a root article 402. The root node 126 of container tree 124 has two child nodes, which comprise containers 404 and 406. These "first-level" children of root container 400 are the "parent containers" 410 of document sub-trees 412 and 414. Each document sub-tree stores all of the information for a particular document. In the present example, document sub-tree 412 stores text document 190 and document sub-tree 414 stores presentation document 200.

Member list 143 includes a linked list of member records 144. Each member record 144 relates to a person who has been given access privileges to workspace 122. The person may be a user 102 of system 100 or may have been invited to join the workspace 122, but has not yet registered as a user of system 100.

Figure 7:
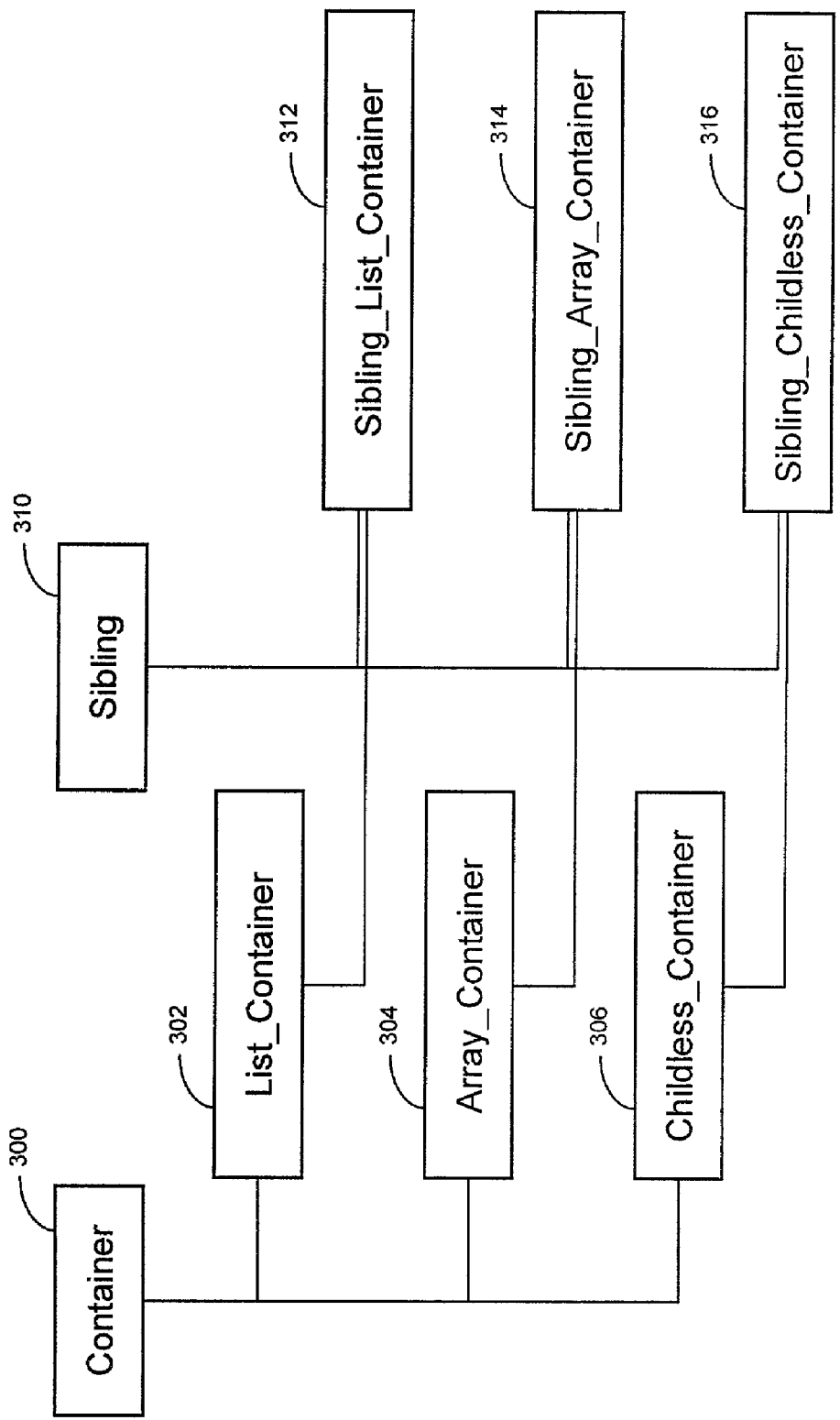
FIG. 7 illustrates a hierarchy of container classes of the embodiment of FIG. 1.

Reference is next made to FIG. 7, which illustrates a hierarchy of container data structures. In this exemplary embodiment of the present invention, each container data structure is defined using object oriented concepts.

A Container class 300 includes the following fields:

| Field | Usage |
| --- | --- |
| container_id | Record an identifier for the container 140. This identifier is unique with respect to all containers in the workspace 122 and may be unique with respect to all workspaces 122. |
| container_parent | A pointer to the parent container of the container 140. The root container 400 of a container tree 124 does not have a parent container, and this field may be Null. |
| container_lock_handle | Used to lock the container 140 and to identify a user 102, if any, that has locked the container 140. |
| container_excluded_handle_list | Used to identify users 102 that are not permitted to access the container 140 or the article 142 contained within it. |
| container_article | A pointer to the article 142 contained within the container. Typically, the article 142 will be a separate data structure that is associated with the container through this pointer. Alternatively, this field may be defined as a data buffer of any data type or structure. |
| container_article_length | Used to record the length of the article 142 associated with the container 140. This will typically be measured in bytes or another measure associated with the article. |
| container_valid | Used by a client 116 to identify whether the container 140 and/or article 142 associated with the container 140 has been modified by a different client 116, requiring the first client to download an updated version of the container 140 before displaying its contents. |
| container_time_stamp | Used to record the last time that the container 140 was updated in file system 104. |

A number of container classes inherit the structure of Container class 300 and add additional fields to it. A List_Container class 302 maintains a list of child containers and is used to store documents (or parts of documents) that may be broken down into sections that have a natural "next" and "previous" relationship between them. List_Container class 302 inherits the structure of Container class 300 and adds the following data fields:

| Field | Usage |
| --- | --- |
| list_head_pointer | A pointer to a container 140 at the head of the list of child containers 140. |
| list_tail_pointer | A pointer to the container 140 at the tail of the list of child containers 140. |

An Array_Container class 304 maintains an array of child containers and is used to store documents (or parts of documents) that may be broken down into sections that may or may not have an ordered relationship between them. The array of child containers may have any number of dimensions and each dimension may have any size. Array_Container class 304 inherits the structure of Container class 300 and adds the following fields:

| Field | Usage |
| --- | --- |
| array_dimensions | Record the number of dimensions and the size of each dimension in the array of pointers to child containers. |
| child_array | Record an array of pointers to child containers 140. In the present exemplary embodiment of the present invention, this array is stored in a growable array, which may be expanded in any dimension, or by adding additional dimensions. Alternatively, a reference to each child container may be stored in a fixed length array of pointers or it may be a linked list of pointers. |

A Childless_Container class 306 inherits the structure of Container class 300. A Childless_Container class 306 does not have any child containers.

A group of container classes, which are collectively referred to as sibling containers, are used to form the list of child containers of a List_Container class 302. A Sibling class 310 is defined to store information common to child containers of a List_Container class 302 and has the following fields:

| Field | Usage |
| --- | --- |
| list_previous_pointer | Points to the previous sibling container in the doubly linked list. In the head sibling container in the doubly linked list this field will typically be Null. |
| list_next_pointer | Points to the next sibling container in the doubly linked list In the tail sibling container in the doubly linked list this field will typically be Null. |

A document that is desirably stored using sibling containers may include a portion that is best represented using one or more List_Containers 302 that also have a sibling relationship between them. A sibling relationship is a natural "next" and "previous" relationship between sections of a document. For example, successive paragraphs in a text document have a sibling relationship based on their order within the text document. A sibling container Sibling_List_Container class 312 is defined which may be used as part of a list of sibling containers, and which may also have its own list of child sibling containers. The Sibling List_Container class 312 inherits the structure of both the Sibling class 310 and List_Container class 302.

A document that is desirably stored using sibling containers may also include a portion that is best represented using one or more Array_Containers 304. A sibling container Sibling_Array_Container class 314 is defined for this purpose that inherits the structure of both Sibling class 310 and Array_Container class 304.

A Sibling_Childless_Container class 316 is defined that inherits the structure of both Sibling class 310 and Childless_Container class 306. The Sibling_Childless_Container class 316 may be used as part of a list of sibling containers but has no child containers.

Container classes List_Container 302 and all containers that inherit the structure of Sibling class 310 may be used to store documents (or parts of documents) that can be divided into portions with a linear relationship between them. These sibling container classes have been described as part of a doubly linked list. The present invention is not limited to the use of a doubly linked list and any other data structure for maintaining a list of elements may be used. For example, the relationship between sibling containers may be represented as a singly linked list or an array of elements. The particular structure of containers 140 used to construct a particular workspace 122 will depend on the type and structure of the documents to be stored in the workspace 122.

Figure 8:
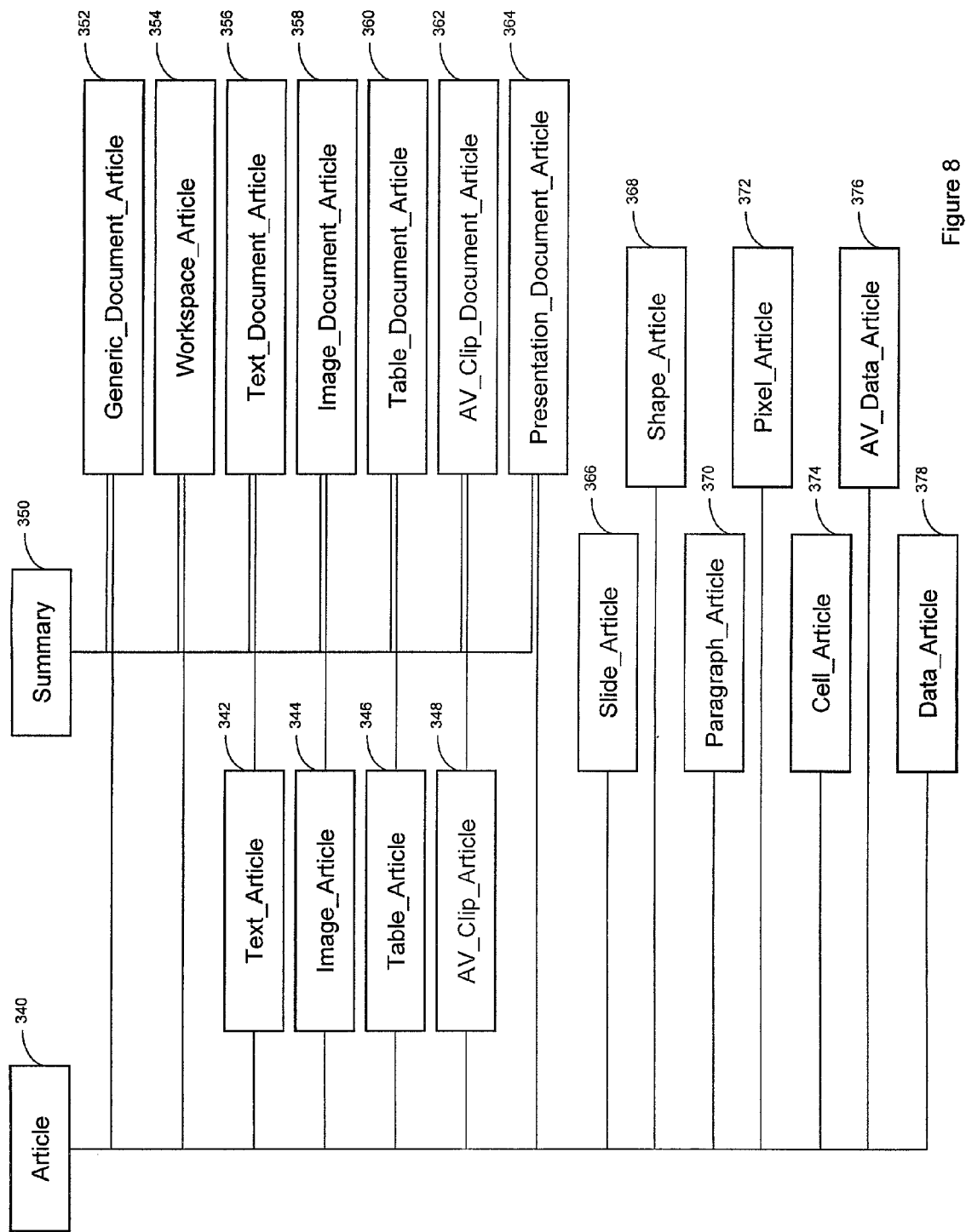
FIG. 8 illustrates a hierarchy of article classes of the embodiment of FIG. 1.

Reference is next made to FIG. 8, which illustrates a hierarchy of article data structures. Articles 142 are used to store sections of documents. In this exemplary embodiment, the structure of each article 142 is defined using object oriented principles.

An Article class 340 includes the following fields which enables all article types that inherit its structure to be embedded in other elements:

| Field | Usage |
| --- | --- |
| article_window | Used to record the position and dimensions, relative to another element, of the window in which the article is displayed, if the article describes data that is embedded in a document, in contrast to data which is part of the main data of a document; If the article is not embedded within a document of a different type, this field will typically be Null. |

Several article classes are defined to store the different data types to be included within a container tree 124.

A Text_Article class 342 is used to record information about text data. Text_Article class 342 inherits the structure of Article class 340 and adds the following field:

| Field | Usage |
| --- | --- |
| text_attributes | Record default text attributes for text data such as typeface, font size and color, style (such as bold, italic and underline), alignment, line spacing and bullet style (if any). |

An Image_Article class 344 is used to record information about graphic image data. Image Article class 344 inherits the structure of Article class 340 and adds the following fields:

| Field | Usage |
| --- | --- |
| image_attributes | Record image information such as the width and height in pixels, color model, number of bits per pixel, horizontal and vertical resolution, compression information. |
| image_thumbnail | Record a thumbnail version (i.e. a smaller version) of the entire graphic image. |

A Table_Article class 346 is used to record information about table type data. Table_Article class 346 inherits the structure of Article class 340 and adds the following field:

| Field | Usage |
| --- | --- |
| table_attributes | Record table information such as the number of rows and columns and the preferred cell sizes. |

An AV_Clip_Article class 348 is used to record information about audio/video clips. An audio/video clip may be composed of only audio data, only video data or a combination of audio and video data. AV_Clip_Article class 348 inherits the structure of Article class 340 and adds the following fields:

| Field | Usage |
| --- | --- |
| AV_format | Record the format in which the audio/video data is stored, including compression/decompression method, sample depth and rate. |
| AV_length | Record the length of the audio/video clip in seconds (or alternatively using another measure, such as the number of frames in the audio/video clip). |

Referring briefly to FIG. 4, each document sub-tree is headed by a parent container 410 (i.e. containers 404 and 406). The structure of each sub-tree will depend on the type and contents of the document stored in the sub-tree. A single document may contain many types of data. For example, text document 190 includes an image 194 and a table 196 (FIG. 2). The primary data type of text document 190 is text, and it includes "image" and "table" type data within it. Text_Article class 342, Image_Article class 344, Table_Article class 346 and AV_Clip Article class 348 may be used to include, respectively, text, image, table, and audio/visual type data within a document sub-tree for a document that has been identified has having a different primary data type. Another embodiment of the present invention may incorporate additional article classes to store other types of data.

A number of article classes are defined to store summary information relating to a workspace or an entire document (depending on the primary data type of the document). A Summary class 350 is defined to store information common to such article classes and has the following fields:

| Field | Usage |
| --- | --- |
| summary_title | Record the title or caption of the workspace 122 or document. |
| summary_description | Record a description of the workspace 122 or document. |
| summary_keywords | Record searchable keywords pertaining to the workspace 122 or document. |
| summary_log | Record log entries made by workspace members over the lifetime of the workspace 122 or document. |
| summary_history | Record the date, time and user handle for important events in the lifetime of the workspace 122 or document, including its creation. In another embodiment, other information may be stored in this information. |

To record information about a workspace 122, a Workspace_Article class 354 is defined that inherits the structure of both Article class 340 and Summary class 350 and adds the following fields:

| Field | Usage |
| --- | --- |
| document_count | Record the number of documents in the workspace 122. This field is optional and in another embodiment, it may be omitted. The number of documents in a workspace may be determined by counting the number of child containers 140 of root container 400 (FIG. 4) of the workspace 122. |

To record information about primarily text type documents, a Text_Document_Article class 356 is defined that inherits the structure of both Text_Article class 342 and Summary class 350 and adds the following fields:

| Field | Usage |
| --- | --- |
| text_document_format | Record formatting information such as page size and orientation, margins. |
| text_document_statistics | Record statistics such as paragraph and word count. |

To record information about primarily image type documents, an Image_Document_Article class 358 is defined that inherits the structure of both Image_Article class 344 and Summary class 350.

To record information about primarily table type documents (which may be referred to as spreadsheet documents), a Table_Document_Article class 360 is defined that inherits the structure of both Table_Article class 346 and Summary class 350.

To record information about primarily audio/visual type documents, an AV_Clip Document_Article class 362 is defined that inherits the structure of both AV_Clip Article class 348 and Summary class 350.

Additional document article classes may be defined in accordance with the present invention for data types that will typically not be found within a document that is of another data type. For example, a Presentation_Document_Article class 364 is defined in the instant embodiment to record information about entire presentation documents. Presentation_Document_Article class 364 inherits the structure of both Article class 340 and Summary class 350 and adds the following fields:

| Field | Usage |
| --- | --- |
| slide_order_table | Record the display order of slides in the presentation using the slide_identifier of each slide in a container of class Slide_Article 366 (described below). |
| default_background | Record default background color or gradient to be displayed on newly created slides. |
| default_title_properties | Record default position and font attributes of text to be displayed on newly created title slides. |
| default_text_properties | Record default position and font attributes of text to be displayed on newly created text slides. |
| default_shapes | Record a collection of graphical elements to be displayed by default on newly created slides. |
| current_slide | Record the slide currently being displayed in an active presentation (i.e. it is currently being presented); when the presentation is not active, this field will be −1. The operation of an active presentation is described below in relation to method 1700 on FIG. 19. |

The present exemplary embodiment supports the storage of generic documents which are of a data type that is not otherwise supported by the embodiment. A Generic_Document_Article class 352 is defined to store information about generic documents. Generic_Document_Article class 352 inherits the structure of Article class 340 and Summary class 350.

If in a particular embodiment of the present invention, it is desirable to allow presentation type data to be embedded within a document of a different primary data type, then a Presentation_Article class having the fields described above for Presentation_Document_Article class 364 with the structure of Article class 340 and without the structure of Summary class 350 could be defined.

A number of article classes are defined for data types that, in the present embodiment of the invention, appear only within documents that have a different primary data type.

A Slide_Article class 366 is defined to store the information relating to slides in a presentation document. Slide_Article class 366 inherits the structure of Article class 340 and adds the following fields:

| Field | Usage |
|---|---|
| slide_identifier | Record the unique identifier of the slide within the presentation. In this exemplary embodiment, the unique container_id of the of the container within which the Slide_Article is contained. In another embodiment, this field may be set in a different manner. In another embodiment where the container_id is used for this field, the field may be omitted and the container_id field of the container may be used in an equivalent manner. |
| slide_type | Record the type of slide (such as title, text slide or blank) to guide the default display and attributes of slide-specific elements. In the present exemplary embodiment, several standard slide types are defined, including text, title and blank slides. The format of all slides of a particular type may be modified by modifying an associated default slide format. |
| slide_background | Record the background color or gradient if it differs from the default stored in the default_background field of an associated Presentation_Document_Article class 364. |
| default_shapes_flag | Record a flag indicating whether or not the default shapes stored in the default_shapes field of an associated Presentation_Document_Article class 364 are to be displayed. |
| advancement_effect | Record the type of graphical effect to be used as the slide is advanced during a presentation. |
| advancement_interval | Record the time interval for automatic slide advancement. |

To record information about graphical shapes that are embeddable in slides, a Shape_Article class 368 is defined that inherits the structure of Article class 340 and adds the following fields:

| Field | Usage |
|---|---|
| shape_type | Record the type of shape (line, rectangle, ellipse, arrow etc). |
| shape_attributes | Record shape-specific information, such as major and minor semiaxis in the case of an ellipse, required to create an instance of the shape. |

A Paragraph_Article class 370 is used to store character and formatting information for a paragraph of text. Paragraph_Article class 370 inherits the structure of Article class 340 and adds the following fields:

| Field | Usage |
|---|---|
| character_data | Record an array of character data for the paragraph. |
| formatting_data | Record differences in the character formatting between the data in the character_data field and the default attributes set out in the text_attributes |

-continued

| Field | Usage |
|---|---|
| | field of an associated Text_Article 342. In the present embodiment, this is done by recording the type of formatting change and the offset from the beginning of the character_data field at which the change occurs. For example, a formatting attribute that applies to all data in the character_data field begins at offset 0. In an alternative embodiment, this field may be omitted and formatting data may be embedded within the character_data field. |
| change_tracking_data | Record array offsets, member handles and time stamps of editing changes. |

A Pixel_Article class 372 is used to store pixel data for graphic images. Pixel_Article class 372 inherits the structure of Article class 340 and adds the following field:

| Field | Usage |
|---|---|
| pixel_data | Record pixel data for a graphic image. |

A Cell_Article class 374 is defined to store data for cells within tables (or spreadsheets). Cell_Article class 374 inherits the structure of Article class 340 and adds the following field:

| Field | Usage |
|---|---|
| cell_data | contains a data value for the cell, which may be alphanumeric or a formula for calculating a value for the cell, which may be based on the value of other cells. |

An AV_Data_Article class 376 is used to store segments of audio/video clips or movies. AV_Data_Article class 376 inherits the structure of Article class 340 and adds the following field:

| Field | Usage |
|---|---|
| av_data | Record the audio/video data for the segment. |

A Data_Article class 378 is used to store data associated with generic documents. Data_Article class 378 inherits the structure of Article class 340.

The present invention is not limited to the use of objected oriented techniques to define the structure of containers 140 and articles 142 and any mechanism for defining data structures having the same operation and function as those described above may be used. For example, independent data structures may be defined for each container and article subclass. Alternatively, independent variables may be defined for each field in a data structure, without formally defining the structural relationship of the fields.

The data of a document may be divided between different types of articles 142. For example, the appearance of a slide in a presentation document may depend on the contents of a Presentation_Document_Article 364 (in particular, the default_background field, default_text_properties field, and default_shapes field), a Slide_Article 366 (in particular, the slide_background field and default_shapes field), and several Shape_Articles 368.

The data of a document may alternately be stored within a single article 142. Articles 370, 372, 374 and 376 have been described as being used to store independently editable subdivisions of a document. In fact, an article, such as articles 370, 372, 374 and 376, may store all of the editable data within a document. For example a short text document may be stored in a single Paragraph_Article 370.

Reference is again made to FIGS. 4, 5 and 6, which illustrate exemplary workspace 122*a*. Workspace 122*a* is used to store exemplary text document 190 and exemplary presentation document 200. The root node 126 of workspace 122*a* comprises root container 400 of class Array_Container 304 (FIG. 7). The container_article field of container 400 contains (or includes a pointer that points to) a root article 402 of class Workspace_Article 354 (FIG. 8). Container 400 has the following contents:

| Field | Contents |
|---|---|
| container_id | 1234 |
| container_parent | Null |
| container_lock_handle | Null |
| container_excluded_list_handle | Null |
| container_article | 402 |
| container_article_length | 724 bytes |
| container_valid | TRUE |
| container_time_stamp | June 10, 2001 : 13:36:43 |
| array_dimensions | 2 × 1 |
| child_array | [404 406] |

Root container 400 has a unique container_id of 1234. The unique container_id is assigned to each container 140 when the container 140 is created, as is described below. The container_parent field of container 400 has a value of Null, since root container 400 is at the root node 126 of container tree 124 and accordingly has no parent container. The container_lock_handle of root container 400 also has a value of Null, indicating that container 400 is not locked by any user 102. The container_excluded_handle_list also has a value of Null, indicating that no user 102 is excluded from accessing root container 400. (Access to root container 400 and the remainder of container tree 124 is also regulated by membership in workspace 122, which is described below.) The container_article field of root container 400 points to article 402, which has a length of 724 bytes (as indicated by the container_article_length field). The container_valid field has a value of TRUE, indicating that the contents of the container 400, and the associated article 402 have not been changed by a client 116. The container_time_stamp field records that the container 400 was last updated in file system 104 on Jun. 10, 2001 at 13:36:43. The array_dimensions field indicates that the array of child containers 140 is one dimensional and contains two elements in its sole dimension. The child_array field contains a one dimensional array storing pointers to containers 404 and 406 as child containers of container 400.

Root article 402 is of class Workspace_Article 354 and has the following contents:

| Field | Contents |
|---|---|
| article_window | Null |
| summary_title | Exemplary workspace |
| summary_description | Exemplary workspace for patent application |

-continued

| Field | Contents |
|---|---|
| summary_keywords | exemplary, patent |
| summary_log | June 7, 2001, 11:06:14 rpw1: I created this workspace to store documents relating to my patent application |
| summary_history | June 7, 2001: 11:04:27, rpw1, CREATE |
| document_count | 2 |

The article_window field of root article 402 is Null, indicating that the root article 402 is not embedded within a document having a data type different from data of the root article 402. Root article 402 identifies the name of workspace 122 as "Exemplary workspace" (in the summary_title field), describes the workspace as "Exemplary workspace for patent application" (in the description field). The keywords field of root article 402 indicate that workspace 122*b* can be searched for by using the keywords "exemplary" and "patent" using a workspace searching engine built into master server 110. (The structure and operation of the workspace searching engine is typical and will be understood by skilled persons and are not described in detail. Typically, workspace searching engine may be activated from any screen of a client 116, which is described in greater detail below.) The summary_log field records the first entry in the log. The summary_history field records the date and time of the "CREATE" event and the workspace creator's handle. The document_count field indicates that there are two documents in the workspace.

The root container 400 of a container tree 124 has one child container for each document that is stored in the workspace 122. Each of the child containers of the root container is a parent container 410 of a document sub-tree that stores the contents of the associated document. In workspace 122*a*, root container 400 has two child containers 404 and 406. Containers 404 and 406 are parent containers 410, respectively, for document sub-tree 412, in which text document 190 is stored, and for document sub-tree 414, in which presentation document 200 is stored. The article contained within each parent container 410 is referred to as a parent article.

In the present embodiment, text documents, such as document 190 are broken down into paragraph sections. The order of paragraphs in a text document is defined by their order of appearance in the document, and each paragraph may be said to have a "previous" and "next" relationship with its adjacent paragraphs. (The first paragraph has no "previous" paragraph and the last paragraph has no "next" paragraph.) The previous and next ordering of paragraphs is maintained in document sub-tree 412 by storing the paragraph sections in a linked list formed of sibling containers 140. The storage of text document 190 in document sub-tree 412 will now be explained with reference to FIG. 5.

Parent container 404 is of class List_Container 302 and has the following contents:

| Field | Contents |
|---|---|
| container_id | 2123 |
| container_parent | 400 |
| container_lock_handle | Null |
| container_excluded_handle_list | Null |
| container_article | 416 |
| container_article_length | 786 bytes |

-continued

| Field | Contents |
|---|---|
| container_valid | TRUE |
| container_time_stamp | June 20, 2001 : 08:54:17 |
| list_head_pointer | 420 |
| list_tail_pointer | 436 |

The container_id, container_parent, container_lock_handle, container_excluded_handle_list, container_article_length, container_valid and container_time_stamp fields are analogous to the corresponding fields of root container 400. The container_article field points to article 416, which is of class Text_Document_Article 356. As illustrated in FIG. 5, container 404 has five child containers: containers 420, 424, 428, 432 and 436, which formed a list. The list_head_pointer field of container 404 points to container 420, the first container in the list and the list tail pointer field of container 404 points to container 436, the last container in the list.

Parent article 416 is of class Text_Document_Article 356, indicating that the document stored in sub-tree 412 is a text document. Parent article 416 has the following contents:

| Field | Contents |
|---|---|
| article_window | Null |
| text_attributes | Arial, 12 point, black, left justification, single spacing |
| summary_title | Patent Description |
| summary_description | Description of Thoughtslinger collaborative editing system |
| summary_keywords | collaborative, editing |
| summary_log | June 10, 2001, 16:52:33 cs1: Began writing description of system<br>June 15, 2001, 04:23:12 cs1: Finished first draft |
| summary_history | June 10, 2001, 16:50:32 cs1: CREATE |
| text_document_format | 8.5 × 11 paper, portrait orientation, top margin: 1 inch; left margin: 1 inch; right margin 0.5 inches; bottom margin: 1.5 inches; page number: (format: "-#-", position bottom center) |
| text_document_statistics | 7234 words; 511 lines; 103 paragraphs |

The text_attributes field indicates the default format for each section of the text document 190. The text_document_format indicates the document format of document 190. The text attributes of text data within document 190 may be changed and any such changes are stored in containers 420, 424, 428, 432 and 436. The text_document_statistics field indicates the number of words, lines and paragraphs contained in the document 190. The summary_title field sets out the title of document 190. The remaining fields of article 416 are analogous to those of article 404.

As described above, the present exemplary embodiment divides text document 190 into paragraph sections for storage in its document sub-tree 412. Text document 190 contains 5 paragraphs 192a–192e. Accordingly, the text of text document 190 is stored in the 5 child containers of container 404: 420, 424, 428, 432, 436.

Container 420, which is at the head of the list of child containers 420, 424, 15 428, 432, 436 of container 404 is of class Sibling_Childless_Container 316 and has the following contents:

| Field | Contents |
|---|---|
| container_id | 3123 |
| container_parent | 404 |
| container_lock_handle | Null |
| container_excluded_list_handle | Null |
| container_article | 422 |
| container_article_length | 4323 bytes |
| container_valid | TRUE |
| container_time_stamp | June 19, 2001 : 17:35:14 |
| list_previous_pointer | Null |
| list_next_pointer | 424 |

The list_previous pointer of container 420 is Null since it is the first container in the list of sibling child containers of parent container 404. The list next pointer of container 420 points to container 424. The container article 420 field points to article 422, which has a length of 4323 bytes (as indicated by the container_article_length field). Article 422 is of class Paragraph Article 370 and has the following contents:

| Field | Contents |
|---|---|
| article_window | Null |
| character_data | <Text of paragraph 192a> |
| formatting_data | offset 23: bold+italic on; offset 39: bold+italic off |
| change_tracking_data | offsets 17–35: rpw1, delete, 10-7-2001 14:22:16 |

The article_window field of article 422 is Null, indicating the data in article 422 is part of the main body of text document 190. The character_data field contains the text of paragraph 192a. This text is initially presented in accordance with the text formatting set out in the text_attributes field of article 416.

The formatting_data field is used to modify the initial text and document formatting. The formatting_data indicates that, beginning with the $23^{rd}$ character from the beginning of the character_data, the text is to be bolded and italicized. These formatting attributes are to be turned off beginning with the $39^{th}$ character in the character_data. The change_tracking_data field indicates that text in the range between offsets of 17 and 35 characters from the beginning of the character_data was deleted by a user with the user_handle rpw1 on Jul. 10, 2001 at 14:22:16. The use of the formatting_data and change_tracking_data fields to specify formatting changes and to track editing changes in the character_data is optional. Alternatively, such information may be embedded within the character_data itself at the offsets specified in the formatting_data and change_tracking_data fields.

The second paragraph of text document 190, paragraph 192b (FIG. 2), is stored in container 424 (and its children). Container 424 is of class Sibling_Array_Container 314 and has the following contents:

| Field | Contents |
|---|---|
| container_id | 3124 |
| container_parent | 404 |
| container_lock_handle | Null |
| container_excluded_list_handle | Null |
| container_article | 426 |

-continued

| Field | Contents |
| --- | --- |
| container_article_length | 2326 bytes |
| container_valid | TRUE |
| container_time_stamp | June 26, 2001 : 14:22:16 |
| list_previous_pointer | 420 |
| list_next_pointer | 428 |
| array_dimensions | 1 × 1 |
| child_array | [440] |

The text of paragraph 192b is stored in article 426, which is similar to article 422. The contents of article 426 are set out in Appendix A. In addition to text, paragraph 192b also contains a graphic image 194. The present embodiment stores graphic images using an Array_Container 304 (FIG. 7) having one or more child containers to store the graphic image. Graphic image 192 is stored using container 440 and its child containers. Container 440 is the only child of container 424 and is of class Array_Container 304 (FIG. 7) and has the following contents:

Container 440 (Class Array_Container 304)

| Field | Contents |
| --- | --- |
| container_id | 4123 |
| container_parent | 428 |
| container_lock_handle | Null |
| container_excluded_list_handle | Null |
| container_article | 442 |
| container_article_length | 234 bytes |
| container_valid | TRUE |
| container_time_stamp | June 20, 2001: 08:14:09 |
| array_dimensions | 2 × 2 |
| child_array | $\begin{bmatrix} 444 & 448 \\ 452 & 456 \end{bmatrix}$ |

Container 440 contains an article 442 and the child_array defines a two by two array of pointers to child containers 444, 448, 452, 456. Article 442 is of class Image_Article 344 (FIG. 8) and has the following contents:

Article 442 (Class Image_Article 344)

| Field | Contents |
| --- | --- |
| article_window | x=175, y=0, width=200, height=100 |
| image_attributes | width: 100; height: 150; model: RGB color; bits per pixel: 24; horizontal resolution: 300 pixels per inch; vertical resolution: 300 pixels per inch; compression: JPEG |
| image_thumbnail | JPEG Thumbnail data |

The article_window field of article 442 is used to define the position at which graphic image 194 is displayed relative to paragraph 192b, in which graphic image 194 is embedded. The article_window field indicates that graphic image 194 is to be displayed in a 200×100 pixel window positioned 175 pixels right and 0 pixels down from a selected anchor point in paragraph 192b. Typically, the anchor point will be the upper left corner of the paragraph, although any other anchor point may be used. The article_window field may also be used to define attributes of the window such as the anchor point, the color and thickness of a border for the window, the spacing between the edge of the window and the graphic image, etc. A skilled person will be capable of selecting appropriate attributes for any particular embodiment of the present invention and for any particular graphic image.

The image_attributes field of the article 442 is used to define attributes of graphic image 194. Graphic image 194 is defined as a 100×150 pixel image using a 24 bit RGB color model with horizontal and vertical resolutions of 300 pixels per inch. The image is stored using JPEG compression. The image thumbnail field stores the thumbnail image data which may be used as an icon for graphic image 194 or for other purposes.

When graphic image 194 is displayed, it may be shrunk or stretched horizontally and vertically to fit its dimensions into the window in which it is displayed. In this example, graphic image 194 has an actual size of 100×150 pixels and will be displayed in a window of 200×100 pixels. To accomplish this, graphic image 194 will have to be horizontally stretched and vertically compressed.

Container 440 has four child containers 444, 448, 452, 456, each containing an article of class Pixel_Article 372. Container 444 and its article 446 have the following contents:

| Field | Contents |
| --- | --- |
| container_id | 5890 |
| container_parent | 440 |
| container_lock_handle | Null |
| container_excluded_list_handle | Null |
| container_article | 446 |
| container_article_length | 11250 bytes |
| container_valid | TRUE |
| container_time_stamp | June 20, 2001 : 08:14:09 |

| Field | Contents |
| --- | --- |
| article_window | Null |
| pixel_data | <50 × 75 pixel image - upper left section of image 194> |

The pixel_data field of article 446 contains a 50×75 pixel image, which corresponds to the upper left section of graphic image 194. The remainder of graphic image 194 is stored in articles 450, 454 and 458, the contents of which are set out in Appendix A. Graphic image 194 is thus divided into four sections which may be independently edited.

In an alternative embodiment, a graphic image may be divided into layer sections rather (or possibly in addition to) pixel block sections. Each layer section would be stored in a separate container. If the graphic image is divided into layer sections which are then divided into pixel sections, the Image_Article 344 (or Image_Document_Article 358) would have a three-dimensional array of child containers, each of would contain a Pixel_Article 372.

Paragraph 192c of the text document 190 is stored in container 428 which includes article 430, the contents of which are set out in Appendix A. The contents of container 428 and article 430 are analogous to the contents of containers 420 and 424 and articles 422 and 426.

Paragraph 192d (FIG. 2) has no text component and includes table 196. Paragraph 192d is stored in container 432, container 460 and its child containers 464, 468, 472,

476, 480 and 484. Paragraph 192*d* is divided and stored in a manner similar to the manner in which graphic image 194 is divided and stored in container 424 and its child containers. The sub-tree headed by container 432 is set out in Appendix A.

Article 434, which is part of container 432, has the following structure:

| Field | Contents |
| --- | --- |
| article_window | Null |
| character_data | Null (Paragraph 192d contains no text, although text may be added in the future) |
| formatting_data | Null |
| change_tracking_data | Null |

Since paragraph 192*d* contains no text, the character_data field of article 434 is Null. If any text is subsequently added to the paragraph, it will be added to the character_data field and the change tracking data field will be updated accordingly if change tracking is enabled.

Table 196 has a 2×3 cell array, and is naturally divided into six sections, each of which corresponds to one cell. Container 432 has a single child container 460 of class Array_Container 304, which has the following contents:

| Container 460 (Class Array_Container 304) | |
| --- | --- |
| Field | Contents |
| container_id | 4124 |
| container_parent | 432 |
| container_lock_handle | Null |
| container_excluded_list_handle | Null |
| container_article | 462 |
| container_article_length | 234 bytes |
| container_valid | TRUE |
| container_time_stamp | June 25, 2001: 10:58:51 |
| array_dimensions | 2 × 3 |
| child_array | $\begin{bmatrix} 464 & 468 \\ 472 & 476 \\ 480 & 484 \end{bmatrix}$ |

Container 460 has 6 child containers 464, 468, 472, 476, 480, 484, each of which corresponds to one cell of table 196. The appearance of table 196 within document 190 is defined in article 462, which has the following contents:

| Field | Contents |
| --- | --- |
| article_window | x=12, y=0, width=200, height=375 |
| table_attributes | 3 rows, 2 columns; preferred cell size 100 × 125 pixels |

The article_window field of article 462 indicates that table 196 is to be displayed in a 200×375 pixel window positioned 12 pixels right and 0 pixels down from the anchor point of paragraphs 192*d*. The table_attributes field indicates that the 200×375 pixel window is to be divided in a 2 column by 3 row array with each cell preferably having dimensions of 100 pixels by 125 pixels.

Each cell of table 196 is stored in one of the child containers 464, 468, 472, 476, 480, 484 of container 460. Container 464 and its article 466 correspond to the cell at the (1,1) position of table 196 and have the following contents:

| Field | Contents |
| --- | --- |
| container_id | 5894 |
| container_parent | 460 |
| container_lock_handle | Null |
| container_excluded_list_handle | Null |
| container_article | 466 |
| container_article_length | 32 bytes |
| container_valid | TRUE |
| container_time_stamp | June 25, 2001 : 10:54:16 |

| Field | Contents |
| --- | --- |
| article_window | Null |
| cell_data | <contents of cell (1, 1) of table 196> |

The cell_data field of article 466 contains the contents of cell (1,1) of table 196. These contents may be text, numeric, a formula that utilizes the contents of other cells in table 196, or any other type of data object, including a reference to a data object stored in another location (for example, on the Internet at another location). A cell of a table may also include data such as a graphic image, which will be stored in the same manner as graphic image 194: a container such as container 440 will be used to record the structure and display attributes of the graphic image and one or more child containers, such as containers 444, 448, 452, 456, will be used to store the graphic image.

The remaining cells of table 196 are stored in articles 470, 474, 478, 482, 486, which are set out in Appendix A.

Paragraph 192*e* of text document 190 is stored in container 436 and article 438 in a manner analogous to the storage of paragraph 192*a* in container 420 and article 422. Container 436 and article 438 are set out in Appendix A. Since paragraph 192*e* is the last paragraph of text document 190, the list_next_pointer of container 436 is Null.

In this manner, text document 190 is stored within document sub-tree 412. The structure described here for the storage of a text document is only exemplary, and may be modified depending on the specific requirement of another embodiment of the present invention. In particular, an alternative embodiment may store a text document using a document sub-tree with higher or lower granularity, depending the desired degree of simultaneous editing by different users, while taking into account the potential efficiency trade-offs mentioned above.

The particular rules by which a document is stored in a sub-tree are predetermined for each document type in any embodiment of present invention. In the exemplary document sub-tree 412, document 190 has been divided into paragraph sized sections, and non-text data embedded within a paragraph is stored in a set of child containers below the primary container for the paragraph (i.e. graphic image 194 is stored in container 440 and its children below container 424). This method of embedding data within a paragraph is not limited to data having a different data type than the main data type of a document. A text document may have a paragraph with primary text and embedded text which is to be displayed in a window. Such embedded text may be stored below the primary container for the paragraph using a List_Container 302 (since the embedded data is text, which has a natural next and previous relationship between its sections) which may have one or more child sibling containers connected in a list to store the sections of the embedded text. Such embedded text may be displayed in a window, the attributes of which will be defined in the article_window field of a Text_Article 342 within the List_Container 302.

Reference is next made to FIG. 6, which illustrates the storage of presentation document 200 in document sub-tree 414. The parent container 410 of document sub-tree is container 406, which has the following contents:

| Field | Contents |
| --- | --- |
| container_id | 2124 |
| container_parent | 400 |
| container_lock_handle | Null |
| container_excluded_list_handle | Null |
| container_article | 418 |
| container_article_length | 234 bytes |
| container_valid | TRUE |
| container_time_stamp | July 5, 2001 : 17:12:41 |
| array_dimensions | 3 × 1 |
| child_array | [490 494 498] |

Container 406 has one child container for each slide 202, 204, 206 in presentation document 200: containers 490, 494, 498.

Container 406 contains an article 418 of class Presentation_Document_Article 364 and having the following contents:

| Field | Contents |
| --- | --- |
| article_window | Null |
| summary_title | Intellectual Property Presentation |
| summary_description | Presentation relating to patent application |
| summary_keywords | patent |
| summary_log | July 5, 2001, 16:52:33 cs1: Started first draft of presentation using provisional application |
| summary_history | July 5, 2001, 16:55:00 cs1: CREATE |
| slide_order_table | [3134, 3132, 3133] |
| default_background | vertical gradient, blue (top) to black (bottom) |
| default_title_properties | Helvetica, 16 point, bold, x=20 pixels, y=30 pixels, width=300 pixels, height=100 pixels |
| default_text_properties | Times Roman, 14 point, round bullet, x=20 pixels, y=100 pixels, width=200 pixels, height=200 pixels |
| default_shapes | line: p1.x=30, p1.y=0, p2.x=30, p2.y=400, thickness=5, color=red<br>logo text: "Thoughtslinger", font=Garamond, 9 point, normal, x=720, y=540, width=40, height=10 |
| current_slide | −1 (live presentation not presently underway) |

The slide_order_table field defines the display order of the slides in the presentation document, using the slide_identifier of each slide's associated Slide_Article. This allows the order of slides in the presentation to be changed by simply modifying the slide_order_table field. In another embodiment of the present invention, the order of slides in a presentation document could be defined by the order in which the container for each slide appears in the child_array field of the parent container for the document sub-tree (i.e. container 406). In another alternative embodiment of the present invention, a List_Container 302 could be used as the parent container of the document sub-tree for a presentation document and the order of slides could be defined by the position of each slide's associated sibling container in the list of child sibling containers for the List_Container.

The default_background, default_title_properties, default_text_properties and default_shapes fields define default properties for the display of the slides of document presentation 200. The current_slide field indicates that a live presentation is not currently being conducted using presentation 200.

Slide 202 is stored in container 490 and its children. Container 490 is of class Array_Container and contains an article 492 of class Slide_Article 366. Container 490 and Article 492 have the following contents:

| Field | Contents |
| --- | --- |
| container_id | 3132 |
| container_parent | 406 |
| container_lock_handle | Null |
| container_excluded_list_handle | Null |
| container_article | 492 |
| container_article_length | 1364 bytes |
| container_valid | TRUE |
| container_time_stamp | July 5, 2001 : 17:16:11 |
| array_dimensions | 1 × 1 |
| child_array | [502] |

| Article 492 (Class Slide_Article 366) | |
| --- | --- |
| Field | Contents |
| article_window | Null |
| slide_identifier | 3132 |
| slide_type | Text slide |
| slide_background | Null (use default background) |
| default_shapes_flag | TRUE (display default shapes) |
| advancement_effect | Fade through black |
| advancement_interval | 3 seconds |

Container 490 has a single child container 502. Article 492 defines the slide_identifier of slide 202 as 01 and indicates that slide 202 is a Text slide. The slide_background field indicates that the default_background set out in article 418 is to be displayed on slide 202. The default_shapes_flag indicates that the default shapes defined in article 418 are to be displayed on slide 202. The advancement_effect defines the visual effect used to display slide 202 during a presentation. The advancement_interval field defines the time interval for display of slide 202 during an automatically advancing presentation.

Container 502 is of class List_Container 302 and contains an article 504 of class Text_Article 342. Container 502 and Article 504 have the following contents:

| Field | Contents |
| --- | --- |
| container_id | 4125 |
| container_parent | 490 |
| container_lock_handle | Null |
| container_excluded_list_handle | Null |
| container_article | 504 |
| container_article_length | 786 bytes |
| container_valid | TRUE |
| container_time_stamp | July 5, 2001 : 17:16:11 |
| list_head_pointer | 506 |
| list_tail_pointer | 514 |

| Field | Contents |
|---|---|
| article_window | x = 100, y = 75, width = 430, height = 300 |
| text_attributes | Helvetica, 18 point, yellow, left justification, single spacing |

Container 502 has a list of three child sibling containers: containers 506, 510, 514, which are linked together in a list. The article_window field of article 504 defines the window in which the text sections of slide 202 are to be displayed relative to an anchor point of slide 202. Typically, the anchor point will be the upper left corner of the slide, although any other anchor point may be used. The text_attributes field of article 504 defines the default attributes of the text sections of slide 202.

The text sections 214*a*, 214*b*, 214*c* of slide 202 are stored in containers 506, 510 and 514. Container 506 is of class Sibling_Childless_Container 316 and contains an article 508 of class Paragraph_Article 370. The contents of the container 506 are set out in Appendix A. Article 508 has the following contents:

| Field | Contents |
|---|---|
| article_window | Null |
| character_data | <Text of paragraph 214a> |
| formatting_data | bullet style: square |
| change_tracking_data | Null |

The article_window field of article 508 is Null, so the text of paragraph 214*a* (stored in the character_data field) will be displayed in the article_window defined in article 504. The formatting_data field modifies the default bullet style defined in the default_text_properties in article 418.

Containers 510 and 514 and their associated articles 512 and 516 are set out in Appendix A.

Slide 204 is stored in container 494 and its children. Container 494 is of class Array_Container 304, which has the following contents:

| Field | Contents |
|---|---|
| container_id | 3133 |
| container_parent | 406 |
| container_lock_handle | Null |
| container_excluded_list_handle | Null |
| container_article | 496 |
| container_article_length | 345 bytes |
| container_valid | TRUE |
| container_time_stamp | July 5, 2001 : 17:24:44 |
| array_dimensions | 2×1 |
| child_array | [518 522] |

Container 494 has two child containers 518, 522 to store the two elements of slide 204 (arrow 216 and audio/video clip 218) that are not defined as default shapes in article 418. Container 494 contains an article 496 of class Slide_Article 366, which has the following contents:

| Field | Contents |
|---|---|
| article_window | Null |
| slide_identifier | 3133 |
| slide_type | Blank slide |
| slide_background | Null (use default background) |
| default_shapes_flag | TRUE (display default shapes) |
| advancement_effect | Fade through black |
| advancement_interval | 3 seconds |

The slide_type field article 496 designates slide 204 as a blank slide, on which the elements defined in the child containers of container 494 are displayed.

Arrow shape 216 is stored in container 518 which is of class Childless_Container 306 and article 520 which is of class Shape_Article 368. Container 518 is set out in Appendix A. Article 520 has the following contents:

| Field | Contents |
|---|---|
| article_window | Null |
| shape_type | Arrow |
| shape_attributes | x = 500, y = 80, width = 100, height = 200, color = blue, line thickness = 2, fill = none, direction = down |

Article 520 defines arrow shape 216 as an arrow positioned 500 pixels right and 80 pixels down from the anchor point of slide 204, and having a width of 100 pixels, a height of 200 pixels as well as the other attributes listed in the shape_attributes field.

Audio/video clip 218 is stored in containers 522, 526. Container 522 is of type Array Container 304 and contains an article 524 of type AV_Clip_Article. Container 522 is set out in Appendix A. Article 524 has the following contents:

| Field | Contents |
|---|---|
| article_window | x = 300, y = 280, width = 320, height = 200 |
| AV_format | MPEG |
| AV_length | 12800 frames |

Article 524 defines audio/video clip 218 as an MPEG format audio/video clip having 12800 frames that will be displayed in a 320×200 pixel window positioned 300 pixels right and 280 pixels down from the anchor point of slide 204. The data of audio/video clip 218 is stored in article 528 of container 526. Container 526 is of class Childless_Container and is set out in Appendix A. Article 528 is of class AV_Data_Article 376 and has the following contents:

| Field | Contents |
|---|---|
| article_window | Null |
| av_data | <encoded audio/visual data of clip 218> |

The av_data field of article 528 contains audio/video clip 218.

Slide 206 is stored in container 498, container 530, and its child containers 534, 538, 542, 546 and their associated articles 500, 532, 536, 540, 544, 548. Slide 206 has a single element: graphic image 220. Graphic image 220 is divided into four sections, which are stored in containers 534, 538, 542, 546 in a manner analogous to the storage of graphic image 194 of text document 190 (FIG. 2) in container 440 and its child containers (FIG. 5). Containers 498, 530, 534, 538, 542, 546 are set out in Appendix A.

The structure of container tree 124 is directly related to the types of documents (text document 190 and presentation document 200) stored in container tree 124, and to the contents of the documents. In addition, the structure of container tree 124 depends on the specific containers and articles selected for a specific embodiment of the present invention. For example, text documents may be divided into differently sized sections. Similarly, other types of documents may divided into differently sized independently editable sections with greater or lesser granularity. Many different kinds of container 140 are possible. For example, a List_And_Array_Container class (not shown) maintains a list of child sibling containers and also maintains a separate array of child containers. List_And_Array_Container class could be used to as the parent container 410 for documents that may be partially broken down into sections that have a natural "next" and "previous" relationship between them, and partially broken down into sections that may or may not have an ordered relationship between them. The List_And_Array_Container class could be used as the parent container 410 of a document sub-tree storing a "game" document. The List_And_Array_Container's child sibling containers could include articles storing the sequential levels presented by a game viewer in client 116 that a player must proceed through in order to complete the game. Its array of child containers could include articles storing environments or animated characters that may be randomly applied to each level in the game by game viewer in client 116.

Referring again to FIG. 1, system 100 includes a user database 106. User database 106 includes a record for each user 102, each of whom may be a member of any of the workspaces 122 stored in file system 104. The record for each user 102 includes the following information:

| Field | Contents |
| --- | --- |
| user_name | Identifies the name of the user |
| user_password | A password used to authorize or authenticate access to system 100 by the user. This password will typically, but not necessarily be stored in an encrypted format. |
| user_contact_info | Record the address, telephone number, fax number, etc. that may be used to contact the user. |
| user_e_mail | Records the user's e-mail address. |
| user_handle | Record a unique handle that is used to identify the user internally within system 100. As an example, the user_handle is used to identify the user when he or she has locked a container 140 and in logs, transaction histories and change tracking information for various containers 140; In this exemplary embodiment, a user's user_handle is permanent once assigned. In another embodiment, the user_handle may be changeable. |
| user_screen_name | Record a screen name that is used to identify the user externally by system 100. The user_screen_name may be displayed by clients to users 102 to identify the user that has locked a section of a document (which corresponds to a container). In this exemplary embodiment, a user is permitted to change his user_screen_name using a typical method, which is not described further. |

-continued

| Field | Contents |
| --- | --- |
| user_workspace_list | A list of workspaces of which the user is a member. |

Several exemplary records from an exemplary user database 106 are set out in Appendix B.

A workspace 122 is considered "active" if it is currently being used by at least one of its members. An active workspace will be hosted by a workspace server 112. System 100 includes a workspace database 108, which includes one record for each workspace 122. The record for each workspace has the following structure:

| Field | Contents |
| --- | --- |
| workspace_id | Unique identifier for each workspace. In the exemplary embodiment of the present invention, this field is identical to the container_id of the root container of the workspace. In an another embodiment, any other unique value may be used. |
| workspace_title | The title of the workspace set out in the summary_title field of the root container 400 of the workspace's container tree 124. |
| workspace_host | If the workspace is currently active, this field identifies the workspace server 112 that is currently hosting the workspace 122. If the workspace 122 is inactive, this field is Null. |
| workspace_owner | The user_handle(s) of the owner(s) of the workspace. One of more members of a workspace may be designated as having ownership privileges, allowing the member to modify the privileges of other members to view or edit documents in the workspace and to edit the contents of the root article 402 of the workspace. |
| workspace_size | The size of the workspace, typically in bytes. |
| workspace_location | The location at which the data files associated with the workspace are stored in file system 104. |

Several exemplary records from an exemplary workspace database 108 are set out in Appendix C.

In addition to container tree 124, each workspace includes a member list 143. Member list 143 includes a list of member records 144, which have the following structure:

| Field | Contents |
| --- | --- |
| user_handle | User_handle of the member from user database 106. |
| user_screen_name | User_screen name of the member from user database 106. This field is optional and in an alternative embodiment, the user_screen_name may be stored only in the user database 106. |
| user_email | User_e_mail of the member from user database 106. |
| member_privileges | List of the member's privilege levels. In this exemplary embodiment of the present invention, a member may have one of three privilege levels with respect to any document: an "owner" may modify the document in any way, including the contents of the root article of the workspace and may control the membership of other users in the workspace and their privilege levels; a "worker" is |

-continued

| Field | Contents |
|---|---|
| | permitted to edit the documents stored in the workspace and associated summary information, but may not control the membership and privilege levels of other users; a "viewer" is permitted only to view the documents contents, log and transaction history.<br>In this exemplary embodiment, a member's privilege level is uniform for all documents in a workspace. In an alternative embodiment, a member's privilege may be set for each document in the workspace and for the authority to control membership and privilege levels of other members.<br>In the present embodiment, the container_excluded_handle_list field in each container overrides a member's access privileges set in this field. As a result, any member will not be able to view or edit the article stored in a container if the member's handle has been entered into the container_excluded_handle_list field for the container.<br>The specific privilege levels set out here are only exemplary, In another embodiment of the present invention, a member's privileges may be defined with any number and type of access privilege levels. |
| member_status | The member's current status with respect to the workspace 122. This field may have several values:<br>"Invited": - the member has been invited to join the workspace 122 but has yet to connect to the workspace.<br>"Connected" - the member is currently connected to the workspace 122.<br>"Not Connected" - the member is currently not connected to the workspace 122.<br>"Connecting" - the member is in the process of connecting to the workspace 122.<br>This field is used to ensure that a workspace 122 is not de-activated while a member is attempting to connect to it. |

Appendix D illustrates an exemplary set of member records 144 for the exemplary workspace 122a illustrated in FIG. 4 and Appendix D.

Reference is again made to FIGS. 4, 5 and 6. A master copy of each workspace 122 is stored in file system 104 using three types of data files:

(a) a header file, which stores the root container 400 at the root node 126 (i.e. container 400 in exemplary container tree 124) and a copy of the parent container 410 of each document sub-tree (i.e. containers 404 and 406 in exemplary container tree 122);

(b) for each document stored in the workspace, a document file containing all of the containers in the document's sub-tree including the parent container 410 of the document sub-tree; and (c) a membership file for the entire member list 143 of the workspace.

The parent container for each document sub-tree is stored in both the header file for the entire workspace and in the document file for the associated document. The stored data in header files, document files and membership file may be manipulated by any master server 110 or any workspace server 112.

The master copy of each workspace 122 is accessed directly by master servers 110 and workspace server 112 and is updated based on changes in membership in the workspace and changes in the documents stored in the workspace. A workspace server will update the structure and contents of the master copy of the container tree 124 stored in header file 660 and document files 662 based on Lock requests and Post requests from clients 116, as described below.

Figure 10:
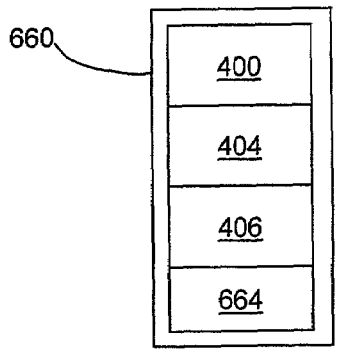
FIG. 10 illustrates a header file of the present invention.

Reference is next made to FIG. 10, which illustrates the structure of an exemplary header file 660 and an exemplary document file 662.

Header file 660 stores the root container 400 and parent container 404 and 406 of container tree 124 as follows. Each container 140 is stored sequentially with three fields for each container: the container_id field, the container_article_length field, and the byte buffer representing the container_article field. At the end of header file 660, a directory 664 is stored with seven fields for each container: an index representing the type of container (List_Container, Array_Container etc.), the container_id field, the container_article_length field, the container_lock_handle field, the container_excluded_handle_list field, container_time_stamp field and an index value. The index value indicates the position of the main portion of the container within header file 660. Typically, the index value for each container 140 will be an offset from the beginning of header file 660 indicating where the first byte of the container is stored. In addition, the record for each parent container 410 in directory 664 contains a field for the location of the corresponding document file 662 in file system 104.

This file structure allows containers 140 to be locked and unlocked efficiently, and also allows individual containers 140 to be accessed quickly. When a request is received to lock a container 140 for a member with owner or worker privileges (for example, in accordance with step 1218 of Method 1200 on FIG. 14b, described below) it is only necessary to (i) check whether the member's user_handle is listed in the container_excluded_handle_list and, if permitted, (ii) enter the user_handle in the container_lock_handle field. Since these steps can be taken by looking only at the directory of the header file, it is not necessary to read or parse the entire header file (or a large part of it) to find the required fields. If a get request is received for a container 140, the index_value of the directory allows the container to be quickly accessed for transmission to a client (along with the container_lock_handle and container_excluded_handle list from the directory).

Figure 11:
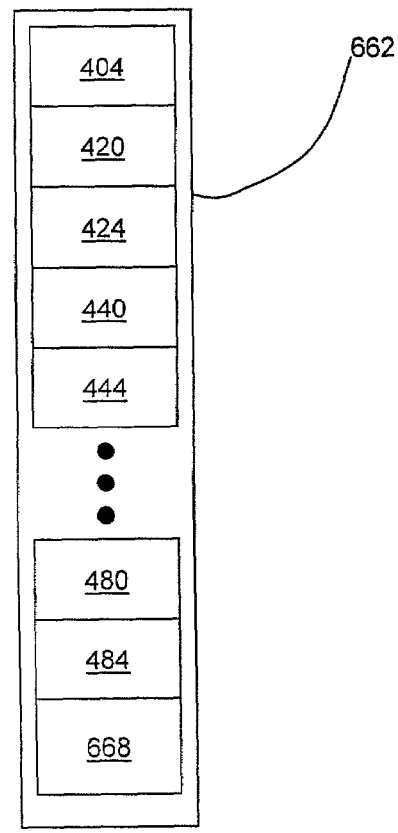
FIG. 11 illustrates a document file of the present invention.

FIG. 11 illustrates that document files 662 are organized in the same way. Each container 140 is stored sequentially without its container_lock_handle and container_excluded_handle_list fields, which are stored in a directory 668 along with an index_value specifying the position of the container within the document file 662. Typically, document files 662 will be larger than header files and may receive more get/post activity. As a result, the benefit of efficient locking and unlocking and rapid access to an entire container may be even greater in respect of document files.

The use of header files 660 and document files 662 and directories 664, 668 is not necessary to the present invention. A container tree 124 may be stored in any format suitable for a specific embodiment. For example, an alternative embodiment may store each container 140 in a separate data file. Another alternative embodiment may use a single flat file for all containers 140.

Each client 116 is a software application or package that is executed on a client computer 119. A client 116 has several functions:

(a) communicating with master servers 110 and workspace servers 112 to report changes to the workspace 122 made by the user 102 of the client 116 and to receive changes made by other users 102, in addition to other information;

(b) managing the structure of workspace 122 based on changes in the workspace's container tree 124 made by the client's user 102 or based on Update Messages received from a workspace server 112;

(c) editing features for the documents recorded in container tree 124.

A client software package 116 may be installed on a client computer 119 in various ways. For example, client software package 116 may be installed from a computer readable medium such as a floppy disc, compact disc (CD), digital versatile disc (DVD) or a solid state memory device. A client software package 116 may also be downloaded over the Internet and installed on a client computer 119. In addition, a client software package 116 may be installed or updated during step 1005 of method 1000 described below.

Many different types of documents may be stored in a workspace 122. Text document 190 and presentation document 200 are only exemplary of the many types of documents that can be stored in a workspace 122. For example, table documents (or spreadsheet documents), graphic documents (which will typically comprise one or more graphic images), audio/video documents (which will typically comprise one or more audio/video clips) may also be stored in a workspace 122. Any of these documents may include embedded elements of a different data type than their primary data type.

Figure 20:
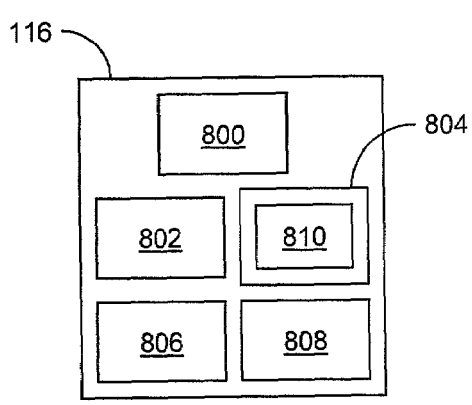
FIG. 20 illustrates a client of FIG. 1.

Reference is made to FIG. 20. Clients 116 include editing software, or editors, for each type of document supported by any particular embodiment of the present invention, with the exception of generic documents. In the present exemplary embodiment, clients 116 include a text editor 800 for editing text documents, spreadsheet editor 808 for editing table documents, a graphic image editor 802 for editing graphic images, a video editor 806 for editing AV clip documents, a presentation editor 804 for editing presentations. The presentation editor 804 is principally used to edit the sequence of slides in presentations and incorporates a slide editor 810 for editing slides within presentations.

Each editor built into a client 116 is configured to maintain the structure of a document sub-tree in which a document of the associated type is stored. For example, the text editor 800 in the clients 116 of the present embodiment is configured to allow a user to view and edit text document 190 and to maintain the structure of document sub-tree 412 to contain text document 190 as it is edited. Each editor is also configured to create a document sub-tree for a new document and to delete document sub-trees when a document is deleted.

In addition to editing entire documents, each editor may be executed within any other editor for editing embedded sections of documents. For example, the graphic image editor 802 may be invoked by the text editor 800 to allow a user editing a text document to edit an embedded graphic image.

Figure 9:
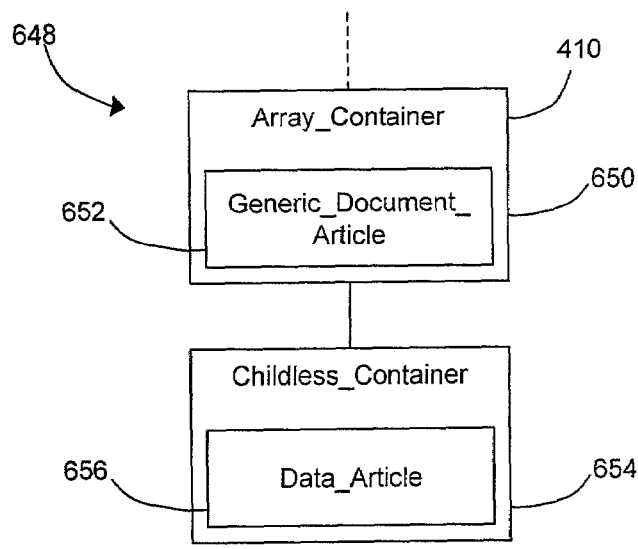
FIG. 9 illustrates the storage of a generic document in accordance with the present invention.

The present embodiment also supports the storage of generic documents of a data type for which an editor is not provided, within a container tree 124. Reference is made to FIG. 9, which illustrates the storage of an exemplary generic document in a document sub_tree 648. Document sub-tree 648 has a parent container 650 of class Array_Container 304 which has the following contents:

| Field | Contents |
| --- | --- |
| container_id | 2987 |
| container_parent | <Root Container of container tree> |
| container_lock_handle | Null |
| container_excluded_handle_list | Null |
| container_article | 652 |
| container_article length | 624 bytes |
| container_valid | TRUE |
| container_time stamp | July 30, 2001, 3:38:14 |
| array_dimensions | 1x1 |
| child_array | [654] |

Container 650 is a parent container 410 having the root container of a container tree (such as root container 400) as its parent. Container 650 has a single child container identified in its child_array field. The generic document stored in the document sub-tree 648 is identified in the article 652 of container 650. Article 652 is of class Generic_Document_Article 352 and has the following contents:

| Field | Contents |
| --- | --- |
| article_window | Null |
| summary_title | Exemplary generic document |
| summary_description | Exemplary generic document for patent application |
| summary_keywords | Exemplary, generic |
| summary_log | July 30, 2001, 3:38:14 br1: Created this document as an example of a generic document |
| summary_history | July 30, 2001, 3:38:34 br1: CREATE |

Container 654 is of class Childless_Container 306 having the following contents:

| Field | Contents |
| --- | --- |
| container_Id | 3985 |
| container_parent | 650 |
| container_lock_handle | Null |
| container_excluded_list_handle | Null |
| container_article | 656 |
| container_article length | 32424 bytes |
| container_valid | TRUE |
| container_time_stamp | July 30, 2001, 3:38:14 |

The article 656 of container 654 is of class Data_Article 378 and has the following contents:

| Field | Contents |
| --- | --- |
| article_window | Null |
| generic_data | <Contents of generic document> |

The article_window field of article 656 is Null, since the generic document will not be displayed by a client 116 (since the client does not have an editor capable of displaying the generic document). The generic document is stored in its entirety in the generic_data field of Article 656.

Generic documents may be edited by a user with an editor not included with a client 116. For example, if in a particular embodiment of the present invention, a text editor is not provided in the clients 116, then text documents may be stored in a workspace as a generic document and may be edited using a third party word processor.

The current client 116 of system 100 may evolve over time as changes and improvements are made to the different pieces of editing software and other parts of the client 116. This can cause the client 116 installed on any client computer 119 to become out-of-date. An out-of-date client installed on a client computer is updated in step 1005 of method 1000. To facilitate such updates, each version of the client is assigned a version number and is time stamped.

A number of transactions by which a user 102 may use system 100 will now be described. System 100 contains a number of transactions which a skilled person will be able to understand from the description of methods 1000–1600, below, including:

registration of a user
inviting a user to become a member of a workspace
modifying the privileges of a member in a workspace
deleting a member from a workspace
deleting a workspace
deleting a document from a workspace.

Figure 12:
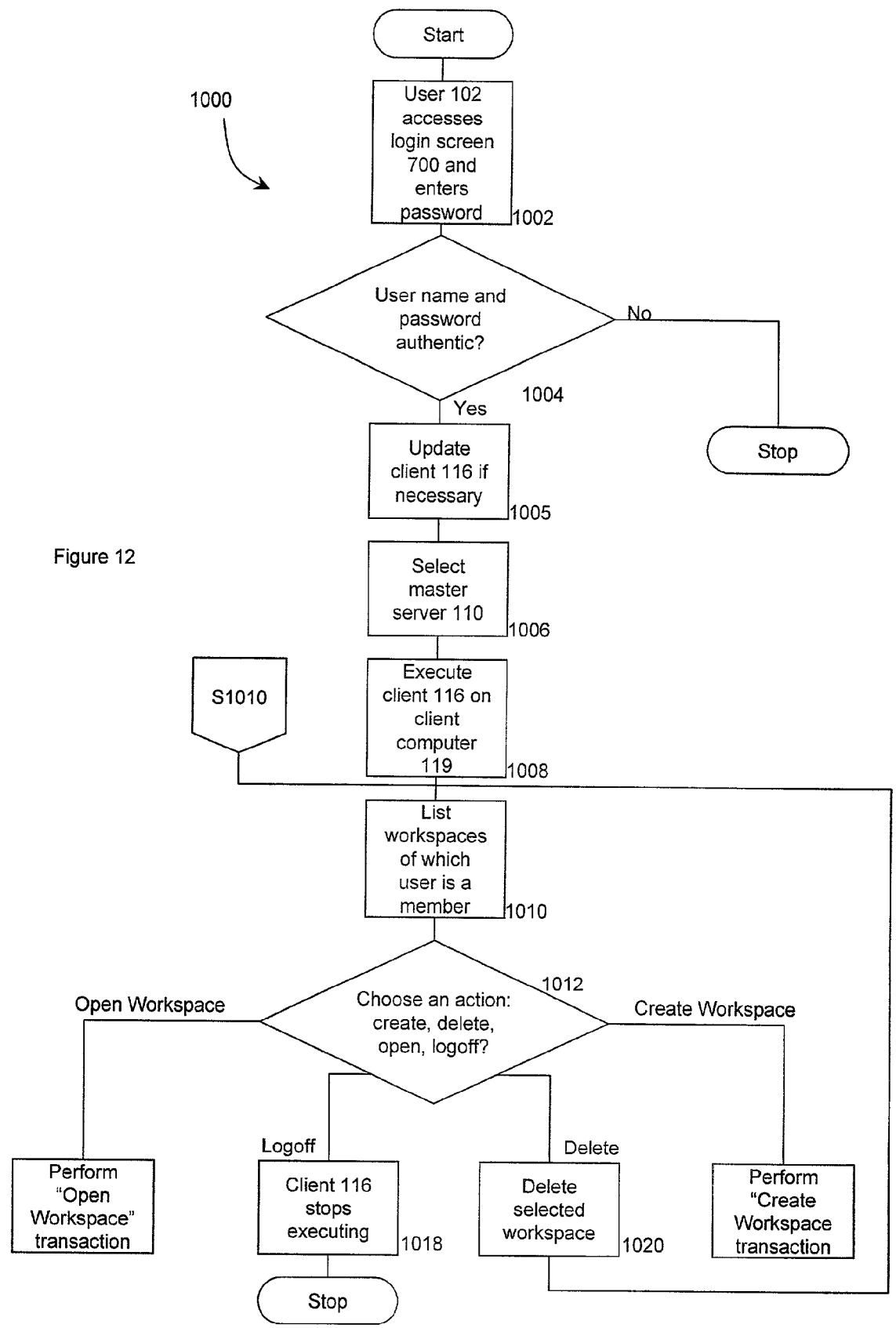
FIG. 12 illustrates a login transaction according to the present invention.

Reference is next made to FIG. 12, which illustrates a method 1000 for a Login Transaction by which an exemplary user 102 may login to system 100 and gain access to a workspace of which the user 102a is a member. Method 1000 (and methods 1100, 1200, 1300, 1400, 1500, 1600 and 1700 set out below) is described here in the context of a specific user 102a (FIG. 1), who is the user Chris Sonnenberg described in Appendix B.

Method 1000 begins at step 1002, in which user 102a accesses a login screen 700 of system 100. Login screen 700 may be a web page that may be accessed by user 102a using a web browser operating on a client computer 119a. The web page may be displayed by a master server 110 (possibly through a web server operated as part of system 100), or by another process. On login screen 700, user 102a enters his name and password. Alternatively, the user 102a may be permitted to enter his or her screen name or user handle, in addition to his or her password. Alternatively, a previously installed "cookie" on client computer 119a may identify the user's name and possibly his password.

Method 1000 next proceeds to decision step 1004. If the combination of the name and password entered by user 102a in step 1002 is authentic (i.e. the name and password are found in a single record in the user database 106), then method 1000 proceeds to step 1005. Otherwise, method 1000 ends.

In step 1005, a complete and current version of client 116 is installed on client computer 119a. This may require a completely new client software package to be transmitted to client computer 119a, along with software for installing the client 116 (if no client 116 has ever been installed on client computer 119a or if the client 116 installed on client computer 119a is so out-of-date that it cannot be efficiently updated). Alternatively, this may involve the transmission of only a part of the current client, which is then combined with components of a previously installed client to fully update the installed client 116.

This updating process may be performed by various known techniques. For example, the login screen 700 described in step 1002 may check the version, if any, of a previously installed client on client computer 119a. Login screen 700 may then update the previously installed client. If login screen 700 is a web page as described above, then this function may be programmed in the web page. Such an operation will be well understood by skilled persons. Alternatively, any previously installed version of a client may be executed on client computer 119a and may download any required components any may update itself. Client 116 may be installed or updated on client computer 119a using any other method, and any combination of methods may be used.

In step 1006, a master server 110 is selected to communicate with client computer 119a. The selection of the master server 110s may be based on load balancing criteria to ensure that all master servers 110 have similar loads, or may be based on any other rule or criteria, including a random selection criteria. The selected master server is referred to with the reference numeral 110s.

Method 1000 next proceeds to step 1008, in which the client 116a installed on client computer 119a is executed and the address of selected master server 110s and the user 102a's user_handle, user_screen_name, and user_e_mail are passed to client 116a. In the present exemplary embodiment, client 116a is executed within a web browser installed on client computer 119a. Alternatively, client 116a may be executed as an independent application. In the current embodiment, master server 110s may provide client 116a with the current system time for system 100 and client 116a may update the system clock of client computer 119a so that it is synchronized with the system clock. Alternatively, the current system time of system 100 may be synchronized to a selected network time server and client 116a may synchronize the system clock of client computer 119a to the same network time server.

Method 1000 next proceeds to step 1010, in which the client 116a connects to master server 110s and master server 110s transmits the list of workspaces stored in the user_workspace_list field of the user's record in the user database 106 to the client 116a, which displays the list to the user 102a. If the user 102a is not a member of any workspace 122, then the master server 110s indicates this to the client 116a, and the client 116a displays an appropriate message, such as "You are not a member of any workspace."

Method 1000 next proceeds to step 1012, in which the user 102a is offered a choice of:

(a) Creating a new workspace 122. If the user selects this option, a Create Workspace transaction, described below as method 1100, is performed.

(b) Deleting an existing workspace 122. If the user selects this option, the user is permitted to select a workspace 122 for which he has owner privileges and the workspace is deleted from system 100 in step 1020. A skilled person will understand how a workspace may be deleted and accordingly, a detailed method for doing so is not set out here. In a particular embodiment, a workspace may be "deleted" by identifying it as such, but without actually removing it from file system 104. This allows the "deleted" workspace to be subsequently restored. In addition, system 100 may optionally be configured to permit a workspace to be deleted only if no member (or no member with a selected privilege level) of the workspace is connected to it. After step 1020, method 1000 returns to step 1010.

(c) Selecting one of the workspaces 122 of which he is a member. If the user 102a selects a workspace 122, the workspace 122 is opened in accordance with an "Open Workspace" transaction, described below as method 1200. The selected workspace is identified with the reference numeral 122s.

(d) Logging out of system 100. If the user selects this option, method 1000 proceeds to step 1018.

In step 1018, client 1018 stops executing and method 1000 ends.

Figures 13, 14A:
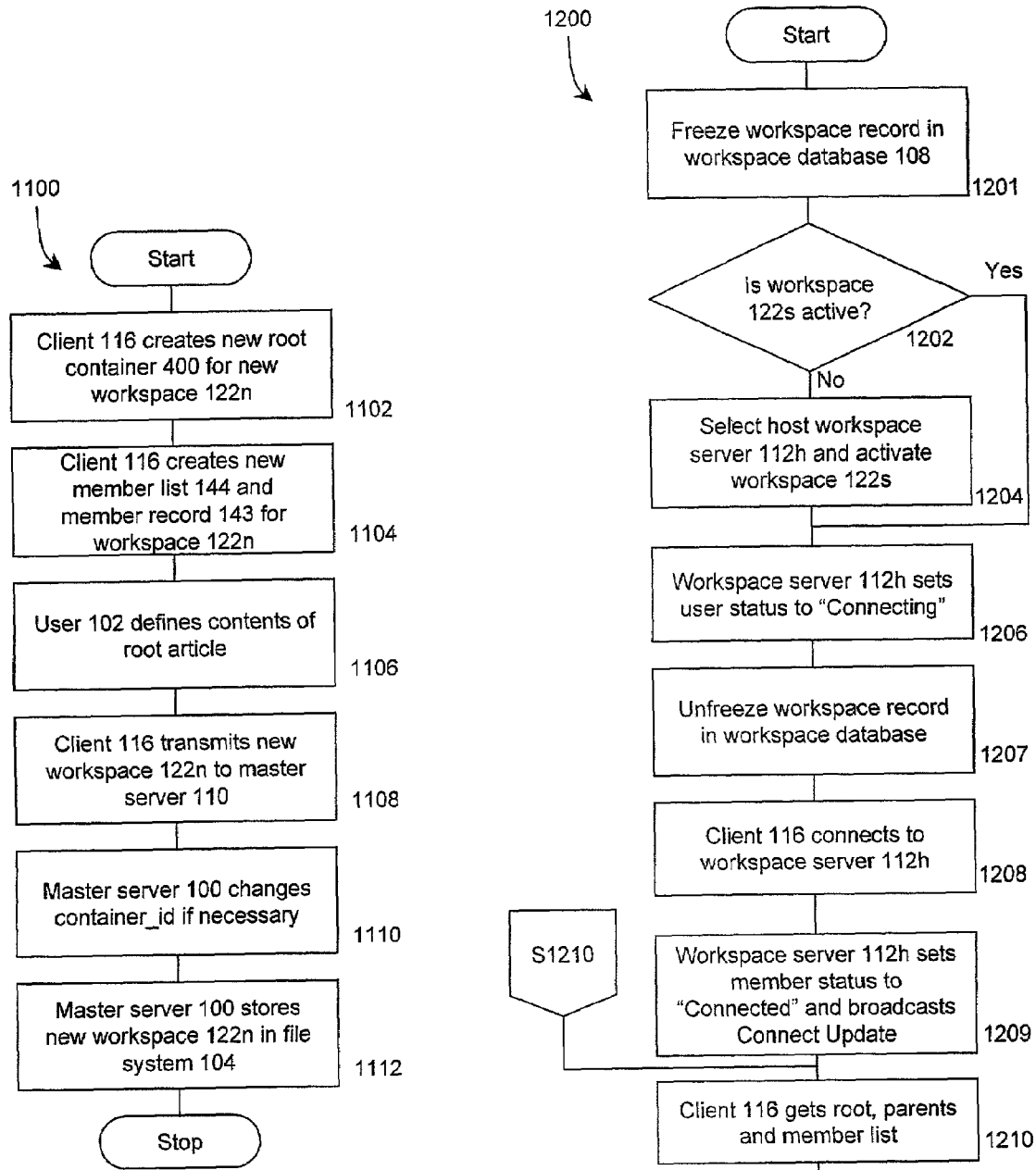
FIG. 13 illustrates a Create Workspace transaction according to the present invention.
FIGS. 14a and 14b illustrates a method of connecting to a workspace according to the present invention.

Reference is next made to FIG. 13, which illustrates a method 1100 for a "Create Workspace" transaction, which is used to create a new workspace 122*n*.

Method 1100 begins in step 1102, in which client 116*a* creates a new root container 400 for the new workspace 122*n*. In the present exemplary embodiment, the new root container 400 is an Array_Container 304. Client 116*a* selects the values for the fields of the new root container 400 as follows:

(i) A value is chosen for the container_id field. This value may be chosen randomly, or may be chosen using a selected mechanism. In the present embodiment, the value chosen for this field is based on the current time, which is provided by the system clock. In any case, the container id chosen by the client 116*a* is considered a preliminary value.

(ii) The new root container 400 is created with the most current structure of an Array_Container 304. If, in a different embodiment of the present invention, another type of container is used as the root container 400, the current version of that container type is used.

(iii) The container_parent field is set to Null.

(iv) The container_lock_handle field is set to Null.

(v) The container_excluded_handle_list is set to Null.

(vi) Client 116*a* creates a new root article 402 of type Workspace_Article 354 and sets the container_article field to point to the new root article 402.

(vii) The container_article_length field is initially set to 0 bytes.

(viii) The container_valid field is set to TRUE.

(ix) The container_time_stamp field is set to Null.

(x) The child_array field is set to Null, indicating that the new root container 400 has no child containers.

Method 1100 next proceeds to step 1104, in which client 116*a* creates a new member list 144 for the new workspace 122*n*. Client 116*a* creates a single member record 143 and selects the value of its fields as follows:

(i) user 102*a*'s user_handle, user_screen_name and user_e_mail fields are set to the values provided to client 116*a* as described above in step 1008 of method 1000;

(ii) user 102*a*'s member_privileges are set to Owner; and (iii) user 102*a*'s member_status is set to Not Connected.

Method 1100 next proceeds to step 1106, in which client 116*a* displays a dialog box allowing user 102*a* to define the following fields of the new root article 402:

(i) summary_title;

(ii) summary_description;

(iii) summary_keywords; and (iv) summary_log.

Client 116*a* adds a "CREATE" entry to the summary history field of the new root article 402, indicating the handle of user 102*a*, and the date and time at which the new workspace 122*n* was created. The container_article_length field of the root container 402 is updated to reflect the length of the root article 402.

Method 1100 next proceeds to step 1108, in which client 116*a* transmits the new workspace 122*n* to master server 110*s*. At this step, the new workspace 122*n* comprises the new root container 400, which includes the new root article 402, and the new member list 144.

Method 1100 next proceeds to step 1110, in which master server 110*s* checks the container_id of the new root container 400. If the container_id is not unique compared to that of all other containers 140 stored in any workspace 122 in system 100, master server 110*s* modifies it so that it is unique.

Method 1100 next proceeds to step 1112, in which the new workspace 122*n* is stored in file system 104. Master server 110*s* communicates with user database 106 to add the newly created workspace 122*n* to the user 102*a*'s list of workspaces. Master server 110*s* also communicates with workspace database 108 to add a new workspace record for the newly created workspace 122.

Method 1100 then returns to step 1012, and the new workspace 122*n* is treated as the selected workspace 122*s*.

At the end of method 1100, the user 102*a* has created a new workspace 122*n*, defined the contents of the root article 402 of the workspace 122*n* and is the only member of the workspace 122*n*.

Figure 14B:
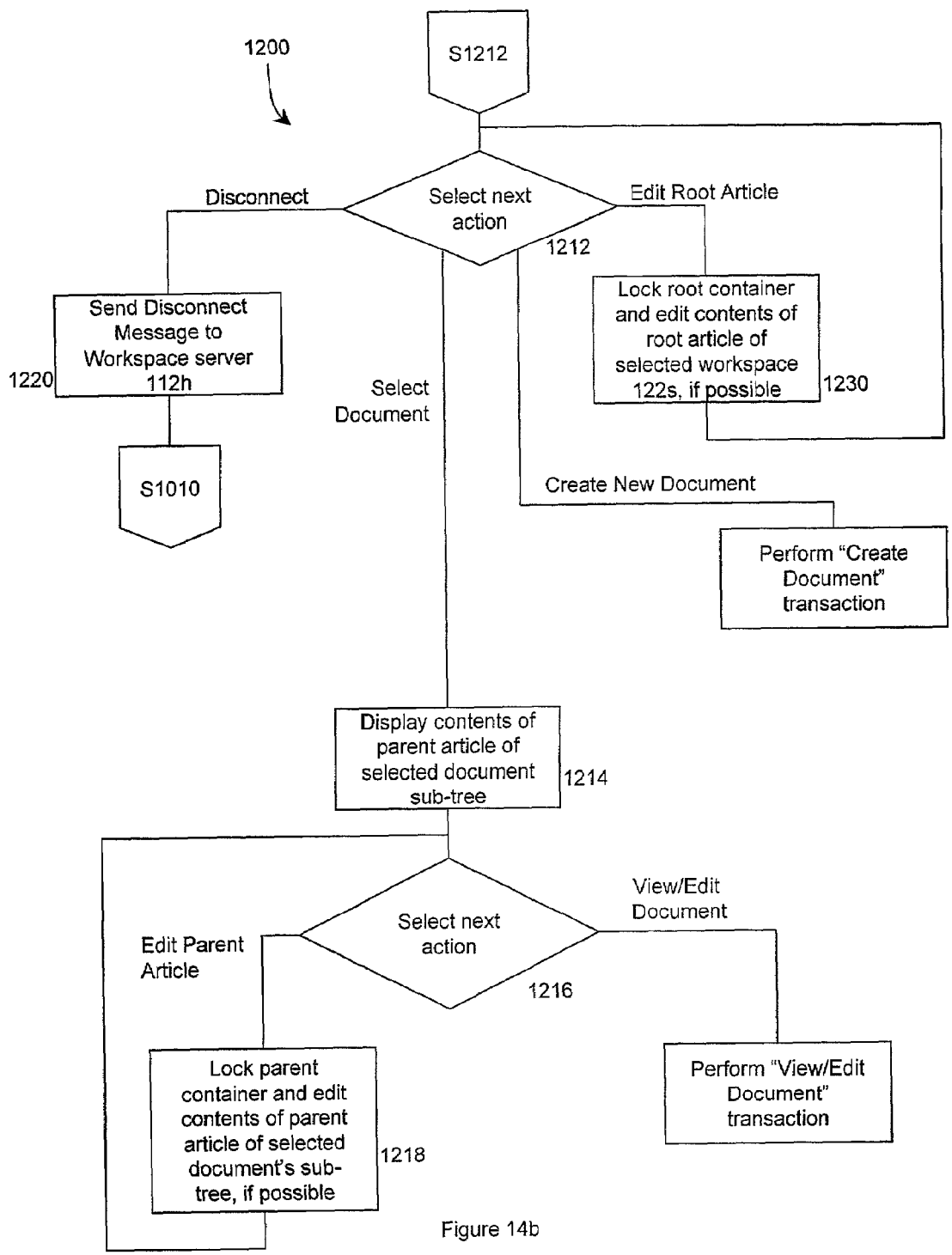

Reference is next made to FIGS. 14*a* and 14*b*, which illustrate a method 1200 for an "Open Workspace" transaction. An Open Workspace transaction is initiated in accordance with step 1012 described above.

Method 1200 begins in step 1201 in which master server 110*s* first freezes the record corresponding to the selected workspace 122*s* in workspace database 108 so that no process other than master server 110*s* may modify that entry. If the record corresponding to the selected workspace 122*s* in workspace database 108 is already frozen by another process, master server 110*s* waits until the entry is not frozen.

The terms "freeze" and "frozen" are used in this description to refer to data elements that have been locked by a particular process, entity or thread (such as a master server 110 or a workspace server 112) for synchronization purposes. The terms are used to avoid confusion with the word "lock", which is generally used to refer to containers 140 that have been locked by a user to allow the contents of the container to be edited exclusively by that user. The synchronization locks referred to with the terms "freeze" and "frozen" may be implemented in various computing environments using semaphores, shared memory space, message passing and other known techniques.

Method 1200 next proceeds to step 1202, in which master server 110*s* determines whether the selected workspace 122*s* is active. Master server 110*s* checks the workspace_host field of the record for workspace 122*s* in the workspace database 108.

If the workspace_host field is Null, then the workspace is currently inactive, and method 1200 proceeds to step 1204.

Otherwise, the workspace_host field will contain the address of a workspace_server 110, which is then identified as the host workspace server 112*h* of the workspace 122*s*. The presence of an address in the workspace_host field indicates that the selected workspace 122*s* is currently active and initialized. In this case, method 1200 proceeds directly to step 1206.

In step 1204, master server 110*s* selects a workspace server 112 to host the selected workspace 122*s*. Typically, a workspace server 112 will be capable of hosting more than one workspace 122. In the present embodiment, master server 110*s* selects the workspace server 112 in order to keep the workload of different workspace servers 112 generally equal. Alternatively, master server 110*s* may select the workspace server 112 based on a rule that a specific workspace 122 is always hosted by a specific workspace server 112, based on a random selection or based on any other method or rule. The workspace server 112 is designated as the host workspace server 112*h* for the selected workspace 122*s*.

Master server 110*s* sends a message to host workspace server 112*h* indicating the workspace server 112*h* is to start hosting workspace 122*s*. In response, workspace server 112*h*

"initializes" the workspace 122s by loading the directory 664 from the header file 660 and the member list 143 from the membership file.

When the workspace 122s has been initialized, workspace server 112h sends a confirmation message to master server 110s, which updates the workspace_host field of the record for workspace 122s in the workspace database 108.

In step 1206, master server 110s sends a message to host workspace server 112h indicating the connecting user 102a's user_handle and user_e_mail. Workspace server 112h sets the member_status field of user 102a's member record in member list 143 of selected workspace 122s to "Connecting". Master server 110s transmits the address of the host workspace server 112h to the client 116a.

Method 1200 next proceeds to step 1207, in which master server 110s unfreezes the record corresponding to the selected workspace 122s in workspace database 108.

In step 1208, client 16a contacts host workspace server 12h. In the present embodiment, client 116a transmits a "Connect" message to the host workspace server 112h, and opens a persistent bi-directional communication link with the host workspace server 112h. The persistent bidirectional communication link is used by the client 116a to communicate with workspace server 112h. When this communication link has been established, client 116a is considered to be connected to workspace 122s.

In the present embodiment, workspace server 112h instantiates a separate process to communicate with client 116a. Similarly every other client that connects with workspace server 112h will communicate with a separate process operating within workspace server 112h. In the remainder of this description, the separate process will be treated as a part of workspace server 112h and will not be referred to separately.

Method 1200 next proceeds to step 1209 in which workspace server 112h retrieves the member_privileges field from user 102a's entry in the member list 143 for the selected workspace 122s and sets the member_status field of the same entry to "Connected".

As indicated above, a workspace member's member_status field may have one of four settings in the present embodiment (although additional settings may be used in other embodiments): Invited, Connected, Connecting and Not Connected. When an owner of a workspace 122 (or a worker, if workers are permitted to do so) initially adds a member record 144 to the member list 143, the new member may or may not be a user of system 100. If the new member is not a user of system 100, then the member will not have a user_handle, which is defined in the user's entry in the user database 106. The owner of the workspace identifies the new member by entering the e-mail address into the user_e_mail field of the new member record. The member_handle field is left blank. Client 116 sets the member_status field of the new member record to "Invited".

Subsequently, the new member may register with system 100, at which time a user_handle will be assigned for the new user. When the new user attempts to connect to the workspace 122 for the first time, master server 110s transmits the new user's user_handle, and user_e_mail fields to the workspace server 112h in step 1206. In this step, workspace server 112h may then find the corresponding member record using the user_e_mail field. Workspace server 112h then enters the user_handle received from the master server into the user_handle field of the member record. Workspace server 112h subsequently may use the user_handle to find the member's member record 144.

In the case where a registered user is added as a new member to a workspace 122, the new member record 144 may be completed by the owner of the workspace 122. In this case, the user_handle or user_e_mail fields may be used to find the member's member record 144 in this step.

Workspace server 112h then transmits a Confirm Connect message and the member_privileges back to client 116a. Workspace server 112h also broadcasts a Connect Update message to all clients 116 connected with the workspace 122s to advise them of the screen name of the of the newly connected user 102a. Client 116a, which transmitted the originating Connect message, ignores the Connect Update message after determining that it relates to its own connection. Every other connected client 116 displays an appropriate message to its corresponding user 102, such as "Chris has connected to the workspace". In this way, every client 116 that is currently connected to workspace 122s is advised of the connection of every other client 116 as it occurs. Similarly, workspace server 112h broadcasts a Disconnect Update message advising all clients when a user 102 disconnects from a workspace.

Method 1200 next proceeds to step 1210 in which client 116a gets the following components of workspace 122 from workspace server 112h:

(i) The root container 400 and all parent containers 410 of each document sub-tree in the container tree 124. In the case of the exemplary container tree illustrated in FIGS. 4, 5 and 6, client 116a would get the root container 400 and containers 404 and 406. Client 116a requests the root container 400 and all parent containers 410 from workspace server 112h and in response workspace server 112h transmits all of the containers stored in the header file 660 for the workspace 122s. The location of the header file 660 is stored in the workspace_location field of the workspace's entry in the workspace database 108.

(ii) The member list 143. Client 116a requests the member list 143 from workspace server 112h. In response, workspace server 112h transmits the member list 143.

While workspace 122s is active, workspace server 112s preferably keeps the header file directory 664, comprising the root container 400 and parent containers 410, and member list 143 in memory to facilitate rapid access. However, this may not be practical or possible depending on the number of workspaces 122 being hosted by workspace server 112h and the size of its local memory space. In any case, workspace server 112h preferably keeps header file 660, document files 662 and membership file stored in file system 104 updated at all times to reduce the chance of data being lost due to a breakdown or crash of workspace server 112h.

Method 1200 next proceeds to step 1211, in which client 116a displays the title (from summary_title field of the parent article stored in parent container 410 of each document's document sub-tree) and/or an icon or thumbnail image representing each document stored in the workspace 122s except those in which the user 102a's user handle has been entered in the parent container 410's container_excluded_handle_list field. In the present exemplary case, client 116a displays the title and an icon for text document 190 and for presentation document 200.

Method 1200 next proceeds to step 1212, in which client 116a offers user 102a the following choices:

(i) Select one of the documents in the workspace 122s. If the user 102a selects this option, method 1200 proceeds to step 1214.

(ii) If the user 102a has owner or worker privileges for the workspace 122s, he may choose to edit the contents of the root article of the workspace. If the user 102a selects this option, then method 1200 proceeds to step 1230.

(iii) If the user 102a has owner or worker privileges for the workspace, he may choose to create a new document in the workspace 122s. If the user 102a selects this option, then a "Create Document" transaction, described below as method 1300, is performed.

(iv) Exit from the workspace. If the user 102a selects this option, then method 1200 proceeds to step 1220.

In step 1214, client 116a displays the contents of the parent article (i.e. article 416, if text document 190 is selected) contained in the parent container 410 of the selected document.

Method 1200 next proceeds to step 1216, in which the user 102a is offered the following choices:

(i) If the user 102a has owner or worker privileges for the workspace 122s, the user 102a may choose to edit the contents of the parent article contained in the parent container 410 of the selected document. If the user 102a chooses this option, method 1200 proceeds to step 1218.

(ii) View or edit the contents of the selected document. If the user chooses this option, then a View/Edit Document transaction, described below as method 1400, is performed.

In step 1218, client 116a transmits a Lock Request message for the parent container 410 of the selected workspace 122s to workspace server 112h. In response, workspace server 112h determines whether the parent container 410 is already locked by another user 102 (i.e. the container_lock_handle field of the parent container 410 contains the user_handle of the other user 102). If so, then workspace server 112h transmits a Refused Lock message to client 116a. Client 116a displays a message indicating the parent article cannot currently be edited (and possibly an explanation that the parent container 410 is currently be edited by another member of the workspace) and method 1200 returns to step 1212.

If the parent container 410 is not locked (i.e. the container_lock_handle field of the parent container 410 is Null), then workspace server 112h locks the parent container for user 102a by setting the container_lock_handle field to user 102a's user_handle (in both the header file 660 for the selected workspace 122s and the document file 662 for the selected document). Workspace server 112h then transmits a Confirmed Lock message to client 116a.

Client 116a then displays a dialog box allowing the user 102a to edit the summary_title, summary_description, summary_keywords, summary_log fields and possibly additional fields, depending on the document type (i.e. the text_attributes and text_document information fields for text documents) of the parent article for the selected document. Typically, the user 102a will not be able to directly edit the article_window, summary_history and other fields that are updated automatically by editors in client 116a (such as the text_document_statistics field for text documents).

When user 102a has finished editing the parent article, client 116a posts the revised parent container 410 (of which the revised parent article is a part) to the workspace server 112h for storage in file system 104.

System 100 supports several different types of Post requests, which are used by a client 116 to transmit changes in a workspace 122 to a workspace server 112. More specifically, Post requests are used to add, modify and delete entire documents as well as sections of documents. Typically, a client 116 makes a Post request by transmitting three pieces of information to a workspace server 112h that is hosting the relevant workspace 122:

(i) a specific action to take;

(ii) the identity of a container 140 on which to take the action; and (iii) zero or more provisional containers with which to take the action.

A provisional container is a container 140 that has been prepared by a client for incorporation in container tree 124. In response to a Post request, a workspace server 112 either confirms or refuses the Post request. If the Post request is confirmed, the client 116 incorporates the provisional containers into its local container tree 124. If the Post request is refused, then the client 116 does not incorporate the provisional containers into its local container tree 124. The client 116 may re-attempt the Post request, or it may discard the provisional containers, or it may display a message to its user 102 and allow the user to select a course of action.

For some Post requests, only some of this information is required and in others, additional information is required. In response to the Post requests from a client 116, the host workspace server 112h takes the requested action by modifying the workspace's header file 660 and document files 662 in file system 104.

In step 1218, client 116a sends the following information to workspace server 112h:

(i) Post and Unlock request;

(ii) the revised parent container 410, including the revised parent article.

In response, workspace server 112h replaces the parent container 410 stored in both the header file 660 for the selected workspace 122s and the document file 662 for the selected document. Workspace server 112h also sets the container lock handle field for the parent container 410 (in both the header and document files) to Null, thereby unlocking the parent container 410. Workspace server 112h then transmits a Confirm Post and Unlock message to client 116a. Workspace server 112h also broadcasts a Post and Unlock Update message to all clients 116 connected with the workspace 122s to advise them of the newly posted parent container. Client 116a, which transmitted the original request, ignores the broadcasted message after determining that it relates to its own connection. The nature of the broadcasted message (which may be "skinny" or "chubby") and the response of every other connected client 116 is described below in method 1500 (FIG. 17) and method 1600 (FIG. 18). Method 1200 then returns to step 1212.

In step 1220, client 116a transmits a Disconnect message to workspace server 112h. Workspace server 112h responds to the Disconnect message by:

(i) Setting the member_status field for the user 102a to "Disconnected".

(ii) Broadcasting a Disconnect Update message to all clients 116 connected with the workspace 122s as described above in step 1209.

(iii) If client 116a is the only client 116 currently connected to workspace 122s, then workspace server 112h de-activates the workspace 122s as follows. Workspace server 112h freezes the record corresponding to the selected workspace 122s in workspace database 108. If the record corresponding to the selected workspace 122s in workspace database 108 is already frozen by another process, then workspace server 112h waits until the entry becomes unfrozen and then attempts to freeze it. If during this waiting period, another client (say, client 116b, in use by user 102b) attempts to connect to workspace 122s, then workspace server 112h abandons the attempt to de-activate workspace 122s and method 1200 returns to step S1010 of method 1000, in respect of user 102a. (In respect of the other client 116b and user 102b, system 100 continues at step 1208.)

When workspace 112h is able to freeze the record corresponding to the selected workspace 122s in workspace database 108, it deactivates workspace 122s by ensuring that its header file 660 and document files 662 are stored in file system 104. Workspace server 112h then sets the workspace_host field in the record for workspace 122s in the workspace database to Null, indicating the workspace 122s is inactive. Method 1200 then returns to step 1010 of method 1000.

In step 1230, client 116a transmits a Lock Request for the root container 400 of the selected workspace 122s to workspace server 112h. In response, workspace server 112h determines whether the root container 400 is already locked by another user 102 (i.e. the container_lock_handle field of the root container 400 contains the user_handle of the other user 102). If so, then workspace server 112h transmits a Refused Lock message to client 116a. Client 116a displays a message indicating the root article cannot currently be edited (and possibly an explanation that the root container 400 is currently being edited by another member of the workspace) and method 1200 returns to step 1212.

If the root container 410 is not locked (i.e. its container_lock_handle field is Null), then workspace server locks the root container 410 for user 102a by setting the container_lock_handle field to user 102a's user_handle. Workspace server 112h then transmits a Confirmed Lock message to client 116a.

Client 116a then displays a dialog box allowing the user 102a to edit certain fields of the root article 402 for the workspace 122s. If the user 102a has owner privileges in workspace 122s, he may edit the summary_title, summary_description, summary_keywords and summary_log fields of the root article 402 for the workspace 122s. If the user 102a has worker privileges in workspace 122s, he may edit only the summary_log field of the root article 402 for the workspace 122s. Typically, the user 102a will not be able to directly edit the summary_history and document_count fields, which are updated automatically by client 116a. When user 102a has finished editing the root article 402, client 116a sends a Post and Unlock message containing the root container 400, including the revised root article 402, to workspace server 112h. Workspace server 112h replaces the root container 400 in the header file 660 for the selected workspace 122s. Workspace server 112h also sets the container lock handle field for the root container 400 (in the header file 660) to Null, thereby unlocking the root container 400. Workspace server 112h then transmits a Confirm Post and Unlock message to client 116a. Workspace server 112h also broadcasts a Post and Unlock Update message to all clients 116 connected with the workspace 122s to advise them of the newly updated root container 400. Client 116a, which transmitted the original request, ignores the broadcasted message after determining that it relates to its own connection. The nature of the broadcasted message and the response of every other connected client 116 is described below in method 1500 (FIG. 17) and method 1600 (FIG. 18). Method 1200 then returns to step 1212.

Figure 15:
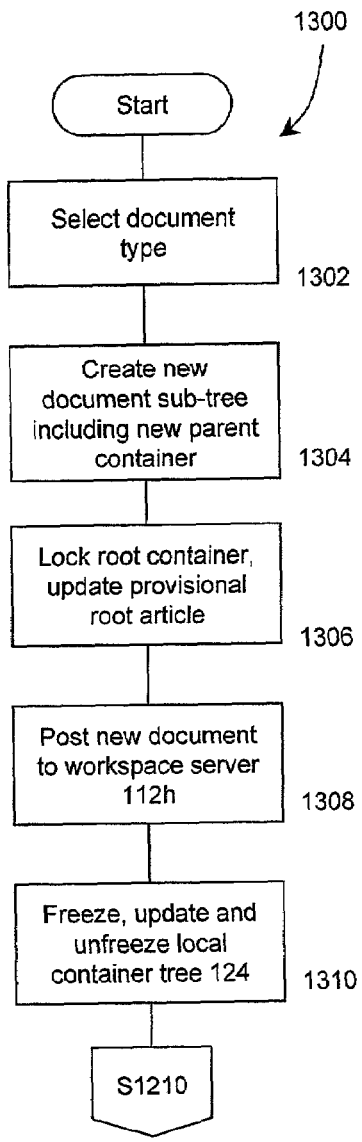
FIG. 15 illustrates a method of creating a new document in a workspace according to the present invention.

Reference is next made to FIG. 15, which illustrates a method 1300 by which a new document is added to the workspace 122s.

Method 1300 begins in step 1302, in which the user 102a specifies the type of the new document to be added to the workspace 122s. Typically, client 116a displays a menu of document types that are supported by system 100 (or another embodiment of the present invention). The type of the parent container 410 for the document sub-tree for the new document will depend on the document type. In the present embodiment, the document type and associated type of the parent container are related as shown in Table 1:

TABLE 1

Relationship between document type, parent container type and initial document section in the present exemplary embodiment.

| Document Type | Parent Container Type 410 | Initial Document Section |
|---|---|---|
| Text Document | List_Container | Empty paragraph |
| Table | Array_Container | Empty cell |
| Image | Array_Container | Entire image |
| Presentation | Array_Container | Initial blank slide |
| Generic Document | Array_Container | Entire Generic Document |

When user 102a selects a document type, method 1300 proceeds to step 1304.

In step 1304, client 116a creates a parent container 410n for the new document, in accordance with Table 1. Client 116a creates the new parent container 410n as follows:

(i) A value is chosen for the container_id field. This value may be chosen randomly, or may be chosen using a selected mechanism. In the present embodiment, the value chosen for this field is based on the current time, which is provided by the system clock. In any case, the container_id chosen by the client 116a is considered a preliminary value.

(ii) The new parent container 410n is created with the structure of the appropriate container class (i.e. a List_Container 302 or Array_Container 304).

(iii) A provisional copy of the root container 400p is made, including a provisional copy of its root article 402p. The container_parent field of new parent container 410n is set to point to the provisional root container 400p.

(iv) The container_lock_handle field of new parent container 410n is set to Null.

(v) The container_excluded_handle_list of new parent container 410n is set to Null.

(vi) Client 116a creates a new parent article for the new parent container 410n of the appropriate type for the selected document type. For example, if a text document is selected, the parent article will be a Text_Document_Article 356; if a presentation document is selected, the parent article will be a Presentation_Document_Article 364. The container_article field of new parent container 410n is set to point to the new parent article.

(vii) The container_article_length field of new parent container 410n is initially set to the length of the new parent article.

(viii) The container_valid field of new parent container 410n is set to TRUE.

(ix) The container time stamp field is set to Null.

Client 116a may create a child container or containers for the new parent container to provide an initial document section, as set out in Table 1. For example, in the case of a new text document, client 116a creates a new Sibling_Childless_Container 316 (identified as a container 140*n*) and sets its fields in a manner analogous to that set out above for the new parent container. The container_parent of the new container 140*n* is set to point to the new parent container 410*n* and the list_head_pointer and list_tail_pointer fields of the new parent container 410*n* are set to point to the new child container 140*n*. In addition, client 116*a* creates a new Paragraph_Article 370 for the new container 140*n* and sets its fields so that it has an empty character_data field and no formatting or change tracking information. In a similar way, a new presentation document is provided with an initial blank slide and a new table document is provided with an initial empty cell.

Image and generic documents are generally, although not necessarily, created only when an image or generic data file already exists. To create a new image document, client 116*a* creates a new parent container 410*n* of class Array_Container 304 having an article of class Image_Document_Article 358. Client 116*a* then loads the image data for the new image document from a data device specified by user 102*a* such as a floppy disk, CD-ROM or other storage device, which may be coupled to client computer 119*a* or which may be accessible via a network (including network 114). Client 116*a* then displays a dialog box allowing user 102*a* to specify how the new image document should be divided into mutually exclusive sections. Typically an image document is divided into rectangular sections, which may have the same or different dimensions. Client 116*a* then creates one or more child containers (one child container for each section), including articles of class pixel_article 372, for the new image document and stores the image data in the new child containers. The fields of the new child containers are set in a manner analogous to those of containers 444, 448, 452 and 456 (FIG. 5) used to store graphic image 194 (FIG. 2).

To create a new generic document, client 116*a* similarly creates a new parent container 410*n* of type Array_Container 304 with an article of class Generic Document Article 352. Client 116*a* also creates a child container 140*n* for the new parent container 410*n* with an article of class Data_Article 378. Client 116*a* then loads the generic data from a data device specified by user 102*a* and stores the generic data in the article of the new child container 140*n*. The remaining fields of the new parent container 410*n* and the new child container 140*n* are set in a manner analogous to those of containers 650 and 654 (FIG. 9) used to store the exemplary generic document described above.

Method 1300 next proceeds to step 1306, in which client 116*a* transmits a Lock Request message for the root container 400 of the selected workspace 122*s* to workspace server 112*h* as described above in step 1230. Upon receipt of a Confirmed Lock message from workspace server 112*h*, client 116*a* adds a NEW DOCUMENT entry to the summary_history field of its provisional copy of the root article 402*p*, indicating the handle of user 102*a*, the date and time at which the new document was added, and adjunctive information identifying the type and source of the document.

The container_article_length field of the provisional root container 400*p* is updated to reflect the modified length of the provisional root article 402*p*. Client 116*a* then links the provisional root container 400*p* to the new parent container 410*n*. Client 116*a* does this by adding a pointer to the new parent container 410*n* to the child_array of the provisional root container (which is an Array_Container 304 in the present embodiment).

Method 1300 next proceeds to step 1308, in which the new document is then posted to workspace server 112*h*. Client 116*a* sends the following to workspace server 112*h* to post the new document:
 (i) a Post New Document request; and
 (ii) a branch of the container tree 124 including the provisional root container 400*p* and the entire new document sub-tree, including the new parent container 410*n* and all of its child containers.

The identity of the container on which to take the action, namely the root container 400, is implicit in the request. Method 1300 next proceeds to step 1310, in which client 116*a* waits for a Confirm Post and Unlock message from workspace server 112*h*. This message is sent by workspace server 112*h* to confirm that it has received the Post request from client 116*a*, that the workspace's header file 660 has been modified and a new document file 662 created, and that the root container 400 has been unlocked. If a Confirm Post and Unlock message is not received within a selected time out period, client 116*a* may be configured to re-transmit the Post request or to discard the newly added document or take another corrective action, such as informing user 102*a* of the missing confirmation message and allowing the user to choose a course of action. Workspace server 112*h* broadcasts a Post and Unlock Update message to all clients 116 connected with the workspace 122*s* to advise them of the newly updated root container 400 and the newly added document sub-tree. The nature of the broadcasted message and the response of every other connected client 116 is described below in method 1500 of FIG. 17 and method 1600 of FIG. 18. Upon receipt of a Confirm Post and Unlock message from workspace server 112*h*, client 116*a* freezes its copy of container tree 124, replaces the root container 400 with the provisional root container 400*p* (including its provisional root article 402*p*), and adds the new parent container 410*n* to the root container 400's array of children. Client 116*a* then unfreezes its local copy of container tree 124. In this way, client 116*a*'s local copy of container tree 124 is synchronized with workspace server 112*h*'s master copy of container tree 124.

Method 1300 then ends.

Figure 16:
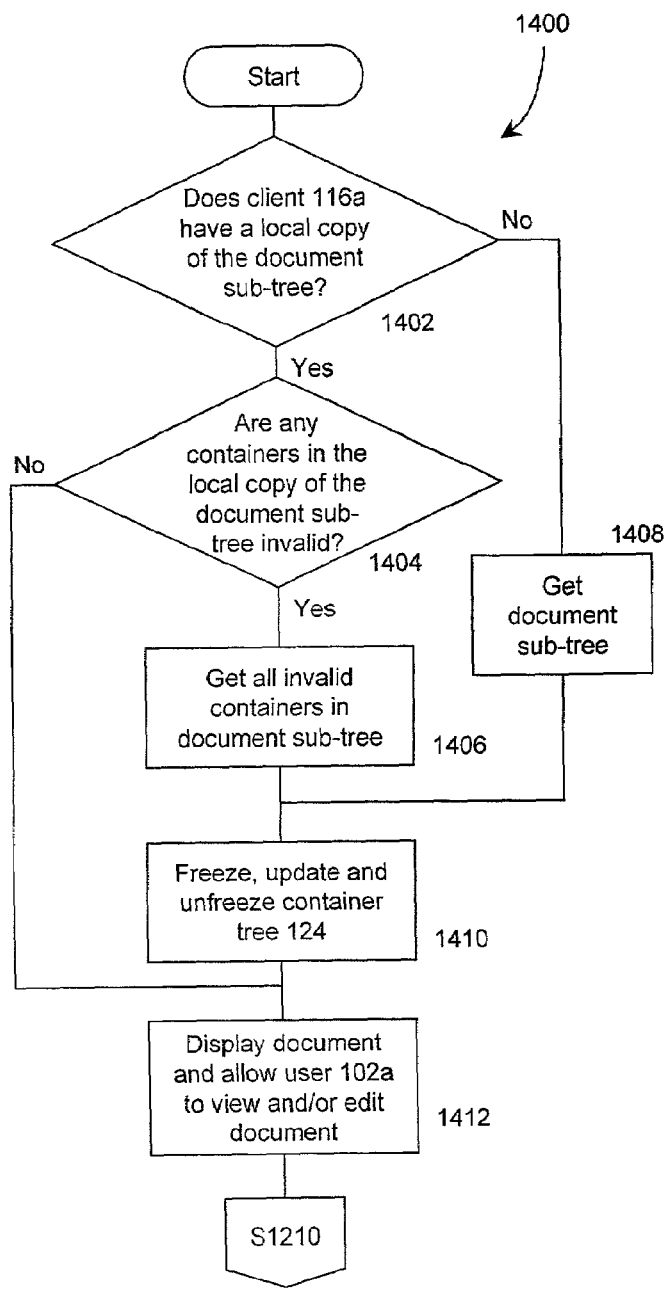
FIG. 16 illustrates a View/Edit Document transaction according to the present invention.

Reference is next made to FIG. 16, which illustrates a method 1400 for a View/Edit Document transaction. Method 1400 is described above as following step 1216 if the user 102*a* chooses to view or edit the selected document. In another embodiment, method 1400 may also be initiated directly from step 1212 by providing user 102*a* with an option to select a document and directly view or edit it.

Method 1400 begins in decision step 1402, in which client 116*a* determines whether it has previously gotten the document sub-tree (which is stored in a document file 662 in file system 104) in which the selected document is stored. As described in relation to step 1210 of method 1200, when client 116*a* initially opens a workspace, it gets the root container 400 for the container tree and the parent containers 410 for each document sub-tree. Client 116*a* does not get the entire document sub-tree for each document stored in the workspace. Accordingly, client a must get the document sub-tree (or at least a part of it) in order to display the document for user 102*a* to view and/or edit.

If the client has previously downloaded the document sub-tree during the current connect session, method 1400 proceeds to step 1404. Otherwise, method 1400 proceeds to step 1408.

In step 1404, client 116*a* checks each container 140 in its local copy of the document sub-tree (i.e. the copy stored by client 116*a* in client computer 119*a*) for the selected document to determine if any such container 140, including the parent container 410, has its container_valid field set to FALSE. Such a container 140 is referred to as an invalid container.

A container's container_valid field may be set to FALSE in accordance with method 1600 (FIG. 18), described below, when the copy of the container 140 stored by a client is not consistent with the copy of the same container 140 stored by workspace server 112*h* in file system 104. Should any container 140 in a document sub-tree be invalid, a client 116 must get a new, valid copy of the container 140 from workspace server 112*h* before subsequently displaying its contents to a user 102.

If any container 140 in the document sub-tree for the selected document has had its container_valid field set to FALSE, then method 1400 proceeds to step 1406. Otherwise method 1400 proceeds to step 1410.

In step 1406, client 116*a* gets all invalid containers in its document sub-tree for the selected document from workspace server 112*h*. In the present embodiment, client 116*a* does this by making a Get Flagged Containers request. Client 116*a* transmits the following information to workspace server 112*h*:

(i) a Get Flagged Containers request;
(ii) the container_id of the parent container 410 of the document sub-tree;
(iii) a portion of the container tree 124, which includes parent container 410 and all of its children (and their children, recursively), in a special format in which each node contains the container_id of the container 140 at that node and a "get_flag", which is marked FALSE if the client does not require a new valid copy of the container (i.e. the container_valid field of the container is marked as TRUE in the local copy of the container tree 124) or is marked as TRUE if the client does require a new valid copy of the container.

Workspace server 112*h* responds to the Get Flagged Containers request by transmitting a portion of the document sub-tree beginning with the identified parent container 410 and then transmitting each child (including grandchildren, etc.) of the parent container 410. Any container for which the get_flag was marked as TRUE is transmitted in full. In contrast, any container for which the get_flag was marked as FALSE is transmitted in an abridged format which does not include the container's article 142 and may not include other fields of the container. The abridged form of a container may consist only of the container's container_id field. Alternatively, containers for which the get_flag was FALSE may be omitted by the workspace server 112*h* in its return transmission to client 116*a*.

The Get Flagged Containers request described is used to allow a client to get any number of containers that have a common parent (or grandparent, etc.) container, simply by identifying the common parent and flagging each container to be gotten. Alternatively, branches of the container sub-tree for which the container_valid field is TRUE in all children (including grandchildren, etc) may be omitted from the sub-tree transmitted by client 116*a* to workspace server 112*h*. In another alternative embodiment, client 116*a* may simply send a list of containers that it wishes to get and workspace server 112*h* may simply transmit up-to-date versions of only those containers. Any mechanism by which client 116*a* can request and receive an updated copy of every invalid container in the document sub-tree for the selected document may be used in this step. After step 1406, method 1400 proceeds to step 1410.

In step 1408, client 116*a* gets the entire document sub-tree for the selected document by sending the following information to workspace server 112*h*:

(i) a Get Document request;
(ii) the container_id of the parent container 410 of the document sub-tree.

Workspace server 112*h* responds by transmitting the entire document sub-tree for the selected document, including the parent container 410. Workspace server 112*h* sends all of the containers stored in the document file 662 for the selected document to client 116*a*. The location of the document file 662 is set out in the directory 664 of the workspace's header file 660. Method 1400 next proceeds to step 1410.

In step 1410 client 116*a* freezes its local copy of the container tree 124 to ensure that no other process modifies the container tree. Client 116*a* then updates its local copy of container tree 124. If client 116*a* executed step 1406 above, client 116*a* replaces the invalid containers 140 with the up-to-date versions transmitted by workspace server 112*h*, thereby rendering each container in the document sub-tree for the selected document valid (each new container will have its container_valid field set as TRUE when the container is transmitted by workspace server 112*h*). If client 116*a* executed step 1408 above, client 116*a* adds the complete document sub-tree retrieved in step 1408 to its local copy of container tree 124. In this way, client 116*a* synchronizes its local copy of the selected document's sub-tree with workspace server 112*h*'s master copy of the sub-tree prior to viewing and/or editing the selected document. Client 116*a* then unfreezes container tree 124 and method 1400 proceeds to step 1412.

When step 1412 begins, client 116*a* has a fully updated copy of the document sub-tree for the selected document. In step 1412, one of the editors included in client 116*a* is invoked to display the selected document to user 102*a* and, if user 102*a* has owner or worker privileges in the selected workspace 122*s*, to allow the user 102*a* to edit the selected document. Client 116*a* is able to determine the data type of the selected document based on the class of the parent article of the document sub-tree. Client 116*a* invokes the appropriate editor to display the document and to allow user 102*a* to edit it. Method 1400 then terminates.

If the selected document is a text document, such as text document 190, which is stored in document sub-tree 412 of container tree 124 (FIG. 5), then client 116*a* will initiate text editor 800. The operation of text editor 800 is explained below in the context of text document 190.

As described above, a text document is divided into sections which, in the present embodiment, correspond to the text document's paragraphs. Each paragraph is stored in a Paragraph_Article 370, which is contained in a sibling container. The sibling containers form a linked list in an order corresponding to the order of the associated paragraphs in the text document. The specific sibling container used for any particular paragraph depends on whether the paragraph contains elements other than text. The sibling containers have a common parent container 410. Text editor 800 is configured to display a text document to user 102 by progressively extracting, from the linked list of sibling containers, the text of each paragraph as well as any associated elements and displaying the extracted information.

Typically, text editor 800 will display text document 190 in a window on the display screen of client computer 119*a*. When text editor 800 is initially invoked to edit text document 190, it begins extracting and displaying the text of the first paragraph of document 190 from article 426 in container 424, and progressively extracts and displays text and other elements (such as graphic image 193 stored in containers 444, 448, 452 and 456) from successive sibling containers and their children to fill the display window in which document 190 is displayed. In typical fashion, text editor 800 provides a caret which may be moved in the display window by user 102*a* using typical caret navigation keys. When the caret is moved out of the portion of text document 190 displayed in the window, or when user 102*a* scrolls up or down through the text document 190, text editor 800 extracts additional text and other elements of the text document 190 from document sub-tree 412 and displays these elements. In this fashion, text editor 800 allows a user 102 to view any part of text document 190.

In addition to allowing a user 102 to view text document 190, text editor 800 also permits users 102 with owner or worker privileges in workspace 122 to edit the contents of the selected document, except for sections of the document stored in containers in which the user's user_handle has been entered in the container_excluded_handle_list field. Before allowing a user 102, such as user 102*a*, to edit a section of text document 190 (or in conjunction with allowing a user 102 to do so), client 116 obtains a lock for the corresponding container as described below. In this document, the term "edit a document" refers to any activity or operation that may modify the contents of the document or any section of it. In the case of a text document, this includes any change in the character_data field of a Paragraph_Article 370 in the document's sub-tree. Editing also includes any activity that may result in the addition of new sections to a document or the deletion of existing sections.

When a user 102 indicates that he wishes to edit a section of a document, client 116 checks the container_lock_handle field of its local copy of the associated container. If it is Null or if it the user_handle of user 102*a*, transmits a Lock request to workspace server 112*h* to lock the corresponding container, 140. If the container_lock_handle field is not Null, then text editor 800 provides an indication (such as a message on the screen of client computer 119*a* or an audio indication) that the container is locked by another user 102. Text editor is configured to interpret any of the following actions by a user 102 as an indication that the user wishes to edit a section of a text document:

(i) selecting the section of the document, or positioning the caret in a section and then pressing a "Lock" button; or
  (ii) positioning the caret in a section and then modifying the section by typing or deleting a character; or
  (iii) selecting the section of the document and pressing a tool button which modifies any attributes (such as bold, italic, underline, justification) of the selected text; or
  (iv) selecting the section of the document and pressing a "Cut" button to delete the selected section and place the contents in an internal clipboard; or
  (v) selecting the section of the document, or positioning the caret in a section and then pressing a "Paste" button to replace the selected section with the contents of the internal clipboard or insert the clipboard contents at the caret location respectively; or
  (vi) selecting the section of the document, or positioning the caret in a section and then pressing a tool button to replace the selected section with an embedded object or insert the embedded object at the caret location respectively.

In another embodiment of the present invention, some of these actions may not automatically be interpreted as an indication that a user 102 wishes to edit a section of a document and/or additional actions may be interpreted as such an indication.

For example, if text document 190 is displayed on the screen of client computer 119*a*, user 102*a* may edit paragraph 192*c* by positioning the caret in paragraph 192*c* and then pressing a Lock button displayed by text editor 800 or by pressing certain character keys on the attached keyboard or by deleting any portion of the text.

Text editor 800 is configured to allow a user 102 to simultaneously lock more than one section of a text document to facilitate editing of a portion of the text document longer than a paragraph. A user 102 may lock multiple sections of a text document by selecting, either via mouse or keyboard commands, some or all of the sections and pressing the Lock button. After locking one section of a text document, a user 102 may also lock additional sections of the document by moving the caret to another paragraph of the text document and pressing a character key or deleting one or more characters. In the present embodiment, text editor 800 is configured to allow only contiguous parts of a text document to be locked by one user 102. Accordingly, a user 102 may only obtain locks for paragraphs that are adjacent to one another in the list of child sibling containers of the parent container 410 of a text document (i.e containers 420, 424, 428, 432, 436 (FIG. 5) in the case of text document 190 (FIG. 2)).

When text editor 800 transmits a Lock Request message identifying one or more containers 140, workspace server 112*h* checks the container_lock_handle field of each indicated container. If all of the indicated containers 140 are unlocked, workspace server 112*h* locks all of them by setting their container_lock_handle field to the requesting user's user handle. Workspace server 112*h* then transmits a Confirm Lock message to text editor 800. Text editor 800 may then display the locked sections of the text document in a selected color to indicate that they have been locked. (Text editor 800 is a part of client 116 and is able to communicate with workspace server and other entities using the communication link established in step 1208). If one or more of the identified containers is already locked by another user 102 (i.e. the container_lock_handle field records the user_handle of the other user 102), workspace server 112*h* transmits a Refused Lock message to text editor 800.

In response to a Refused Lock message, text editor 800 may optionally be configured to display a message indicating that the paragraph (or, more precisely, its corresponding container 140) is locked by another user and therefore cannot be edited. The other user may or may not be identified in the message. For efficiency, text editor 802 may optionally be configured to allow a user to begin editing a paragraph after first indicating that he wishes to do so, but before a Confirm Lock message is received. This allows the user to edit paragraphs without delays resulting from communication delays between text editor 800 and workspace server 112*h*. If a Refused Lock message is received, any editing performed on the paragraph (or any formatting change) is discarded.

When workspace server 112*h* transmits a Confirm Lock message to a client 116, it also broadcasts a Lock Update message to all clients 116 connected with the workspace to advise them of the newly granted lock(s) and the user_ handle of the user 102 that obtained the lock(s). For example, if user 102*a* locks containers 424 and 428, workspace server 112*h* will transmit a Lock Update message to all clients indicating both user 102*a*'s user_handle and identifying the locked containers. Client 116*a*, which transmitted the Lock Request message, ignores the Lock Update message after determining that it relates to a lock obtained by client 116a. Alternatively, workspace server 112h may transmit a Lock Update message to all clients with the exception of the originating client 116a. Every other connected client 116 modifies the container_lock_handle field of the indicated containers 140, if those containers have been previously downloaded by the particular client 116. In this way, every client 116 that is currently displaying a document (through one of the editors built into the client 116) is advised of every lock granted for any section of the document. Similarly, workspace server 112h transmits an Unlock Update message advising all clients when a container is unlocked (See step 1511 (FIG. 17)).

While one user 102a is editing one locked portion (consisting of one or a more contiguous sections) of a text document, another user (i.e. user 102b) may lock and edit another portion of the text document. Workspace server 112h will accept and confirm Lock Requests from different clients 116 (or, more precisely, from their text editors) at the same time.

Each text editor 800 may display unlocked sections, sections locked by the local user (i.e. user 102a of the client 116a) and sections locked by other users 102 in different colors to identify their status. Text editor 800 may be configured to display sections locked by all different users in different colors, or may display the user_screen_name of the user 102 that has locked each section adjacent to or over the section. In this way, a user 102 is kept informed about any locked sections of the document that he is viewing, even if the user has no sections of the document locked.

When the user 102 has finished editing a part of a text document (which may be one or more contiguous sections) that he has previously locked, text editor 800 posts the edited sections by transmitting the following to workspace server 112h:

(i) a Post request;
 (ii) the container_id of the parent container of the container (or containers) that are being posted; and
 (iii) the modified containers 140 (including their articles 142 with their edited character_data fields) to be posted. If all sections associated with the locked containers have been provisionally removed from document sub-tree 412, there will be no modified containers 140 to be posted, and the Post request will be interpreted by workspace server 112h as a request to remove the locked containers from the master copy of container tree 124.

In the present exemplary embodiment, text editor 800 transmits the container_id of the parent container of the containers so that a single Post request may be used to identify the location in the container tree 124 under which the modified containers are to be posted. In an alternative embodiment, text editor 800 may post the new or updated container(s) by simply transmitting the Post request and the container(s) themselves.

The operation of the workspace server 112h when it receives the Post request is described below as method 1500.

In response to the Post request, workspace server 112h will transmit either a Confirm Post message or a Refuse Post message. If a Confirm Post message is received from workspace server 112h, then the provisionally posted containers are made permanent. If a Refuse Post message is received, then text editor 800 may be configured to discard the previously provisionally posted edits and restore the container sub-tree to the condition prior to obtaining the locks on the posted containers, or it may be configured to re-transmit the Post message one or more times, or it may be configured to display a message to user 102a and allow him to select a course of action, or a combination of these actions.

Text editor 800 may make various types of Post requests. The simple Post request above does not result in the containers that are being posted becoming unlocked. If the user 102a indicates that a lock is to be released, or if text editor 800 determines that a lock must be released, text editor 800 will transmit a Post and Unlock request, which is otherwise the same as a Post request.

As user 102a edits a text document, text editor 800 automatically adds and deletes containers in a provisional list of child sibling containers of the parent container 410 of the document sub-tree as new sections (paragraphs) are added and deleted. Text editor 800 also permits the user 102a to add, edit or delete embedded elements within paragraphs. When the user 102 attempts to edit or delete an element embedded within a paragraph, text editor 800 requests a lock, as described above, for the associated child container of the sibling container in which the paragraph text is stored. Text editor 800 then invokes the appropriate editor for the type of embedded data. If the embedded data is text, then text editor 800 may control the editing of the embedded text itself or may invoke another instance of a text editor 800 to control the editing of the embedded text.

To create a new paragraph and add it to a text document, the user 102 typically presses the Enter key while the caret is positioned in a paragraph ("the current paragraph") which is either unlocked or is locked by the user 102. If the user presses the Enter key while the caret lies in an unlocked paragraph, client 116 transmits a Lock request to gain a lock on the unlocked paragraph. A new paragraph is created and inserted into the text document either before or after the current paragraph depending on the position of the caret when the Enter key is pressed. If the caret lies prior to the first character in the current paragraph, a new empty paragraph is inserted into the document prior to the current paragraph. If the caret lies within the current paragraph, the current paragraph is truncated at the caret location and the remaining character data is used to initialize a new paragraph which is inserted after the current paragraph. If the caret lies after the final character in the current paragraph, a new empty paragraph is inserted into the document after current paragraph. User 102a may similarly add new paragraphs immediately prior to, within, between, or immediately after paragraphs locked by the user 102a. Whenever a new paragraph is created, text editor 800 creates a new Sibling_Childless_Container 316 (FIG. 7) for the new paragraph and links it into the provisional list of child sibling containers of the parent container for the document sub-tree. If an embedded element is subsequently added to the paragraph, the Sibling_Childless_Container 316 may be replaced with a Sibling_Array_Container 314 or a Sibling_List_Container 312 (FIG. 7).

Text editor 800 manages merging of adjacent paragraphs in a similar manner. If the user 102 presses the Backspace key while the caret is positioned prior to the first character in a paragraph, an attempt is made to merge the current paragraph with the previous paragraph. If the user 102 presses the Delete key while the caret is positioned after the final character in a paragraph, an attempt is made to merge the current paragraph with the next paragraph. If either of the paragraphs to be merged is not locked by user 102a, text editor 800 makes a Lock request for unlocked paragraph(s). If the lock(s) are confirmed by the workspace server 112h, then text editor 800 combines the paragraphs by extracting the character data from one paragraph (or more precisely, from the Paragraph_Article field of the article 142 contained within the container 140 corresponding to the paragraph) and adding it to the character data in the other paragraph. Text editor 800 removes the empty paragraph from the document and removes its corresponding sibling container from the provisional list of sibling containers in the document sub-tree, updating the list_next_pointer and list_previous_pointer fields of the adjacent containers in the provisional list. During a later Post request, workspace server 112*h* replaces the two locked containers 140 with the single container containing the merged Paragraph_Article.

When the user 102 has completed editing a contiguous portion of the document (which may include embedded elements, or may comprise an entire embedded element or contiguous sections of an embedded element or a single section of an embedded element), text editor 800 (or another editor invoked to control editing of an embedded element) provisionally creates new containers and/or modifies existing containers and posts them to workspace server 112*h*. For each new paragraph in the text document, a new container (typically a Sibling_Childless_Container 316) and a new Paragraph_Article 370 (with character_data field set to new text), is provisionally created. The remaining fields of the new containers are also appropriately initialized. Upon receiving a Confirm Post message from workspace server 112*h*, text editor 800 (or another editor invoked to control editing of an embedded element) freezes its local copy of container tree 124, updates the document sub-tree (making provisional containers permanent), and unfreezes container tree 124.

Text editor 800 (and any other editor that is invoked by text editor 800) also modifies the contents of the parent article of a document sub-tree to update the summary_history field to track major events in the history of a document, the text_format and text_document_format fields to modify the default text and document formats, as well as the formatting_data and change_tracking_data fields to track subsequent format changes and the editing history of the document. Some fields of the parent article, such as the text_document_statistics field, may not be calculable until child containers are ready to be posted. To avoid persistently locking the parent container during multi-user editing sessions so that calculated fields in its parent article may be updated, an alternative form of a Post request may be used to post the unlocked parent container 410 at the same time as the child containers are posted. In this form, text editor 800 updates the calculated fields in a provisional copy of the parent article in anticipation of workspace server 112*h* successfully replacing the unlocked parent container 410. The parent container and new or modified child containers are posted to workspace server 112*h* using a Blind Post request as described below in step 1506 of method 1500 in FIG. 17.

Reference is made to FIGS. 2 and 4. For example, as user 102*a* is editing text document 190, text editor 800 updates the structure and contents of its local copy of container sub-tree 412. If user 102*a* is editing paragraph 192*a*, then text editor 800 will have obtained a lock for container 420 for user 102*a*. If user 102*a* then moves the caret into paragraph 192*b* and begins to edit it, text editor 800 will obtain a lock on container 424. If user 102*a* then moves the caret into graphic image 194 and indicates that he wishes to edit it (for example, by double clicking on graphic image 194), then text editor 800 will invoke a graphic image editor 802 to control the editing of graphic image 194. In the present embodiment, when user 102*a* initiates editing of an embedded element, text editor 800 posts and unlocks all containers that it currently has locked before allowing the embedded element to be edited. Graphic image editor 802 is then invoked and allows user 102*a* to identify one or more sections of graphic image 194 that he wishes to edit. When user 102*a* identifies a section, graphic image editor 802 obtains a lock on the corresponding container. For example, if user 102*a* wishes to edit the upper right corner of graphic image 194, then graphic image editor 802 will obtain a lock on container 450. Simultaneously, another user 102 may lock another section of graphic image 194 by locking one or more of containers 444, 452 and 456. In this way, two users 102*a* may simultaneously edit different sections of an embedded element in a text document. Graphic image editor 802 may display the boundaries of locked sections of graphic image 194 in different colors to identify users 102 that have locked those sections, based on the locks that graphic image editor 802 has obtained and based on Lock Update messages received from workspace server 112*h*.

In another embodiment, the text editor may allow embedded elements to be edited without releasing its locked containers. Such a text editor may be configured to lock non-embedded and embedded sections of a document, either contiguously (based on their appearance in the document) or non-contiguously.

If a user 102 wishes to edit the overall image attributes of graphic image 194, then graphic image editor 802 will obtain a lock on container 440 and display a dialog box which allows the editable attributes recorded in the image_attributes field to be edited. Graphic image editor 802 will then post container 440.

If a user 102 wishes to modify the way in which graphic image 194 is divided into sections, the graphic image editor 802 will obtain a lock on container 440 and all of its child containers 444, 448, 452, 456 that are used to store graphic image 194 and then display a dialog box allowing user 102 to specify the new division of image 194 into sections. Graphic image editor 802 will then modify the child containers (including adding and/or deleting containers) as well as modifying container 444 (the array_dimensions and child_array fields). Graphic image editor 802 will then post all of the locked containers.

Prior to posting any container, text editor 800 and graphic image editor 802 (and all other parts of client 116) recalculate the container_article_length field of the container.

The operation of other editors built into client 116 in the present embodiment is analogous to the operation of text editor 800. Each particular editor has some operational differences based on the type of document that the editor is intended for.

The presentation editor 804 is configured to allow a user 102 to edit the structure and content of a presentation document, such as presentation document 200. Incorporated within presentation editor 804 is a slide editor 810 that is invoked to allow a user 102 to edit an individual slide. A slide may comprise various types of data such as text (i.e. paragraphs 214 on slide 202), images (i.e. graphic image 220 on slide 206), shapes (i.e. vertical line 210 on slide 202 and arrow 216 on slide 204), windows for displaying audio/video clips (i.e. audio/video clip 218 on slide 204) and other elements.

To edit the contents of these individual elements, slide editor 810 invokes an appropriate editor that is configured to lock the associated containers 140, allow a user 102 to edit the articles of the containers, update the container fields and then post the revised containers 140. In some cases, a user may wish to make a common change to one or more elements on a slide. For example, a user may wish to select a number of elements and move them all 20 pixels to the left. Slide editor 810 allows this by obtaining a lock for the containers corresponding to all of the selected elements, allowing the user to specify the change desired and then modifying the articles of all of the locked containers before posting them. In this example, the article_window field of the associated article for each element would be modified. (Child containers used to store parts of elements, such as pixel blocks, may not need to be modified. For example, to move and/or resize graphic image 206, only the article_window field of article 532, in container 530, must be changed.)

If a user 102 attempts to move a single element in a slide, it may be desirable to allow the user to do so by simply clicking and holding on the element, dragging it to a new location and unclicking. To facilitate this, slide editor 810 is configured to transmit a Lock Request to obtain a lock for the container associated with the article, and then to transmit a Post and Unlock request after the Lock is obtained and after the user 102 is finished moving the element. It is possible that due to communication speed limitations, the user may be finished moving the element before the lock is obtained. In this case, slide editor waits until after the lock is obtained to modify the locked container and then posts it. If the Lock request or the Post request is refused by the workspace server 112*h*, the element is returned to its original position prior to the user clicking on it, and an explanatory message is displayed to the user 102. Alternatively, slide editor 810 may be configured to allow a user to move or edit a slide element without locking it. When the user has completed the move or editing operation, the container corresponding to the element is posted using a Blind Post request described below in step 1506 of method 1500 in FIG. 17.

Changes to the default properties of the presentation are controlled by the presentation editor 804 in a similar way by locking the parent container of the presentation document's document sub-tree, allowing the default_background, default_title_properties, default_text_properties and default_shapes of its article to be edited, then transmitting a Post and Unlock message to update the parent container and its article.

The other editors of clients 116 are similarly configured to allow documents and embedded elements within documents to be edited by a user by locking the containers associated with one or more sections of the document or element, allowing the user to edit the selected sections, updating the articles of the locked containers and posting the locked containers.

The contiguity rule described above in relation to text editor 800 is not applied by graphic image editor 802, presentation editor 804, table editor 806, audio/video clip editor 808 or slide editor 810. Documents typically edited by these editors 802, 804, 806, 808, 810 are stored using an Array_Container 304 at the head of the document sub-tree. In addition, embedded elements (such as graphic image 194 (FIG. 2) edited by these editors are typically stored in a portion of a document sub-tree that has an Array_Container 304 as a parent (typically the Array_Container will be a child of another container, such as a List container (for example, Array_Container 440, which is the parent of a part of document sub-tree 412 is itself the child of container 424)). In both cases, the child containers of an Array_Container 304 typically do not have any inherent or necessary "next" or "previous" relationship between them, and accordingly the concept of contiguity does not apply.

The child containers of an Array_Container 304 (such as container 494 (FIG. 6)) may have an order relationship. For example, the "z-order" of elements (the order in which elements are drawn on a slide, so that elements drawn later overlap or obscure elements drawn earlier) in a slide may be determined by the order in which the pointer to the child container associated with each element appears in the child_array field of their common parent Array Container 304. If a user edits the z-order of elements in a slide, slide editor 810 will lock the Array Container 304, edit its child_array field, and post the container. This allows the z-order of elements to be changed without locking all containers for each element being reordered and may reduce the amount of data that must be transferred if the elements being reordered are large.

Figure 17:
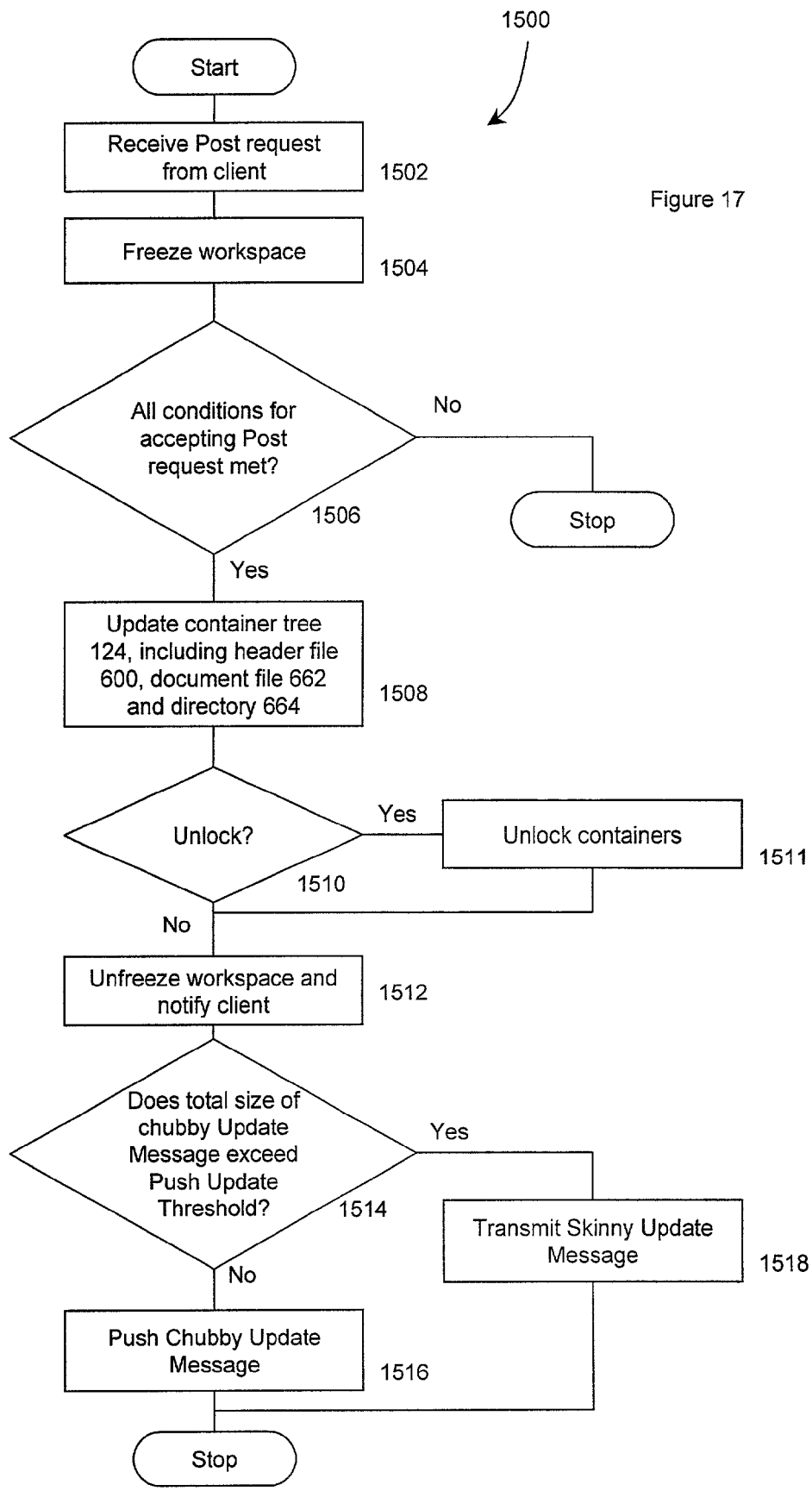
FIG. 17 illustrates a Post transaction according to the present invention.
Figure 18:
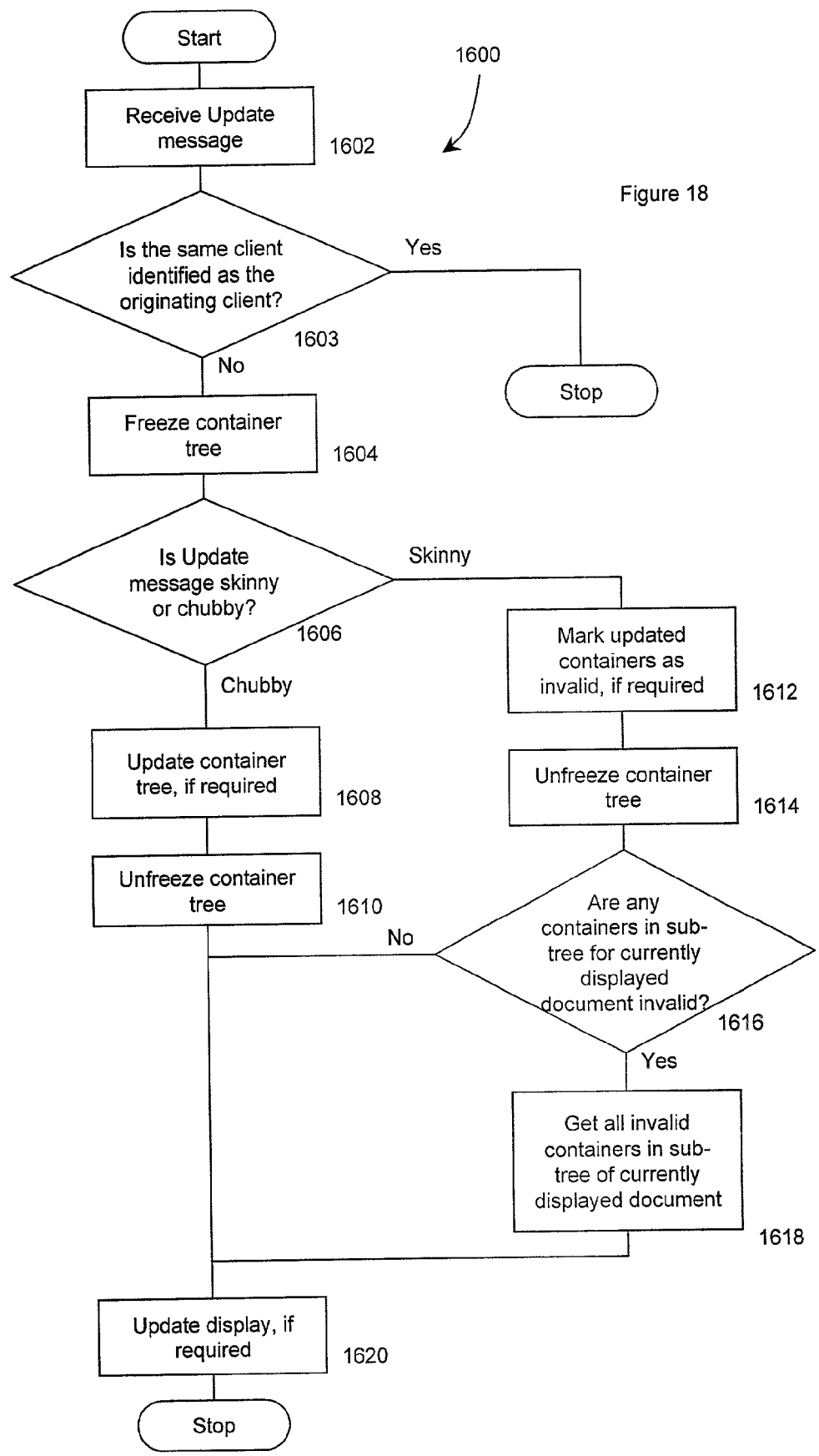
FIG. 18 illustrates a method for processing an Update message according to the present invention.

Reference is next made to FIG. 17 which illustrates a method 1500 by which a workspace server 112*h* responds to a Post or a Post and Unlock message from a client 116, such as client 116*a*. Method 1500 begins in step 1502, in which workspace server 112*h* receives a Post request from client 116*a*.

Method 1500 next proceeds to step 1504 in which workspace server 112*h* freezes its master copy of the container tree 124, effectively freezing the header file 660 and the document files 662. As described above in relation to step 1208 (FIG. 14*a*), a separate process is instantiated within workspace server 112*h* to handle every client that connects to workspace 122*s*. Freezing the master copy of the container tree 124 ensures that none of these other processes modifies shared structures while the Post request is being handled.

Method 1500 next proceeds to step 1506, in which workspace server 112*h* checks its master copy of the container tree 124 to ensure that the Post request may be completely accepted. The Post request received in step 1502 may include containers that are being blindly posted by client 116*a* (i.e. which are being posted without having been previously locked by client 116*a*) and containers 140 which are being posted after having previously being locked by client 116*a* (i.e a regular Post request).

Workspace server 112*h* will accept a Blind Post request for a container 140 if:
  i. the container is not currently locked by any user 102 other than user 102*a*;
  ii. the time stamp of the container received from in the Post request matches the time stamp of the container in the master copy of the container tree 124.

Every time that workspace server 112*h* modifies a container 140 in the master copy of container tree 124, it updates the time stamp of the container (in step 1508). If the time stamp of a blindly posted container 140 is different from the time stamp of the same container 140 in master copy of container tree 124, then the container 140 in the master copy of container tree 124 has been modified after the container 140 was last received by client 116*a*, (either as part of an Update message or at the request of client 116*a*). This may occur if the container 140 has just been posted by another client 116, but an Update message relating to the Post request has not yet been processed by client 116*a*. If the container 140 in the master copy of the container tree was to be replaced with the posted container 140, any such modification would likely be lost. Accordingly, if the two time stamps do not match, the Blind Post request is refused.

Workspace server 112*h* will accept a regular Post request if the container is locked in the master copy of container tree 124 by user 102*a* (i.e. the container_lock_handle field of the container contains user 102*a*'s user_handle).

If any of the conditions for posting any container in the Post request are not met, whether the container is being blindly posted or regularly posted, then workspace server 112*h* returns a Post Refused message to client 116 and method 1500 ends. A Post Refused message may include an explanation of the reason that a Post request was refused, allowing the client 116 that originated the Post request to display an appropriate message to its user 102 proceeds to step 1508.

In step 1508, workspace server 112*h* modifies the container tree 124 to include the containers posted by client 116*a*. This may involve editing header file 660 and/or document files 662. Any out-dated containers 140 are discarded. In another embodiment, such out-dated containers may be stored temporarily or permanently to allow older versions of documents stored in a workspace 122 to be recreated. If a new container 140 is posted (i.e. a container 140 that did not exist in the container tree 124 previously), it is added to the container tree 124 and header file 660 and document files 662 are updated accordingly.

System 100 supports several different types of Post requests, which may be specific to the kind of parent container 410 involved. The response of workspace server 112*h* to the Post request received in step 1502 may depend on the type of containers 410 involved.

For example, in the present embodiment, text document 190 is stored using a List_Container 302 as the parent container 410 of document sub-tree 412 and using sibling containers 420, 424, 428, 432 and 436 to store paragraphs 192*a*, 192*b*, 192*c*, 192*d* and 192*e*. When a user 102*a* has containers 428 and 432 (which correspond to paragraphs 192*c* and 192*d*) locked, user 102*a* may perform any editing operation that adds paragraphs before paragraphs 192*c*, between paragraphs 192*c* and 192*d* or after paragraph 192*d*. Similarly, user 102*a* may delete either or both of paragraphs 192*c* or 192*d*. Any such operation will result in fewer or more containers being posted to workspace server 112*h* than were initially locked. To simplify such post operations with respect to sibling lists, workspace server 112*h* processes them by splicing all of the posted containers into the sibling list, in the place of the previously locked containers 428 and 432. As part of the splice operation, workspace server 112*h* updates the list_next_pointer and list_previous_pointer fields of any containers adjacent to the newly spliced containers in the sibling list.

Similarly, post transactions relating to Array_Container 304 and its children may be handled using an add children operation, which adds one or more posted containers to the Array_Container's list of child of containers 140, a replace children operation, which allows some or all of the containers 140 locked by a client 116*a* to be replaced in one Post request or delete children operation, which allows some or all of the containers 140 locked by a client 116*a* to be deleted.

All containers 140 successfully posted by a client will be valid containers and will accordingly have their container_valid flags set to TRUE. All containers that are stored in the header file 660 and document file 662 at any time are considered valid containers, even if they are locked and are currently being edited by a user 102.

Method 1500 next proceeds to decision step 1510. If the Post request received from client 116*a* includes an Unlock request, method 1500 proceeds to step 1511. Otherwise, the request is merely a Post request and method 1500 proceeds to step 1512.

In step 1511, workspace server 112*h* unlocks all containers included in the current Post and Unlock request (other than those containers deleted in step 1508) by setting their respective container_lock_handle fields to Null.

Method 1500 next proceeds to step 1512, in which the workspace is unfrozen. Workspace 112*h* returns a Confirm Post message to client 116. In response, client 116 freezes its local copy of container tree 124, updates container tree 124, then unfreezes container tree 124. New containers 140 which were provisionally created by client 116 prior to the Post request are added to container tree 124. Existing containers for which provisional copies were made by client 116 prior to the Post request are replaced in container tree 124. In this way, client 116's local copy of container tree 124 is synchronized with workspace server 112*h*'s master copy of container tree 124.

Method 1500 next proceeds to decision step 1514, in which workspace server 112*h* determines the method in which all clients 116 that are connected to the workspace 122 are to be advised of the changes to the container tree 124.

Workspace server 112*h* determines the size of an Update Message corresponding to the Post request received in step 1502, including, if applicable, an Unlock message. Workspace server 112*h* may do this by summing the sizes of all posted containers and any additional information that may have to be sent, such as the identify of the originating client 116*a*. The size of such an Update message is compared to a selected Push Update Threshold. In the present embodiment, the Push Update Threshold is 32 kilobytes, although a different threshold may be chosen based on the speed of the communication network 114 and other factors. If the Update Message exceeds the Push Update Threshold, method 1500 proceeds to step 1518. Otherwise, method 1500 proceeds to step 1516.

In step 1516, workspace server 112*h* prepares an Update Message containing the entire posted sub-tree, including the contents of every container 140 that was posted, and identifies containers that have been unlocked as part of the Post request. The Update Message also identifies the client 116 (the "originating client") from which the Post request was received in step 1502. Each posted container is set out in its current valid form as it is recorded in the header file 660 or the document files 662. This Update Message is referred to as a "Chubby Update Message", since it includes the entire posted sub-tree and the full contents of the containers updated in step 1508. Workspace server 112*h* then transmits the Update Message to all clients connected to the workspace. Method 1500 then ends.

In step 1518, workspace server 112*h* creates a "Skinny Update Message" which comprises the entire posted container sub-tree with the container_article field set to Null for all containers. Each container in the sub-tree is transmitted in a special format in which each node contains the container_id of the container 140 at that node and a "post_flag", which is marked TRUE if the container was posted, and FALSE if it was not posted in step 1508. The Skinny Update Message also identifies the originating client 116 from which the Post request was received in step 1502. Workspace server 112*h* transmits the Skinny Update Message to all clients 116 connected to the workspace 122. Method 1500 then ends.

Workspace server 112*h* broadcasts Update messages to all clients 116 connected with an active workspace 122 in response to various client-server transactions. In this way, every client 116 that is currently connected to workspace 122*s* is advised of the activities of every other client 116 as they are posted. A client 116*a* which performs the originating transaction ignores all Update messages that relate to its own connection. Clients 116 respond to an Update message in a manner that is appropriate to the kind of Update message being broadcasted. System 100 supports several different kinds of Update messages, including Connect Update, Disconnect Update, Lock Update, Unlock Update, Post Update, Post and Unlock Update, etc. The Update message corresponds to the originating transaction and additionally includes the user_handle of the originating user.

Reference is next made to FIG. 18, which illustrates a method 1600 by which a client 116 processes an Post Update message (which may be Chubby or Skinny) from a workspace server 112h.

Method 1600 begins in step 1602 in which the client 116 receives the Update Message.

Method 1600 next proceeds to decision step 1603, in which the originating user 102 of the Post which resulted in the Update Message is identified. If the originating user 102 is the same user operating the client 116, then the Update Message is discarded and method 1600 ends. Otherwise, method 1600 proceeds to step 1604.

In step 1604, the client 116 freezes its local copy of the container tree 124 to ensure that no editor or other process modifies the container tree.

Method 1600 next proceeds to decision step 1606. If the received Update Message is Chubby, then method 1600 proceeds to step 1608. Otherwise, method 1600 proceeds to step 1612.

In step 1608, client 116 updates its local copy of the container tree 124 to include the updated containers 140. If the Chubby Update Message relates to a document for which client 116 has never done a View/Edit transaction (Method 1400, FIG. 16) during the current session, then only the parent container 410 of the document is updated. The remaining containers in the Chubby Update Message are discarded. If, within the document sub-tree for a document for which a View/Edit transaction has been performed, client 116 has not previously gotten a container that is indicated in the Chubby Update Message, the container is added to the client's local copy of container tree 124 and is updated. If the Chubby Update Message indicates that a container 140 has been deleted from container tree 124, client 116 deletes the container 140 from its local copy of container tree 124.

Method 1600 next proceeds to step 1610, in which client 116 unfreezes its local copy of container tree 124. Method 1600 next proceeds to step 1620.

In step 1612, client 116 marks its local copy of each container 140 indicated in the Skinny Update Message as invalid by setting the container's container_valid flag to FALSE. If the Skinny Update Message relates to a document for which client 116 has never done a View/Edit transaction (Method 1400, FIG. 16) during the current session, then only the parent container 410 of the document is marked as invalid. The remaining containers in the Skinny Update Message are discarded. If, within the document sub-tree for a document for which a View/Edit transaction has been performed, client 116 has not previously gotten a container that is indicated in the Skinny Update Message, the container is added to the client's local copy of container tree 124 and marked as invalid. Fields of the new container 140 that are not included in the Skinny Update Message (i.e. the container_article field) are left blank. If the Skinny Update Message indicates that a container 140 has been deleted from container tree 124, client 116 deletes the container 140 from its local copy of container tree 124.

Method 1600 next proceeds to step 1614, in which client 116 unfreezes the container tree 124.

Method 1600 next proceeds to step 1616, in which client 116 determines if any container in the document sub-tree of the document it is currently displaying has been marked as invalid. If not, method 1600 proceeds to step 1620. Otherwise, method 1600 proceeds to step 1618.

In step 1618, client 116 gets all invalid containers in the document sub-tree for the document that it is currently displaying. This is done in the same manner as in step 1406. Method 1600 next proceeds to step 1620.

In step 1620, client 116 updates its display if required. For example, during text editing, this may result in some paragraphs that are currently being displayed being modified due to edits originated in other clients 116. The associated user 102 (i.e. user 102a of client 116a) will then be able to see any edits made by any other user, soon after the edits were posted to workspace server 112h.

In this way, changes made by any user 102 to a document in a workspace 122 are transmitted to all other connected clients to be displayed to their associated users 102. The use of Skinny Update Messages to simply indicate that a change has been made to a container rendering the copy stored by a client invalid has the advantage that a comparatively small Skinny Update Message suffices to ensure that a client does not erroneously display an out-of-date section of a document, without requiring a possibly lengthy Chubby Update Message, which may simply be discarded by client 116 in step 1608, to be transmitted.

In other embodiments, method 1600 may operate differently. For example, in an alternative embodiment, all Update Messages may be Chubby. This may require substantially more data to be transmitted to all clients, but eliminates the need to update invalid containers as in step 1618. In another embodiment, all Update Messages may be Skinny, so that a document which was previously viewed, but is not currently being viewed by a user 102 is not kept up to date, potentially reducing the memory requirements for container tree 124.

In another embodiment, clients 116 may be configured to update their document sub-trees for a document that is not currently being displayed when a Chubby Update Message is received only if it is smaller than a selected threshold. If the Chubby Update Message exceeds the threshold, all containers in the client's local copy of the document sub-tree are deleted, and if the associated user decides to view or edit the document again, the client gets it in step 1408.

One embodiment of the present invention is implemented using Java™, a non-platform specific programming language that operates within network browsers. This has the advantage that system 100 may be used on any platform that supports Java. This is not necessary, however, and any particular embodiment of present invention may operate only on one or more selected platforms and specific versions of clients 116 may be developed for each platform. A skilled person will recognize that Java does not support multiple inheritance, which is used to describe the definition of container and article classes. A skilled person will be capable of defining equivalent container and article classes without using multiple inheritance. Alternatively, the present invention may be implemented using a programming environment such as Microsoft™ C# and .NET™.

In another embodiment of the present invention, it may be desirable to limit users 102 from having multiple simultaneous logins to the system, or from connecting to more than one workspace at a time. In such an embodiment, a presence table may be used. A presence table includes one record for each user 102 who is presently logged into the system. The record for each user has the following structure:

| Field | Contents |
| --- | --- |
| presence_handle | Unique identifier identical to the user_handle field of the user 102's user record in user database 106 |
| presence_id | Unique identifier identical to the workspace_id field for the workspace 122 to which user 102 is presently connected, or Null in the event user 102 is not presently connected to a workspace 122 |
| presence_time_stamp | Records the last time at which the user 102 communicated with a master server 110. This field is kept up to date by the master servers 110. |

The presence table is used to measure overall user load on the system and to prevent duplicate logins. It is also used to timeout and disconnect inactive users 102. When a user 102 performs a Login transaction as described above in method 1000 (FIG. 12), a record is added to the presence table with its presence_handle field set to the user_handle of the user 102 and the presence_id field set to Null. When the user 102 performs a Connect transaction and opens a workspace 122 as described above in method 1200 (FIGS. 14a and 14b), the presence_id field of user 102's record in presence table 109 is updated to record the workspace_id of the newly opened workspace 122. When the user 102 disconnects from a workspace 122, the presence_id field of user 102's record in presence table 109 is reset to Null. When the user 102 logs out of system 100, the user 102's record is removed from presence table 109.

Using the presence table, a master server 110 may forcibly log out users who are not actively using the system. If a user's record in the presence table indicates that the user is not connected to a workspace (i.e. the presence_id field is Null) and the presence_time_stamp field has not been updated for a selected time_out_threshold, the user may be forcibly logged out.

Similarly, workspaces servers 112 may use a separate presence table to track the activity of each user connected to a workspace. A user who has not communicated with a workspace server 112 for a selected timeout threshold may be forcibly disconnected from the workspace. Depending on the environment in which a particular embodiment is implemented, the environment may provide a facility for timing out inactive connections between workspace servers 112 and clients 116.

System 100 has been described using a single container tree for storing all documents within a workspace 122. In an alternative embodiment, different data structures may be used to store the document sub-tree for each document within a workspace. As an example of such an embodiment, each workspace may be stored within a single folder or directory within file system 104. Within the single directory, each document sub-tree may stored in a separate file. The member list 143 may be stored in a separate file, which may have a pre-selected name and the contents of the root container 400 of the workspace 122 may be set out in a separate file, which may also have a pre-selected name.

The Update messages transmitted by a workspace server 112 to update clients 116 regarding locks, posts, membership changes, etc. have been described as being sent to all clients 116, including the client 116 that originated a Post message that then resulted in the Update message. The originating client has been described as ignoring such Update messages. In an alternative embodiment, the originating client may be excluded from the broadcast of such Update messages.

As mentioned above in relation to step 1208, when a client 116 connects to a workspace server 112, the workspace server initiates a separate process to communicate with the client 116. Client 116 initiates two separate threads to communicate with the separate process created for the client 116: a primary communication thread and a listener thread. The primary communication thread is used to perform Lock requests, Get Requests, Post Requests and other communications with the workspace server. The listener thread is intended only to receive Update messages from the workspace server 112. In another embodiment, the workspace server 112 may initiate a single broadcast thread which communicates with the listener threads of all clients 116 connected to a workspace 122.

In another embodiment of a system according to the present invention, the contents of some or all of the articles 142 contained within the containers 140 may be encrypted. Typically, the containers 140 will not be encrypted to allow the other container fields to be read. By encrypting only the contents of articles 142, the contents of the stored document may be concealed. Every member of a workspace, or at least every connected member of a workspace 122 may be provided with a key for decrypting the encrypted articles.

In system 100, clients 116 create provisional containers to store modified versions of containers 140 which are then posted to workspace server 112h. If the Post request is confirmed, the provisional containers are made permanent by adding them to the client's local copy of the container tree 124. Alternatively, the client 116 may be configured to modify its local copy of container tree 124 and to store the original version of modified containers in provisional containers, which would then be re-inserted into the client's local container tree 124, if a related Post request is refused.

In system 100, header file 660 and document files 662 are kept up-to-date at all times by workspace server 112h. The parent container 410 for each document sub-tree is stored in both the header file 660 and one document file 662. To improve the efficiency of updating a parent container 410, the directory 664 record for each parent container 410 in the header file 660 may include a field for indicating that the parent container 410 has been modified, but that the modification has not been made in the corresponding document file 662. Subsequently, when the document file 662 is accessed, the parent container 410 may be updated in conjunction with another change to it.

System 100 has been described with an Array_Container 304 as its root container 400. In an alternative embodiment, a List_Container 302 may be used as the root container 400 for a workspace 122. In this case, Sibling_List_Containers 312 and Sibling_Array_Containers 314 may be used in the place of List_Containers 302 and Array_Containers 304 as the parent containers 410 for document sub-trees.

In system 100, embedded data is defined in direct or indirect child containers of another container. In an alternative embodiment, data may be embedded in a document by reference. An "Embed_By Reference_Article" may be used to refer to a container at the head a sub-tree that stores the embedded data. An editor included in client 116 may be configured to treat the embedded data as if it was linked directly in the document sub-tree.

When a user logs in to system 100, a complete up-to-date client is installed on the user's client computer 119a in step 1005, if necessary. In an alternative embodiment, only those portions of client 116 that are needed by a user 102 may be transmitted to the client computer 119. For example, the user may be provided with a list of out-of-date components in his installed client 116 and may be permitted to select the components that he wishes to update. If any other component becomes necessary for client 116, that additional component may be subsequently updated. Alternatively, each component of client 116 may be updated automatically every time it is invoked by first checking to see if the latest version of the component is included in a user's installed client 116 and automatically updating it if the installed version is out-of-date. These alternatives allow a user 102 to login to the system without obtaining an update for many components that the user 102 may not use during a particular session or at all.

In system 100, a member's privileges within a workspace are defined in the member's record 144 in the workspace's member list 143 and are constant for all documents in the workspace 122. Alternatively, a member's privileges may be defined for each document in a workspace, as mentioned above. In addition, various editing operations for each document may be restricted to certain members. For example, an owner of a text document may be permitted to change its default text_attributes, but workers may not be permitted to modify this field or the formatting_data field of any Paragraph_Article 370. This allows only the owner to modify the text_attributes of the entire document. At the same time, another document may have different restrictions for the members permitted to access it.

System 100 has been described as permitting a user 102 to edit a document in a window using an editor incorporated into client 116. An editor may be configured to allow a user to open multiple windows for a single document. Each window independently displays one or more sections of the document. Similarly, two or more different editors, or two or more instances of the same editor, may be instantiated to allow a user 102 to simultaneously edit two or more documents within a workspace 122.

Figure 19:
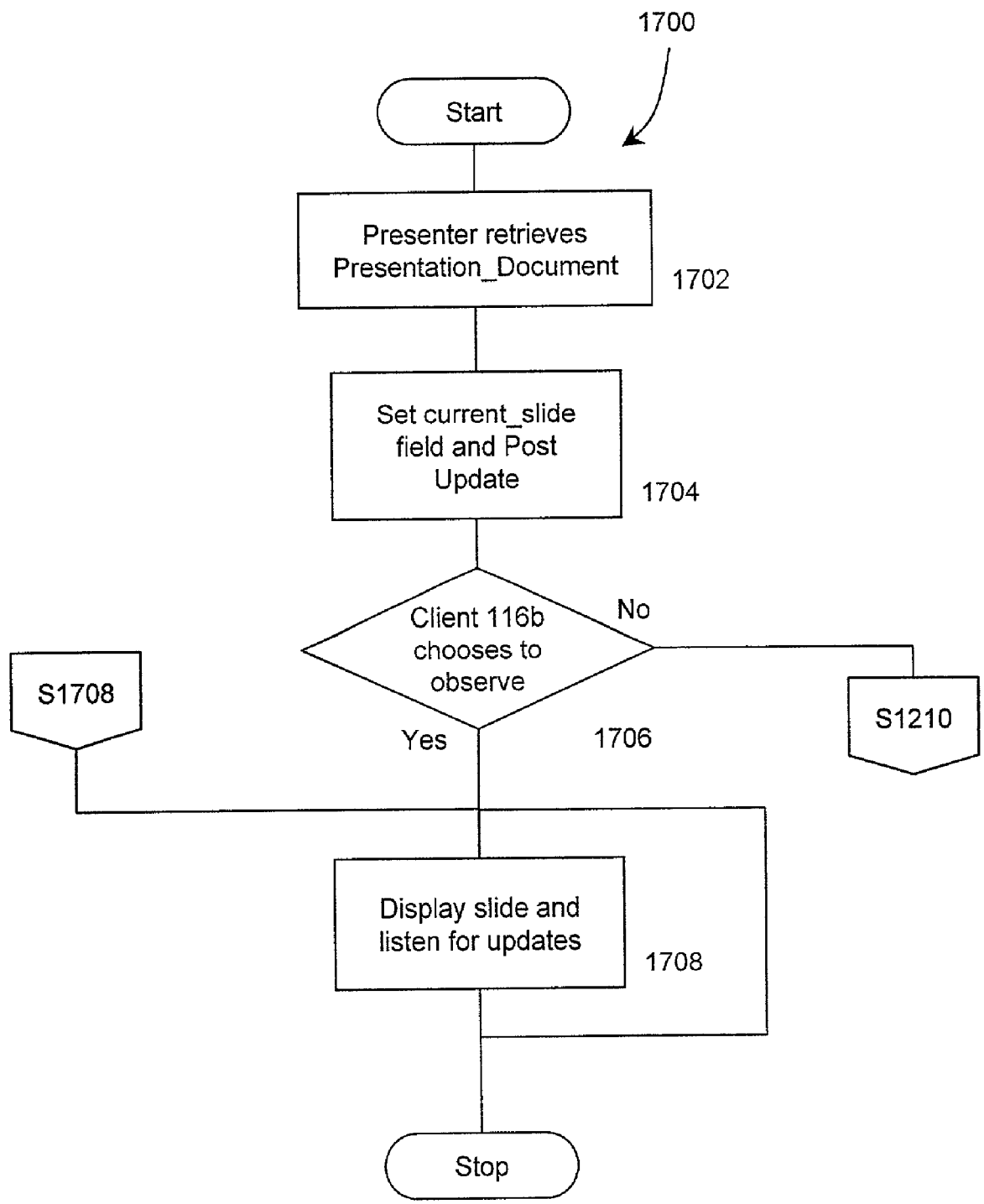
FIG. 19 illustrates a method for conducting a presentation according to the present invention.

Reference is next made to FIG. 19, which illustrates a method 1700 for conducting a "live" presentation of a presentation document. A user 102 with owner or worker privileges in a workspace 122 may conduct a live presentation using a presentation document, such as presentation document 200. The user 102 who conducts the presentation is the "presenter" and all other users 102 who are connected to workspace server 112h and who observe the presentation are "observers". More than one presentation may be conducted at the same time in a workspace 122. While a presenter is conducting a presentation and observers are observing it, other non-observing users 102 who are connected to workspace 122 may simultaneously view or edit any document in the workspace 122, including the presentation document being presented.

Method 1700 begins in step 1702, in which a presenter 102a's client 116a sends a Get Document request to workspace server 112h as described above in step 1216 of method 1200 to retrieve a presentation document.

Method 1700 proceeds to step 1704, in which presenter 102a starts a presentation. To start a presentation, client 116a sets the current_slide field of the parent Presentation_Document_Article 364 to the value of the slide_identifier field of a selected initial Slide_Article 366, and then blindly posts the parent container 410 as described above in method 1500.

Every other client 116 that receives the Post Update message determines that the Post Update message relates to the start of a presentation. The other clients 116, which may be referred to as observer clients, may make this determination by observing that the current_slide field of the parent article has changed from −1 to another value, or based on a "Begin Presentation" indicator included with the Post Update message.

Method 1700 next proceeds to decision step 1706. Each observer client displays a message to its associated user 102 indicating that the presentation is starting. The associated user 102 may choose to observe the presentation or ignore it. If the user 102 chooses to observe the presentation, method 1700 proceeds to step 1708. Otherwise, method 1700 terminates. A user 102 may choose to later observe an active presentation, in which case, method 1700 is entered at step 1708.

In step 1708, the observer client automatically activates a presentation viewer and gets the presentation document if it has not already been gotten. The presentation viewer displays the slide corresponding to the current_slide field of the parent article. The presentation viewer responds to subsequent Update Post messages, generated by workspace server 112 in response to presenter 102a re-posting the parent container, by displaying the slide corresponding to the current_slide field of the parent Presentation_Document_Article 364. If the current_slide field is set to −1, the presentation is complete and client 116b goes to step 1210.

If a user 102 who is not observing a presentation chooses to perform a View/Edit Transaction for the associated presentation document, presentation editor 804 prompts the user 102 with a suitable message such as "This presentation is in progress. Do you wish to observe?". If the user 102 chooses to observe the presentation, his presentation viewer is activated and the current slide is extracted and displayed as described above. If the user 102 chooses not to observe, he may later press a "Join Presentation" button, which is displayed by presentation editor 804 and slide editor 810 during an active presentation, to later observe.

An exemplary embodiment of the present invention has been described in detail and several alternatives for some aspects of the invention have been described. Many other variations may be made within the scope of the present invention, which is limited only by the appended claims.

APPENDIX A – Contents of containers and articles in Container Tree 124

Container 400 (Root Node) (Class Array_Container 304)

| Field | Contents |
|---|---|
| container_id | 1234 |
| container_parent | Null |
| container_lock_handle | Null |
| container_excluded_handle_list | Null |
| container_article | Article 402 |
| container_article_length | 724 bytes |
| container_valid | TRUE |
| container_time_stamp | June 10, 2001: 13:36:43 |
| array_dimensions | 2x1 |
| child_array | [404, 406] |

Article 402 (Root Node) (Class Workspace_Article 354)

| Field | Contents |
|---|---|
| article_window | Null |
| summary_title | Exemplary workspace |
| summary_description | Exemplary workspace for patent application |
| summary_keywords | Exemplary, patent |
| summary_log | June 7, 2001, 11:06:14 rpw1: I created this workspace to store documents relating to my patent application |
| summary_history | June 7, 2001: 11:04:27, rpw1, CREATE |
| document_count | 2 |

Container 404 (Class List_Container 302)

| Field | Contents |
|---|---|
| container_id | 2123 |
| container_parent | 400 |
| container_lock_handle | Null |

| | |
|---|---|
| container_excluded_list_handle | Null |
| container_article | 416 |
| container_article_length | 786 bytes |
| container_valid | TRUE |
| container_time_stamp | June 20, 2001: 08:54:17 |
| list_head_pointer | 420 |
| list_tail_pointer | 436 |

Article 416 (Class Text_Document_Article 356)

| Field | Contents |
|---|---|
| article_window | Null |
| text_attributes | Arial, 12 point, black, left justification, single spacing |
| summary_title | Patent Description |
| summary_description | Description of Thoughtslinger collaborative editing system |
| summary_keywords | collaborative, editing |
| summary_log | June 11, 2001, 16:52:33 cs1: Began writing description of system |
| | June 15, 2001, 04:23:12 cs1: Finished first draft |
| summary_history | June 10, 2001, 16:50:32 cs1: CREATE |
| text_document_format | 8.5 x 11 paper, portrait orientation, top margin: 1 inch; left margin: 1 inch; right margin 0.5 inches; bottom margin: 1.5 inches; page number: (format: "-#-", position bottom center) |
| text_document_statistics | 7234 words; 511 lines; 103 paragraphs |

Container 420 (Class Sibling_Childless_Container 316)

| Field | Contents |
| --- | --- |
| container_id | 3123 |
| container_parent | 404 |
| container_lock_handle | Null |
| container_excluded_list_handle | Null |
| container_article | 422 |
| container_article_length | 4323 bytes |
| container_valid | TRUE |
| container_time_stamp | June 19, 2001: 17:35:14 |
| list_previous_pointer | Null |
| list_next_pointer | 424 |

Article 422 (Class Paragraph_Article 370)

| Field | Contents |
| --- | --- |
| article_window | Null |
| character data | <Text of paragraph 192a> |
| formatting_data | offset 23: bold+italic on; offset 39: bold+italic off |
| change_tracking_data | offset 17: rpw1, delete, 10-7-2001 18:22:16 |

Container 424 (Class Sibling_Array_Container 314)

| Field | Contents |
| --- | --- |
| container_id | 3124 |
| container_parent | 404 |
| container_lock_handle | Null |
| container_excluded_list_handle | Null |
| container_article | 426 |
| container_article_length | 2326 bytes |
| container_valid | TRUE |
| container_time_stamp | June 20, 2001: 14:22:16 |
| list_previous_pointer | 420 |
| list_next_pointer | 428 |

| | |
|---|---|
| array_dimensions | 1x1 |
| child_array | [440] |

Article 426 (Class Paragraph_Article 350)

| Field | Contents |
|---|---|
| article_window | Null |
| character data | <Text of paragraph 192b> |
| formatting_data | offset 23: bold on; offset 39: bold off |
| change_tracking_data | offsets 17 through 44: rpw1, delete, 26-06-2001 14:22:16 |

Container 440 (Class Array_Container 304)

| Field | Contents |
|---|---|
| container_id | 4123 |
| container_parent | 424 |
| container_lock_handle | Null |
| container_excluded_list_handle | Null |
| container_article | 442 |
| container_article_length | 234 bytes |
| container_valid | TRUE |
| container_time_stamp | June 20, 2001: 08:15:09 |
| array_dimensions | 2x2 |
| child_array | $\begin{bmatrix} 444 & 448 \\ 452 & 456 \end{bmatrix}$ |

Article 442 (Class Image_Article 344)

| Field | Contents |
|---|---|
| article_window | x=175, y=0, width=200, height=100 |
| image_attributes | width: 100; height: 150; model: RGB color; bits per pixel: 24; horizontal resolution: 300 pixels per inch; vertical resolution: 300 pixels per inch; compression: JPEG |
| image_thumbnail | JPEG Thumbnail Data |

Container 444 (Class Childless_Container 306)

| Field | Contents |
|---|---|
| container_id | 5890 |
| container_parent | 440 |
| container_lock_handle | Null |
| container_excluded_list_handle | Null |
| container_article | 446 |
| container_article_length | 11250 bytes |
| container_valid | TRUE |
| container_time_stamp | June 20, 2001: 08:14:09 |

Article 446 (Class Pixel_ Article 372)

| Field | Contents |
|---|---|
| article_window | Null |
| pixel_data | <50 x 75 pixel image – upper left section of image 194> |

Container 448 (Class Childless_Container 306)

| Field | Contents |
|---|---|
| container_id | 5891 |
| container_parent | 440 |
| container_lock_handle | Null |
| container_excluded_list_handle | Null |
| container_article | 450 |
| container_article_length | 12350 bytes |
| container_valid | TRUE |
| container_time_stamp | June 20, 2001: 08:14:09 |

Article 450 (Class Pixel_Article 372)

| Field | Contents |
|---|---|
| article_window | Null |
| pixel_data | <50 x 75 pixel image – upper right section of image 194> |

Container 452 (Class Childless_Container 306)

| Field | Contents |
|---|---|
| container_id | 5892 |
| container_parent | 440 |
| container_lock_handle | Null |
| container_excluded_list_handle | Null |
| container_article | 454 |
| container_article_length | 11556 bytes |
| container_valid | TRUE |
| container_time_stamp | June 20, 2001: 08:14:09 |

Article 454 (Class Pixel_Article 372)

| Field | Contents |
|---|---|
| article_window | Null |
| pixel_data | <50 x 75 pixel image – lower left section of image 194> |

Container 456 (Class Childless_Container 306)

| Field | Contents |
|---|---|
| container_id | 5893 |
| container_parent | 440 |
| container_lock_handle | Null |
| container_excluded_list_handle | Null |
| container_article | 458 |
| container_article_length | 11875 bytes |
| container_valid | TRUE |
| container_time_stamp | June 20, 2001: 08:14:09 |

Article 458 (Class Pixel_Article 372)

| Field | Contents |
|---|---|
| article_window | Null |
| pixel_data | <50 x 75 pixel image – lower right section of image 194> |

Container 428 (Class Sibling_Childless_Container 316)

| Field | Contents |
|---|---|
| container_id | 3125 |
| container_parent | 404 |
| container_lock_handle | Null |
| container_excluded_list_handle | Null |
| container_article | 430 |
| container_article_length | 456 bytes |
| container_valid | TRUE |
| container_time_stamp | June 26, 2001: 14:22:16 |
| list_previous_pointer | 424 |
| list_next_pointer | 432 |

Article 430 (Class Paragraph_Article 350)

| Field | Contents |
|---|---|
| article_window | Null |
| character data | <Text of paragraph 192c> |
| formatting_data | offset 23: italics on; offset 39: italics off |
| change_tracking_data | Null |

Container 432 (Class Sibling_Array_Container 314)

| Field | Contents |
|---|---|
| container_id | 3126 |
| container_parent | 404 |
| container_lock_handle | Null |
| container_excluded_list_handle | Null |
| container_article | 434 |
| container_article_length | 10121 bytes |
| container_valid | TRUE |
| container_time_stamp | June 25, 2001: 11:21:27 |
| list_previous_pointer | 428 |
| list_next_pointer | 436 |

| | |
|---|---|
| array_dimensions | 1x1 |
| child_array | [460] |

Article 434 (Class Paragraph_Article 350)

| Field | Contents |
|---|---|
| article_window | Null |
| character data | Null (Paragraph 192d contains no text, although text may be added in the future) |
| formatting_data | Null |
| change_tracking_data | Null |

Container 460 (Class Array_Container 304)

| Field | Contents |
|---|---|
| container_id | 4124 |
| container_parent | 432 |
| container_lock_handle | Null |
| container_excluded_list_handle | Null |
| container_article | 462 |
| container_article_length | 234 bytes |
| container_valid | TRUE |
| container_time_stamp | June 25, 2001: 10:58:51 |
| array_dimensions | 2x3 |
| child_array | $\begin{bmatrix} 464 & 468 \\ 472 & 476 \\ 480 & 484 \end{bmatrix}$ |

Article 462 (Class Table_Article 346)

| Field | Contents |
|---|---|
| article_window | x=12, y=0, width=200, height=375 |
| table_attributes | 3 rows, 2 columns; preferred cell size 100 x 125 pixels |

Container 464 (Class Childless_Container 306)

| Field | Contents |
|---|---|
| container_id | 5894 |
| container_parent | 460 |
| container_lock_handle | Null |
| container_excluded_list_handle | Null |
| container_article | 466 |
| container_article_length | 32 bytes |
| container_valid | TRUE |
| container_time_stamp | June 25, 2001: 10:54:16 |

Article 466 (Class Cell_Article 374)

| Field | Contents |
|---|---|
| article_window | Null |
| cell_data | <contents of cell (1,1) of table 196> |

Container 468 (Class Childless_Container 306)

| Field | Contents |
|---|---|
| container_id | 5895 |
| container_parent | 460 |
| container_lock_handle | Null |
| container_excluded_list_handle | Null |
| container_article | 470 |
| container_article_length | 23 bytes |
| container_valid | TRUE |
| container_time_stamp | June 25, 2001: 10:56:19 |

Article 470 (Class Cell_Article 374)

| Field | Contents |
|---|---|
| article_window | Null |
| cell_data | <contents of cell (2,1) of table 196> |

Container 472 (Class Childless_Container 306)

| Field | Contents |
|---|---|
| container_id | 5896 |

| Field | Contents |
|---|---|
| container_parent | 460 |
| container_lock_handle | Null |
| container_excluded_list_handle | Null |
| container_article | 474 |
| container_article_length | 55 bytes |
| container_valid | TRUE |
| container_time_stamp | June 25, 2001: 10:55:21 |

Article 474 (Class Cell_Article 374)

| Field | Contents |
|---|---|
| article_window | Null |
| cell_data | <contents of cell (1,2) of table 196> |

Container 476 (Class Childless_Container 306)

| Field | Contents |
|---|---|
| container_id | 5897 |
| container_parent | 460 |
| container_lock_handle | Null |
| container_excluded_list_handle | Null |
| container_article | 478 |
| container_article_length | 234 bytes |
| container_valid | TRUE |
| container_time_stamp | June 25, 2001: 10:56:27 |

Article 478 (Class Cell_Article 374)

| Field | Contents |
|---|---|
| article_window | Null |
| cell_data | <contents of cell (2,2) of table 196> |

Container 480 (Class Childless_Container 306)

| Field | Contents |
|---|---|
| container_id | 5898 |
| container_parent | 460 |
| container_lock_handle | Null |

| | |
|---|---|
| container_excluded_list_handle | Null |
| container_article | 482 |
| container_article_length | 234 bytes |
| container_valid | TRUE |
| container_time_stamp | June 25, 2001: 10:58:51 |

Article 482 (Class Cell_Article 374)

| Field | Contents |
|---|---|
| article_window | Null |
| cell_data | <contents of cell (1,3) of table 196> |

Container 484 (Class Childless_Container 306)

| Field | Contents |
|---|---|
| container_id | 5899 |
| container_parent | 460 |
| container_lock_handle | Null |
| container_excluded_list_handle | Null |
| container_article | 486 |
| container_article_length | 112 bytes |
| container_valid | TRUE |
| container_time_stamp | June 25, 2001: 10:56:49 |

Article 486 (Class Cell_Article 374)

| Field | Contents |
|---|---|
| article_window | Null |
| cell_data | <contents of cell (2,3) of table 196> |

Container 436 (Class Sibling_Childless_Container 316)

| Field | Contents |
|---|---|
| container_id | 3127 |
| container_parent | 404 |
| container_lock_handle | Null |
| container_excluded_list_handle | Null |

| | |
|---|---|
| container_article | 438 |
| container_article_length | 456 bytes |
| container_valid | TRUE |
| container_time_stamp | June 25, 2001: 11:21:27 |
| list_previous_pointer | 432 |
| list_next_pointer | Null |

Article 438 (Class Paragraph_Article 350)

| Field | Contents |
|---|---|
| article_window | Null |
| character data | <Text of paragraph 192e> |
| formatting_data | offset 23: bold on; offset 39: bold off |
| change_tracking_data | Null |

Container 406 (Class Array_Container 304)

| Field | Contents |
|---|---|
| container_id | 2124 |
| container_parent | 400 |
| container_lock_handle | Null |
| container_excluded_list_handle | Null |
| container_article | 418 |
| container_article_length | 234 bytes |
| container_valid | TRUE |
| container_time_stamp | July 5, 2001: 17:12:41 |
| array_dimensions | 3x1 |
| child_array | [490 494 498] |

Article 418 (Class Presentation_Document_Article 316)

| Field | Contents |
|---|---|
| article_window | Null |
| summary_title | Intellectual Property Presentation |
| summary_description | Presentation relating to patent application |

| | |
|---|---|
| summary_keywords | patent |
| summary_log | July 5, 2001, 16:52:33 cs1: Started first draft of presentation using provisional application |
| summary_history | July 5, 2001, 16:55:00 cs1: CREATE |
| slide_order_table | [3134, 3132, 3133] |
| default_background | vertical gradient, blue (top) to black (bottom) |
| default_title_properties | Helvetica, 16 point, bold, x=20 pixels, y=30 pixels, width=300 pixels, height=100 pixels |
| default_text_properties | Times Roman, 14 point, round bullet, x=20 pixels, y=100 pixels, width=200 pixels, height=200 pixels |
| default_shapes | line: p1.x=30, p1.y=0, p2.x=30, p2.y=400, thickness=5, color=red<br>logo text: "Thoughtslinger", font=Garamond, 9 point, normal, x=720, y=540, width=40, height=10 |
| current_slide | -1 (live presentation not presently underway) |

Container 490 (Class Array_Container 304)

| Field | Contents |
|---|---|
| container_id | 3132 |
| container_parent | 406 |
| container_lock_handle | Null |
| container_excluded_list_handle | Null |
| container_article | 492 |
| container_article_length | 1364 bytes |
| container_valid | TRUE |
| container_time_stamp | July 5, 2001: 17:16:11 |
| array_dimensions | 1x1 |
| child_array | [502] |

Article 492 (Class Slide_Article 366)

| Field | Contents |
|---|---|
| article_window | Null |
| slide_identifier | 3132 |
| slide_type | Text slide |
| slide_background | Black, no gradient (override default background) |
| default_shapes_flag | TRUE (display default shapes) |
| advancement_effect | Fade through black |
| advancement_interval | 3 seconds |

Container 502 (Class List_Container 302)

| Field | Contents |
|---|---|
| container_id | 4125 |
| container_parent | 490 |
| container_lock_handle | Null |
| container_excluded_list_handle | Null |
| container_article | 504 |
| container_article_length | 786 bytes |
| container_valid | TRUE |
| container_time_stamp | July 5, 2001: 17:16:11 |
| list_head_pointer | 506 |
| list_tail_pointer | 514 |

Article 504 (Class Text_Article 342)

| Field | Contents |
|---|---|
| article_window | x=100, y=75, width=430, height=300 |
| text_attributes | Helvetica, 18 point, yellow, left justification, single spacing |

Container 506 (Class Sibling_Childless_Container 316)

| Field | Contents |
|---|---|
| container_id | 5900 |

| | |
|---|---|
| container_parent | 502 |
| container_lock_handle | Null |
| container_excluded_list_handle | Null |
| container_article | 508 |
| container_article_length | 23 bytes |
| container_valid | TRUE |
| container_time_stamp | July 5, 2001: 17:18:46 |
| list_previous_pointer | Null |
| list_next_pointer | 510 |

Article 508 (Class Paragraph_Article 370)

| Field | Contents |
|---|---|
| article_window | Null |
| character_data | <Text of paragraph 214a> |
| formatting_data | bullet style: square |
| change_tracking_data | Null |

Container 510 (Class Sibling_Childless_Container 316)

| Field | Contents |
|---|---|
| container_id | 5901 |
| container_parent | 502 |
| container_lock_handle | Null |
| container_excluded_list_handle | Null |
| container_article | 512 |
| container_article_length | 32 bytes |
| container_valid | TRUE |
| container_time_stamp | July 5, 2001: 17:18:46 |
| list_previous_pointer | 506 |
| list_next_pointer | 514 |

Article 512 (Class Paragraph_Article 370)

| Field | Contents |
|---|---|
| article_window | Null |

| | |
|---|---|
| character_data | \<Text of paragraph 214b\> |
| formatting_data | bullet style: square |
| change_tracking_data | Null |

Container 514 (Class Sibling_Childless_Container 316)

| Field | Contents |
|---|---|
| container_id | 5902 |
| container_parent | 502 |
| container_lock_handle | Null |
| container_excluded_list_handle | Null |
| container_article | 516 |
| container_article_length | 35 bytes |
| container_valid | TRUE |
| container_time_stamp | July 5, 2001: 17:18:46 |
| list_previous_pointer | 510 |
| list_next_pointer | Null |

Article 512 (Class Paragraph_Article 370)

| Field | Contents |
|---|---|
| article_window | Null |
| character_data | \<Text of paragraph 214c\> |
| formatting_data | bullet style: square |
| change_tracking_data | Null |

Container 494 (Class Array_Container 304)

| Field | Contents |
|---|---|
| container_id | 3133 |
| container_parent | 406 |
| container_lock_handle | Null |
| container_excluded_list_handle | Null |
| container_article | 496 |
| container_article_length | 345 bytes |
| container_valid | TRUE |

| Field | Contents |
|---|---|
| container_time_stamp | July 5, 2001: 17:24:44 |
| array_dimensions | 2x1 |
| child_array | [518 522] |

Article 496 (Class Slide_Article 366)

| Field | Contents |
|---|---|
| article_window | Null |
| slide_identifier | 3133 |
| slide_type | Blank slide |
| slide_background | Null (use default background) |
| default_shapes_flag | TRUE (display default shapes) |
| advancement_effect | Fade through black |
| advancement_interval | 3 seconds |

Container 518 (Class Childless_Container 306)

| Field | Contents |
|---|---|
| container_id | 4126 |
| container_parent | 494 |
| container_lock_handle | Null |
| container_excluded_list_handle | Null |
| container_article | 520 |
| container_article_length | 50 bytes |
| container_valid | TRUE |
| container_time_stamp | July 5, 2001: 17:23:17 |

Article 520 (Class Shape_Article 368)

| Field | Contents |
|---|---|
| article_window | Null |
| shape_type | Arrow |
| shape_attributes | x=500, y=80, width=100, height=200, color=blue, line thickness=2, fill=none, direction=down |

Container 522 (Class Array_Container 304)

| Field | Contents |
|---|---|
| container_id | 4127 |
| container_parent | 494 |
| container_lock_handle | Null |
| container_excluded_list_handle | Null |
| container_article | 524 |
| container_article_length | 34 bytes |
| container_valid | TRUE |
| container_time_stamp | July 5, 2001: 17:24:44 |
| array_dimensions | 1x1 |
| child_array | [526] |

Article 524 (Class AV_Clip_Article 348)

| Field | Contents |
|---|---|
| article_window | x=300, y=280, width=320, height=200 |
| AV_format | MPEG |
| AV_length | 12800 frames |

Container 526 (Class Childless_Container 306)

| Field | Contents |
|---|---|
| container_id | 5903 |
| container_parent | 522 |
| container_lock_handle | Null |
| container_excluded_list_handle | Null |
| container_article | 528 |
| container_article_length | 1293459872 bytes |
| container_valid | TRUE |
| container_time_stamp | July 5, 2001: 17:24:44 |

Article 528 (Class AV_Data_Article 376)

| Field | Contents |
|---|---|
| article_window | Null |

| av_data | <encoded audio/visual data of clip 218> |

Container 498 (Class Array_Container 304)

| Field | Contents |
| --- | --- |
| container_id | 3134 |
| container_parent | 406 |
| container_lock_handle | Null |
| container_excluded_list_handle | Null |
| container_article | 502 |
| container_article_length | 254 bytes |
| container_valid | TRUE |
| container_time_stamp | July 5, 2001: 17:37:19 |
| array_dimensions | 1x1 |
| child_array | [530] |

Article 500 (Class Slide_Article 366)

| Field | Contents |
| --- | --- |
| article_window | Null |
| slide_identifier | 3134 |
| slide_type | Blank slide |
| slide_background | Black, no gradient (override default background) |
| default_shapes_flag | FALSE (do not display default shapes) |
| advancement_effect | Fade through black |
| advancement_interval | 3 seconds |

Container 530 (Class Array_Container 304)

| Field | Contents |
| --- | --- |
| container_id | 4128 |
| container_parent | 498 |
| container_lock_handle | Null |
| container_excluded_list_handle | Null |
| container_article | 532 |

| | |
|---|---|
| container_article_length | 234 byes |
| container_valid | TRUE |
| container_time_stamp | July 5, 2001: 17:37:19 |
| array_dimensions | 2x2 |
| child_array | [534, 538, 542, 546] |

Article 532 (Class Image_Article 344)

| Field | Contents |
|---|---|
| article_window | x=200, y=400, width=400, height=300 |
| image_attributes | width=800; height=600; model: RGB color; bits per pixel: 24; horizontal resolution: 150 pixels per inch; vertical resolution: 300 pixels per inch; compression: JPEG |
| image_thumbnail | JPEG Thumbnail Data |

Container 534 (Class Childless_Container 306)

| Field | Contents |
|---|---|
| container_id | 5904 |
| container_parent | 530 |
| container_lock_handle | Null |
| container_excluded_list_handle | Null |
| container_article | 536 |
| container_article_length | 11250 bytes |
| container_valid | TRUE |
| container_time_stamp | July 5, 2001: 17:37:19 |

Article 536 (Class Pixel_Article 372)

| Field | Contents |
|---|---|
| article_window | Null |
| pixel_data | <400x300 pixel image – upper left corner of image 220> |

Container 538 (Class Childless_Container 306)

| Field | Contents |
| --- | --- |
| container_id | 5905 |
| container_parent | 530 |
| container_lock_handle | Null |
| container_excluded_list_handle | Null |
| container_article | 540 |
| container_article_length | 12350 bytes |
| container_valid | TRUE |
| container_time_stamp | July 5, 2001: 17:37:19 |

Article 540 (Class Pixel_Article 372)

| Field | Contents |
| --- | --- |
| article_window | Null |
| pixel_data | <400x300 pixel image – upper right corner of image 220> |

Container 542 (Class Childless_Container 306)

| Field | Contents |
| --- | --- |
| container_id | 5906 |
| container_parent | 530 |
| container_lock_handle | Null |
| container_excluded_list_handle | Null |
| container_article | 544 |
| container_article_length | 11556 bytes |
| container_valid | TRUE |
| container_time_stamp | July 5, 2001: 17:37:19 |

Article 544 (Class Pixel_Article 372)

| Field | Contents |
| --- | --- |
| article_window | Null |
| pixel_data | <400x300 pixel image – lower left corner of image 220> |

Container 546 (Class Childless_Container 306)

| Field | Contents |
| --- | --- |
| container_id | 5907 |
| container_parent | 530 |
| container_lock_handle | Null |
| container_excluded_list_handle | Null |
| container_article | 548 |
| container_article_length | 11875 bytes |
| container_valid | TRUE |
| container_time_stamp | July 5, 2001: 17:37:19 |

Article 548 (Class Pixel_Article 372)

| Field | Contents |
| --- | --- |
| article_window | Null |
| pixel_data | <400x300 pixel image – lower right corner of image 200> |

Appendix B

| Field | Contents |
|---|---|
| user_name | Rick Walker |
| user_password | ricardo |
| user_contact_info | 123 Easy Street, Toronto, ON |
| user_e_mail | rw@thoughtslinger.com |
| user_handle | rpw1 |
| user_screen_name | Rick |
| user_workspace_list | Exemplary Workspace |
| | Second Workspace |
| | Third workspace |

| Field | Contents |
|---|---|
| user_name | Chris Sonnenberg |
| user_password | chaos |
| user_contact_info | 456 King Street, Toronto, ON |
| user_e_mail | cs@thoughslinger.com |
| user_handle | cs1 |
| user_screen_name | Chris |
| user_workspace_list | Exemplary Workspace |
| | First Workspace |
| | Second Workspace |
| | Third Workspace |

| Field | Contents |
|---|---|
| user_name | Bhupinder Randhawa |
| user_password | beside |
| user_contact_info | 40 King Street, Toronto, ON |
| user_e_mail | br@bp.com |
| user_handle | br9 |
| user_screen_name | Bhupinder |
| user_workspace_list | Exemplary Workspace |

Appendix C

| Field | Contents |
|---|---|
| workspace_id | 1234 |
| workspace_title | Exemplary workspace |
| workspace_host | Workspace server 112b | workspace_owner          rpw1
workspace_size           1,234,567 bytes
workspace_location       \workspaces\ws1\

| Field | Contents |
|---|---|
| workspace_id | 1345 |
| workspace_title | First Workspace |
| workspace_host | Null |
| workspace_owner | cs1 |
| workspace_size | 345,232 byes |
| workspace_location | \workspaces\ws2\ |

| Field | Contents |
|---|---|
| workspace_id | 1456 |
| workspace_title | Second Workspace |
| workspace_host | Null |
| workspace_owner | cs1 |
| workspace_size | 12,412 bytes |
| workspace_location | \workspaces\ws3\ |

| Field | Contents |
|---|---|
| workspace_id | 1567 |
| workspace_title | Third Workspace |
| workspace_host | Workspace server 112a |
| workspace_owner | rpw1 |
| workspace_size | 123,123 bytes |
| workspace_location | \workspaces\ws4\ |

Appendix D

| Field | Contents |
|---|---|
| user_handle | rpw1 |
| user_screen_name | Rick |
| user_e_mail | rw@thoughtslinger.com |
| member_privileges | Owner |
| member_status | Not connected |

| Field | Contents |
|---|---|
| user_handle | cs1 |
| user_screen_name | Chris |

| 111 | 112 |
|---|---|
| user_e_mail | cs@thoughtslinger.com |
| member_privileges | Worker |
| member_status | Not connected |

| Field | Contents |
|---|---|
| user_handle | br9 |
| user_screen_name | Bhupinder |
| user_e_mail | br@bp.com |
| member_privileges | Viewer |
| member_status | Connected |

We claim:

1. A method for simultaneous multi-user editing of a document by a plurality of users including a first user and a second user, wherein the document includes primary data, the method comprising:
   (a) dividing the primary data into three or more mutually exclusive sections, including a first section and a last section;
   (b) storing each of the sections in a separate primary container, wherein:
      (i) each of the primary containers is a sibling container;
      (ii) the primary container in which the first section is stored is designated as a head primary container;
      (iii) the primary container in which the last section is stored is designated as a tail primary container;
      (iv) the primary containers are part of a master document tree data structure stored in a file system accessible to a server; and
      (v) the master document tree includes a parent container; and
   (c) linking the primary containers to form a linked list corresponding to the order of the sections in the document, and wherein the primary container corresponding to the first section is at the head of the linked list and the primary container corresponding to the last section is at the tail of the linked list;
   (d) recording a link to the head primary container in the parent container;
   (e) recording a link to the tail primary container in the parent container;
   (f) transmitting a copy of at least part of the master document tree from the server to a first client operated by the first user;
   (g) transmitting a copy of at least part of the master document tree from the server to a second client operated by the second user;
   (h) receiving a first lock request from the first client, the first lock request identifying a first group of primary containers and wherein the first group of primary containers corresponds to a first part of the document;
   (j) determining whether the first user may lock each of the primary containers in the first group of primary containers by at least ensuring that no primary container in the first group of primary containers is locked by a user other than the first user;
   (k) if the result in (j) is that the first user may lock each of the primary containers in the first group of primary containers, then:
      (i) locking each of the primary containers in the first group of primary containers and identifying each of the primary containers in the first group of primary containers as being locked by the first user;
      (ii) transmitting a first confirm lock message to the first client;
      (iii) transmitting a first update message to the second client, wherein the first update message indicates that each primary container in the first group of primary containers has been locked;
      (iv) receiving a first post request from the first client, wherein the first post request includes one or more new primary containers corresponding to a modified version of the first part of the document;
      (v) modifying the master document tree in accordance with the first post request including inserting the one or more new primary containers into the linked list of primary containers; and
      (vi) transmitting a second update message to the second client, wherein the second update message includes the one or more new primary containers; and
   (l) if the result in (j) is that the first user may not lock each primary container in the first group of primary containers, then transmitting a refused lock message to the first user,
   wherein the parent container does not include a direct link to any of the primary containers in the linked list other than the head primary container and the tail primary container.

2. The method of claim 1 wherein in (k)(iii), the first update message also indicates that each primary container in the first group of primary containers has been locked by the first user.

3. The method of claim 1 wherein in (k)(vi), the second update message also indicates that the modified version of the first part of the document has been posted by the first user.

4. The method of claim 1 including:
   (m) receiving a second lock request from the second client, the second lock request identifying a second group of primary containers wherein the second group of primary containers corresponds to a second part of the document;
   (n) determining whether the second user may lock each of the primary containers in the second group of primary containers by at least ensuring that no primary container in the second group of primary containers is locked by a user other than the second user;
   (p) if the result in (n) is that the second user may lock each of the primary containers in the second group of primary containers, then:
      (i) locking each of the primary containers in the second group of primary containers and identifying each of the primary containers in the second group of primary containers as being locked by the second user;
      (ii) transmitting a second confirm lock message to the second client;
      (iii) transmitting a third update message to the first client, wherein the third update message indicates that each primary container in the second group of primary containers has been locked;
      (iv) receiving a second post request from the second client, wherein the second post request includes one or more new primary containers corresponding to a modified version of the second part of the document;
      (v) modifying the master document tree in accordance with the second post request including inserting the one or more new primary containers into the linked list of primary containers; and
      (vi) transmitting a fourth update message to the first client, wherein the fourth update message includes the one or more new primary containers; and
   (q) if the result in (n) is that the second user may not lock each of the primary containers in the second group of primary containers, then transmitting a refused lock message to the second user.

5. The method of claim 4 wherein in (p)(iii), the third update message also indicates that each primary container in the second group of primary containers has been locked by the second user.

6. The method of claim 4 wherein in (p)(vi), the fourth update message also indicates that the modified version of the second part of the document has been posted by the second user.

7. The method of claim 4 wherein the first group of primary containers and the second group of primary containers are mutually exclusive and wherein (p)(i) occurs before (k)(iv).

8. The method of claim 1 including, after (k)-(v):
(k)(vii) unlocking at least some of the primary containers in the first group of primary containers.

9. The method of claim 8 including:
(m) receiving a second lock request from the second client, the second lock request identifying a second group of primary containers, wherein the second group of primary containers corresponds to a second part of the document and wherein at least one of the primary containers in the second group of primary containers was included in the first post request;
(n) determining whether the second user may lock each of the primary containers in the second group of primary containers by at least ensuring that no primary container in the second group of primary containers is locked by a user other than the second user;
(p) if the result in (n) is that the second user may lock each of the primary containers in the second group of primary containers, then:
  (i) locking each of the primary containers in the second group of primary containers and identifying each of the primary containers in the second group of primary containers as being locked by the second user;
  (ii) transmitting a second confirm lock message to the second client;
  (iii) transmitting a third update message to the first client, wherein the third update message indicates that each primary container in the second group of primary containers has been locked;
  (iv) receiving a second post request from the second client, wherein the second post request includes one or more new primary containers corresponding to a modified version of the second part of the document;
  (v) modifying the master document tree in accordance with the second post request including inserting the one or more new primary containers into the linked list of primary containers; and
  (vi) transmitting a fourth update message to the first client, wherein the fourth update message includes the one or more new primary containers; and
(q) if the result in (n) is that the second user may not lock each of the primary containers in the second group of primary containers, then transmitting a refused lock message to the second user.

10. The method of claim 9, wherein in (p)(iii), the third update message also indicates that each primary container in the second group of primary containers has been locked by the second user.

11. The method of claim 9, wherein in (p)(vi), the fourth update message also indicates that the modified version of the second part of the document has been posted by the second user.

12. The method of claim 1 wherein the primary data type of the document is text and wherein each section of the document corresponds to one of the following:
(a) a character;
(b) a word;
(c) a sentence; and
(d) a paragraph.

13. The method of claim 12 wherein the primary containers are linked together to form a singly-linked list.

14. The method of claim 12 wherein each of the sibling containers includes an article containing the text of the section corresponding to the sibling container.

15. The method of claim 12 wherein the primary containers are linked together to form a doubly linked list.

16. The method of claim 12 wherein one of the sections includes embedded data of a secondary data type, wherein the secondary data type is different from the primary data type and wherein the embedded data is stored in a sub-tree headed by the sibling container corresponding to the one section.

17. The method of claim 16 wherein the one section also includes data of the primary data type and wherein the data of the primary data type is stored in the sibling container corresponding to the one section.

18. The method of claim 16 wherein the one section contains no data other than the embedded data.

19. The method of claim 1 wherein the primary data type of the document is text and wherein each section of the document corresponds to one of the following:
(a) a group of paragraphs; and
(b) a chapter.

20. The method of claim 1 wherein the document also includes editable summary information and further including:
(m) storing the summary information in the parent container;
(n) receiving a second lock request from the second client, the second lock request identifying the parent container;
(p) determining whether the parent container may be locked by the second user by at least ensuring that the parent container is not locked by a user other than the second user;
(q) if the result in (p) is that the second user may lock the parent container, then:
  (i) locking the parent container and identifying the parent container as being locked by the second user;
  (ii) transmitting a confirm lock message to the second client;
  (iii) transmitting a third update message to the first client, wherein the third update message indicates that the parent container has been locked;
  (iv) receiving a second post request from the second client, wherein the second post request includes a modified version of the parent container;
  (v) modifying the master document tree in accordance with the second post request including updating the parent container; and
  (vi) transmitting a fourth update message to the first client, wherein the fourth update message includes the modified version of the parent container; and
(r) if the result in (p) is that the second user may not lock the parent container, then transmitting a refused lock message to the second user,
wherein q(i) occurs before (k)(iv).

21. The method of claim 20 wherein in (q)(iv) and in (q)(vi), the modified version of the parent container stores a modified version of the summary information.

22. The method of claim 20 wherein in (q)(iii) the third update message also indicates that the parent container has been locked by the second user.

23. The method of claim 20 wherein in (q)(vi), the fourth update message also indicates that the modified version of the parent container storing the modified version of the summary information has been posted by the second user.

24. The method of claim 20 wherein at least one of the primary containers stores change tracking information.

25. The method of claim 20 wherein the document also includes formatting information, and wherein the formatting information is stored in the parent container and wherein in (q)(iv) and in (q)(vi) the modified version of the parent container includes modified formatting information.

26. The method of claim 25 wherein the formatting information includes change tracking information.

27. The method of claim 20 further including:
  (i) assigning each user a unique user handle;
  (ii) recording a user's privilege level to access the summary information by storing the user's handle in the parent container together with any restrictions on the user's permission to access the summary information; and
  (iii) wherein in (p) determining that the second user can lock the parent container also includes ensuring that the second user's privilege level allows the second user to lock the parent container.

28. The method of claim 1 wherein the document tree data structure is a document sub-tree forming part of a container tree data structure and wherein the container tree data structure includes other document sub-trees corresponding to other documents.

29. The method of claim 28 wherein the container tree data structure has a root container and wherein the parent container of the document tree data structure is a child container of the root container.

30. The method of claim 1 further including:
  (i) assigning each user a unique user handle;
  (ii) recording a user's privilege level to access a section of the document by storing the user's handle in the associated container together with any restrictions on the user's permission to access the section; and
  (iii) wherein in (j) determining that the first user can lock each of the primary containers in the first group of primary containers also includes ensuring that the first user's privilege level allows the first user to lock each of the primary containers in the first group of primary containers.

31. The method of claim 1 wherein at least one section is deleted from the first part of the document, and in k(iv) the post request includes fewer containers than in the first group of primary containers.

32. The method of claim 1 further including recording a link to the parent container in each of the primary containers.

* * * * *